(12) United States Patent
Koida

(10) Patent No.: US 11,822,063 B2
(45) Date of Patent: Nov. 21, 2023

(54) ZOOM LENS, OPTICAL APPARATUS, AND A MANUFACTURING METHOD OF THE ZOOM LENS

(71) Applicant: Nikon Corporation, Tokyo (JP)

(72) Inventor: Keigo Koida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 106 days.

(21) Appl. No.: 17/365,155

(22) Filed: Jul. 1, 2021

(65) Prior Publication Data

US 2021/0325645 A1 Oct. 21, 2021

Related U.S. Application Data

(60) Division of application No. 16/666,896, filed on Oct. 29, 2019, now Pat. No. 11,079,574, which is a
(Continued)

(30) Foreign Application Priority Data

Nov. 21, 2013 (JP) ................................. 2013-240958
Aug. 28, 2014 (JP) ................................. 2014-174637

(51) Int. Cl.
*G02B 15/14* (2006.01)
*G02B 27/64* (2006.01)
(Continued)

(52) U.S. Cl.
CPC ...... *G02B 15/144511* (2019.08); *G02B 5/005* (2013.01); *G02B 15/177* (2013.01); *G02B 27/646* (2013.01); *G02B 13/18* (2013.01)

(58) Field of Classification Search
None
See application file for complete search history.

(56) References Cited

U.S. PATENT DOCUMENTS 5,000,550 A 3/1991 Takahashi et al.
5,046,833 A 9/1991 Tsuchida
(Continued)

FOREIGN PATENT DOCUMENTS

JP 02-201310 A 8/1990
JP 04-029109 A 1/1992
(Continued)

OTHER PUBLICATIONS

International Search Report from Application No. PCT/JP2014/005687, dated Feb. 10, 2015.
(Continued)

*Primary Examiner* — Darryl J Collins
(74) *Attorney, Agent, or Firm* — Potomac Law Group, PLLC

(57) ABSTRACT

A zoom lens includes, in order from an object, a first lens group having a negative refractive power, a second lens group having a positive refractive power, a third lens group having a negative refractive power, and a fourth lens group. Zooming is performed by changing respective distances between the first and second lens groups, the second and third lens groups, and the third and fourth lens groups. The first lens group includes a negative lens disposed closest to the object, and a negative lens. Specified conditional expressions are satisfied.

7 Claims, 31 Drawing Sheets

Related U.S. Application Data division of application No. 15/161,235, filed on May 21, 2016, now Pat. No. 10,551,601, which is a continuation of application No. PCT/JP2014/005687, filed on Nov. 12, 2014.

(51) Int. Cl.
 *G02B 15/177* (2006.01)
 *G02B 5/00* (2006.01)
 *G02B 13/18* (2006.01)

(56) References Cited

U.S. PATENT DOCUMENTS

| | | | |
|---|---|---|---|
| 5,576,890 A | 11/1996 | Tanaka et al. | |
| 6,618,198 B1 | 9/2003 | Endo | |
| 6,710,931 B1 | 3/2004 | Misaka | |
| 8,446,512 B2* | 5/2013 | Ichikawa | H04N 5/2254 348/340 |
| 8,947,562 B2 | 2/2015 | Ozaki | |
| 8,994,842 B2* | 3/2015 | Takahashi | G02B 15/144511 359/683 |
| 2003/0086181 A1 | 5/2003 | Murata | |
| 2004/0223230 A1 | 11/2004 | Saori | |
| 2005/0168807 A1 | 8/2005 | Endo | |
| 2007/0223105 A1 | 9/2007 | Sensui | |
| 2008/0002263 A1 | 1/2008 | Yamamoto | |
| 2008/0117524 A1 | 5/2008 | Ichikawa et al. | |
| 2009/0002844 A1 | 1/2009 | Ito et al. | |
| 2009/0231708 A1 | 9/2009 | Shibata et al. | |
| 2010/0073778 A1 | 3/2010 | Hirakawa | |
| 2012/0019928 A1 | 1/2012 | Sato | |
| 2012/0019931 A1 | 1/2012 | Ogata et al. | |
| 2012/0057068 A1 | 3/2012 | Ichikawa et al. | |
| 2012/0162777 A1 | 6/2012 | Imaoka | |
| 2012/0162778 A1* | 6/2012 | Imaoka | G02B 27/646 359/684 |
| 2013/0321682 A1 | 12/2013 | Yamasaki | |
| 2014/0098253 A1 | 4/2014 | Maetaki | |
| 2015/0378139 A1 | 12/2015 | Noda | |
| 2018/0059364 A1* | 3/2018 | Morooka | G02B 9/34 |

FOREIGN PATENT DOCUMENTS

| | | |
|---|---|---|
| JP | 04-029110 A | 1/1992 |
| JP | H10-020190 A | 1/1998 |
| JP | 11-174328 A | 7/1999 |
| JP | 11-174329 A | 7/1999 |
| JP | 2000-338397 A | 12/2000 |
| JP | 2001-116992 A | 4/2001 |
| JP | 2003-131135 A | 5/2003 |
| JP | 05-241073 A | 9/2003 |
| JP | 2004-117828 A | 4/2004 |
| JP | 2004-246043 A | 9/2004 |
| JP | 2004-354980 A | 12/2004 |
| JP | 2005-215389 A | 8/2005 |
| JP | 2005-266181 A | 9/2005 |
| JP | 2005-283648 A | 10/2005 |
| JP | 2005-352428 A | 12/2005 |
| JP | 2007-256695 A | 10/2007 |
| JP | 2007-286601 A | 11/2007 |
| JP | 2008-026880 A | 2/2008 |
| JP | 2008-046612 A | 2/2008 |
| JP | 2008-158321 A | 7/2008 |
| JP | 2008-176271 A | 7/2008 |
| JP | 2008-197176 A | 8/2008 |
| JP | 2012-027262 A | 2/2012 |
| JP | 2012-27283 A | 2/2012 |
| JP | 2013-250338 A | 12/2013 |
| JP | 2014-077867 A | 5/2014 |
| JP | 2014-215500 A | 11/2014 |
| WO | WO 2014/141348 A1 | 9/2014 |

OTHER PUBLICATIONS

Decision of Refusal dated Feb. 5, 2019, in Japanese Patent Application No. 2014-174637.
Office Action dated Jun. 12, 2018, in Japanese Patent Application No. 2014-174637.
Office Action dated Apr. 4, 2018, in Chinese Patent Application No. 201480063620.8.
Examination Report dated Mar. 26, 2018, in Indian Patent Application No. 201617020899.
Office Action dated Aug. 22, 2017, in Chinese Patent Application No. 201480063620.8.
Extended European search report for European Patent Application No. 14863526.1, dated May 30, 2017.
English Translation of International Preliminary Reporton Patentability from International Patent Application No. PCT/JP2014/005687, dated Jun. 2, 2016.
Office Action dated Jul. 22, 2020, in European Patent Application No. 14863526.1.
Office Action dated Nov. 26, 2019, in Japanese Patent Application No. 2019-072638.

* cited by examiner (W)

(M)

(T)

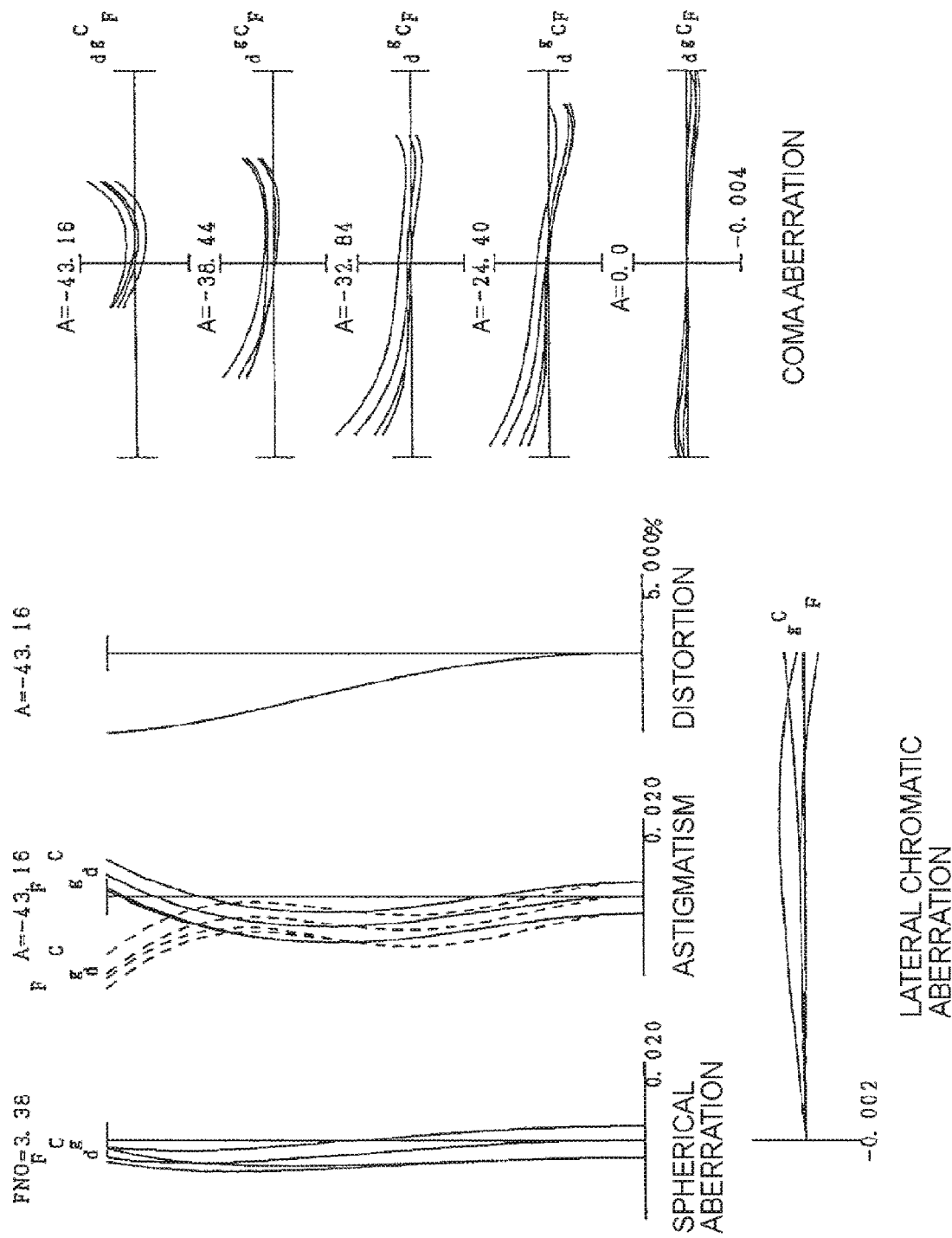

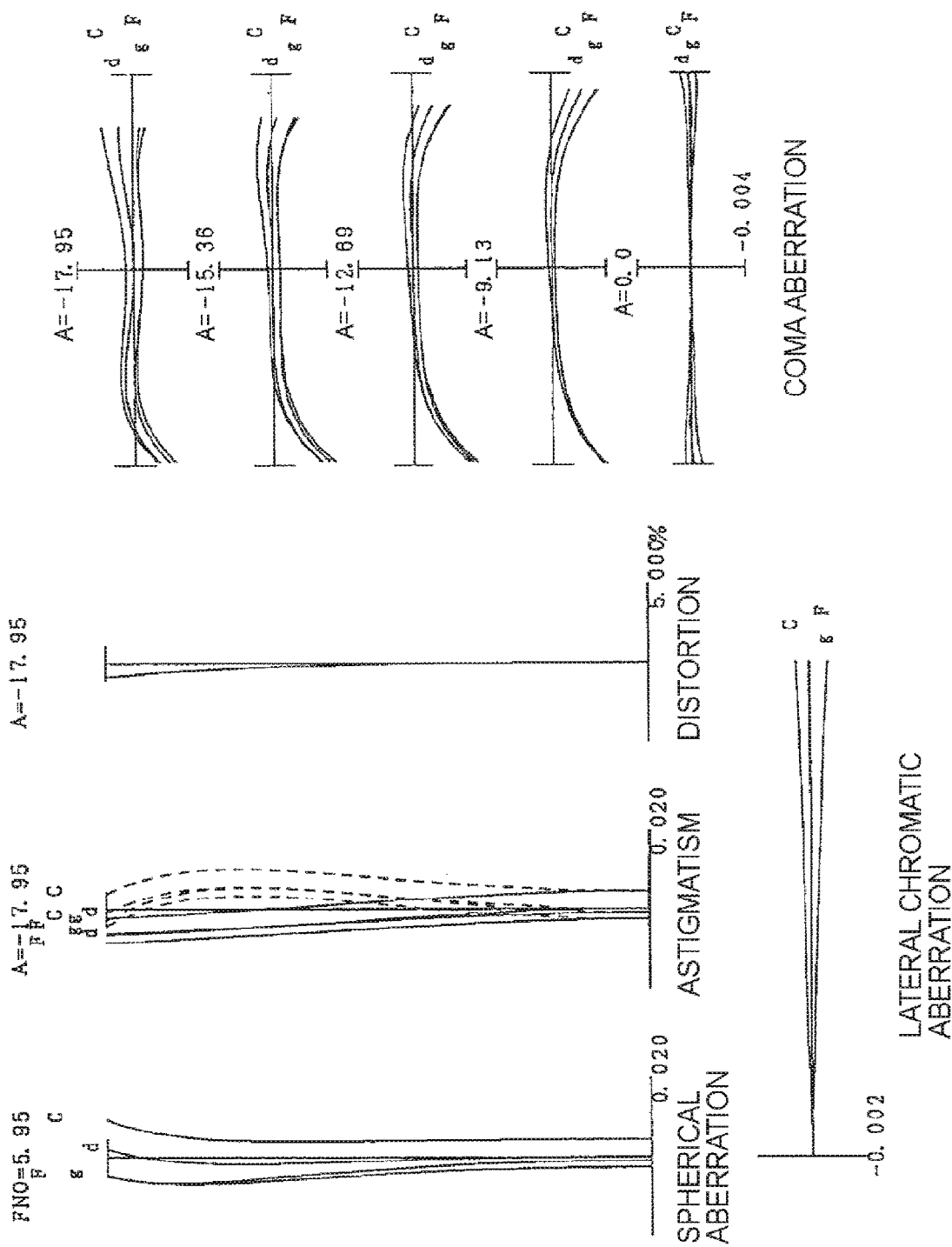

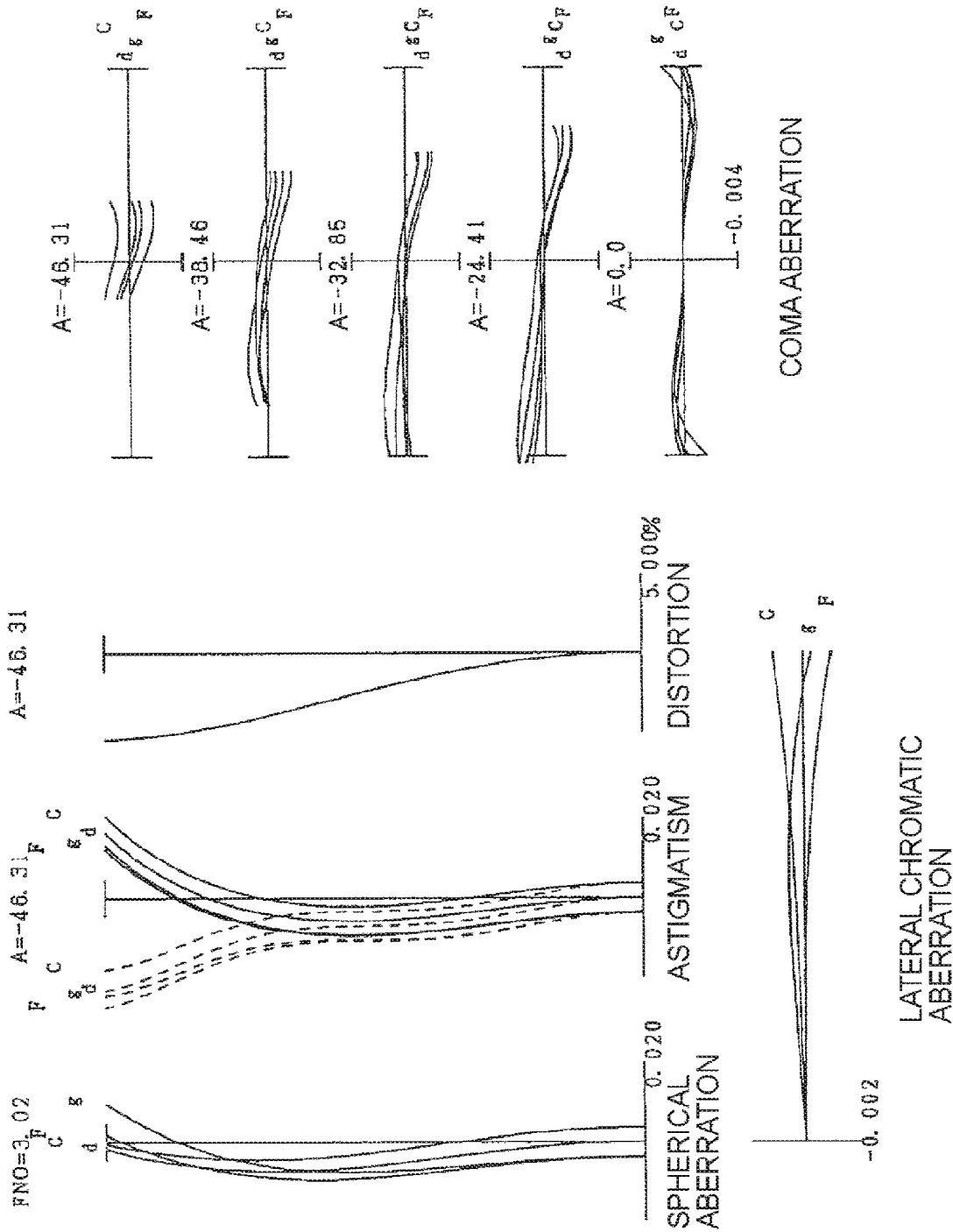

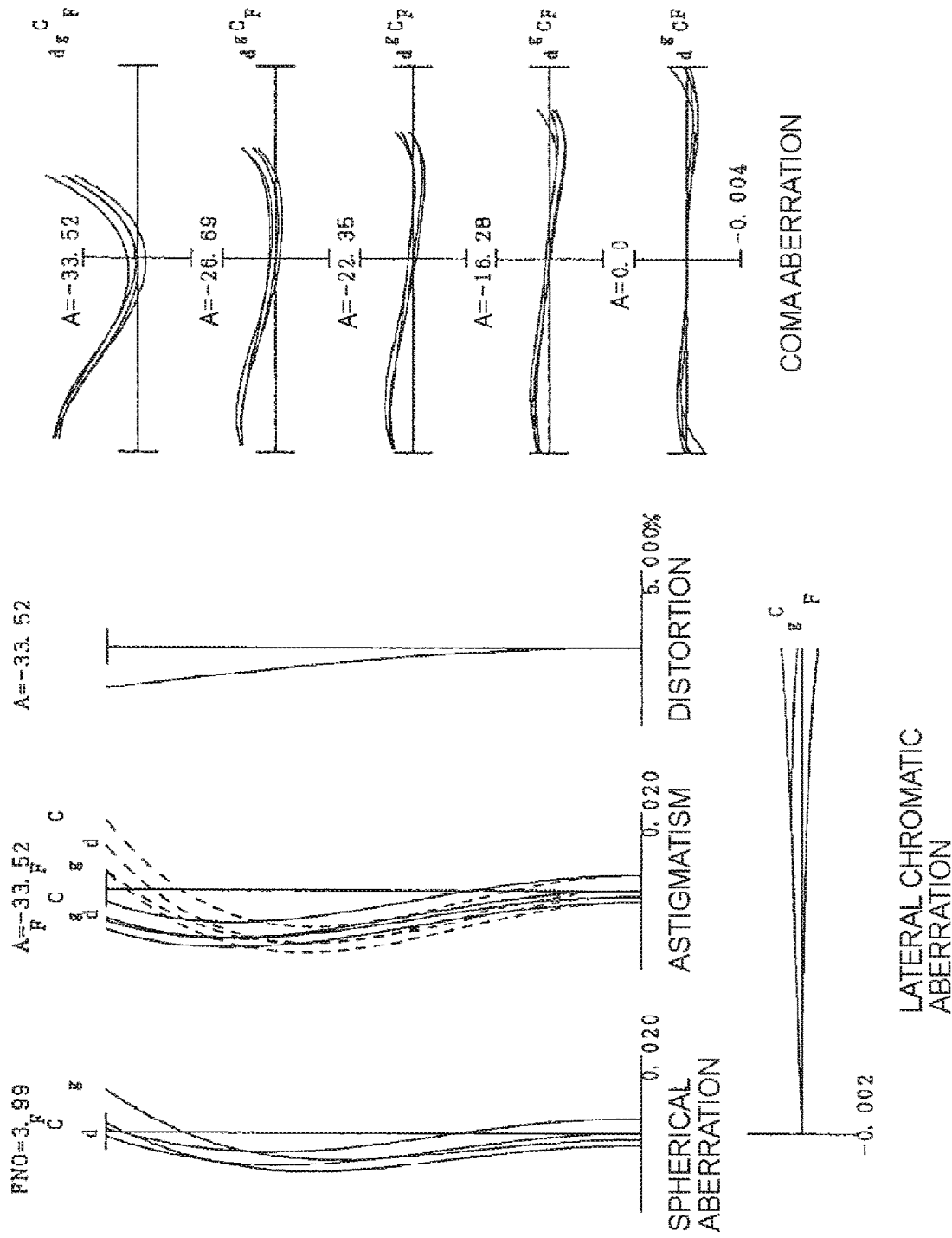

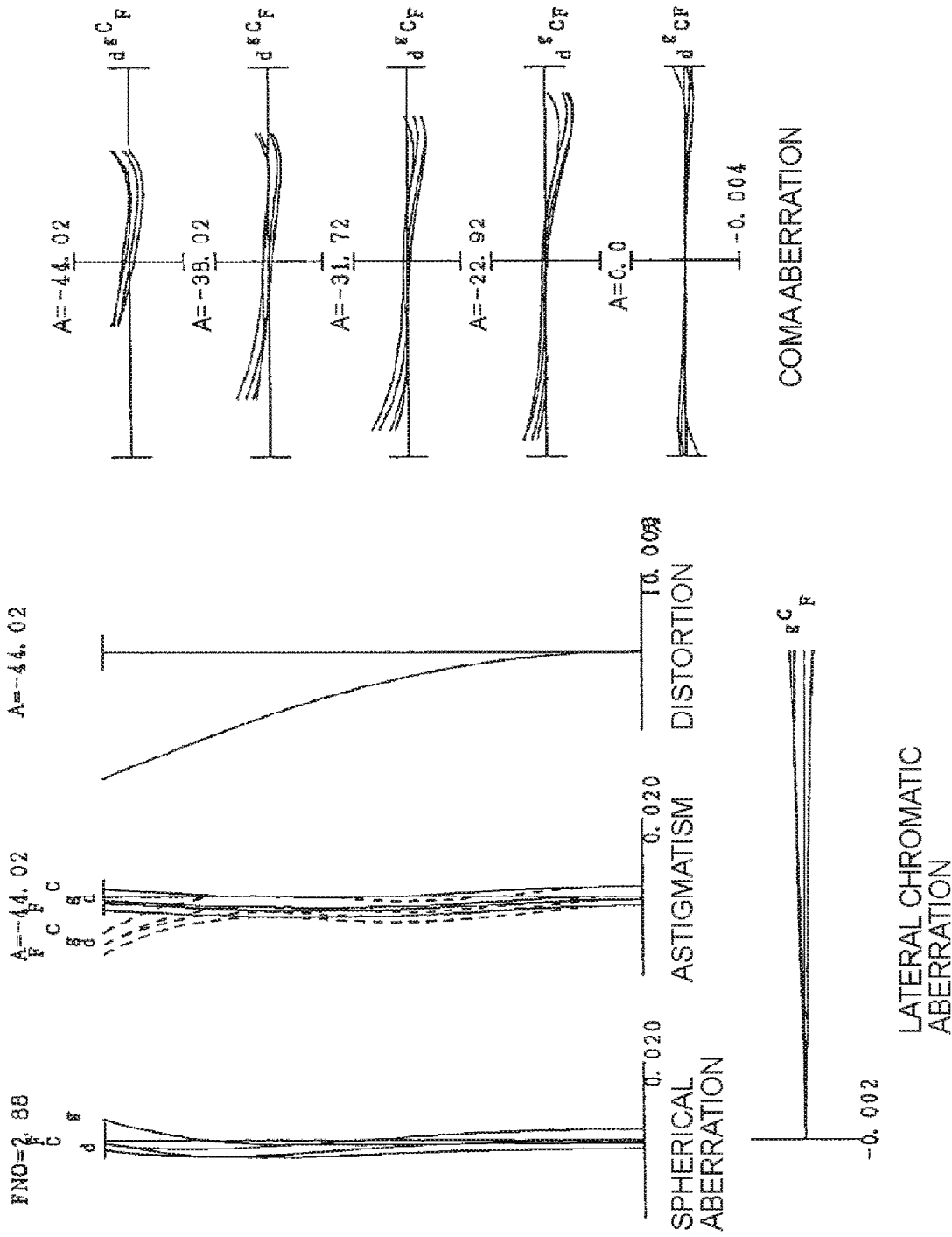

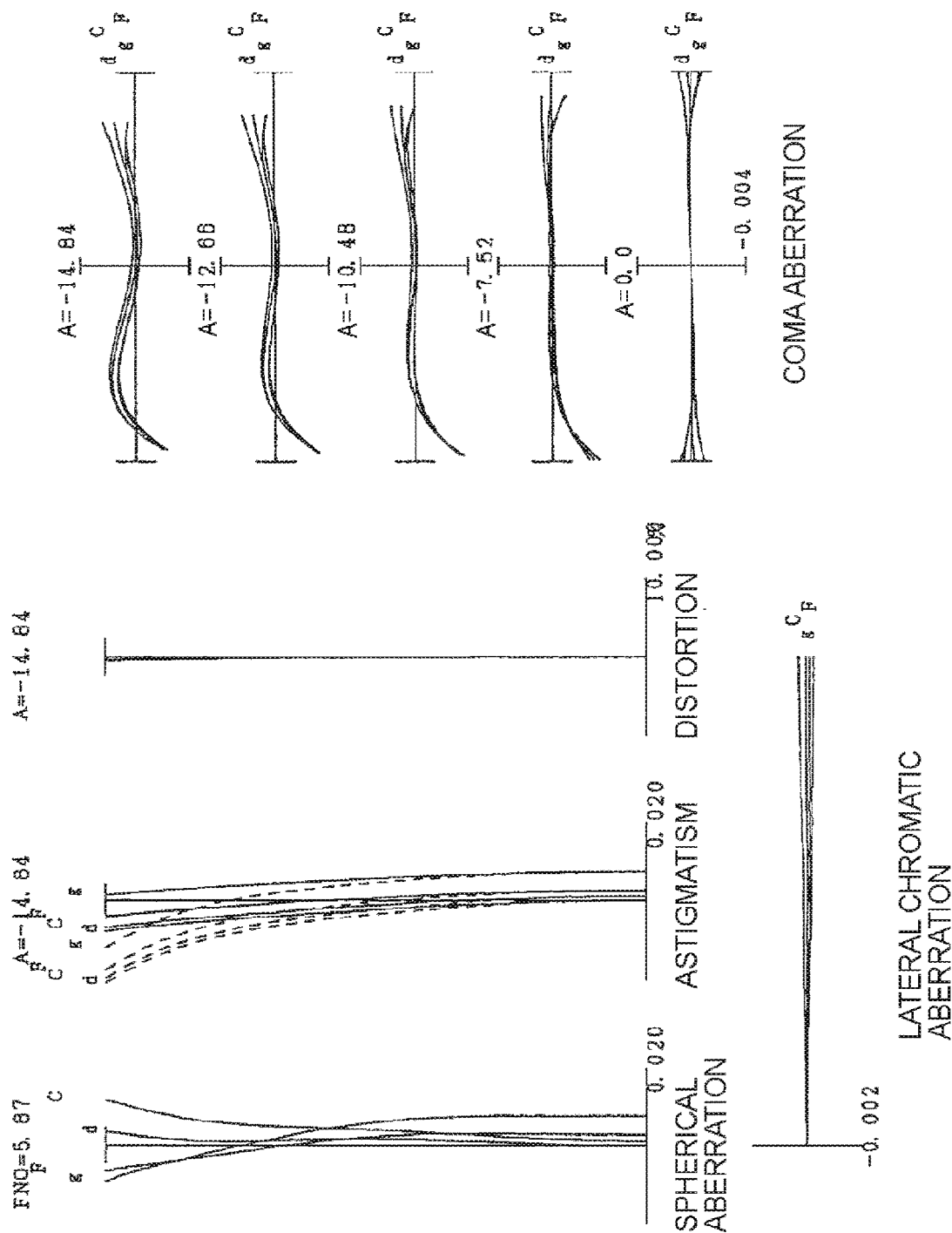

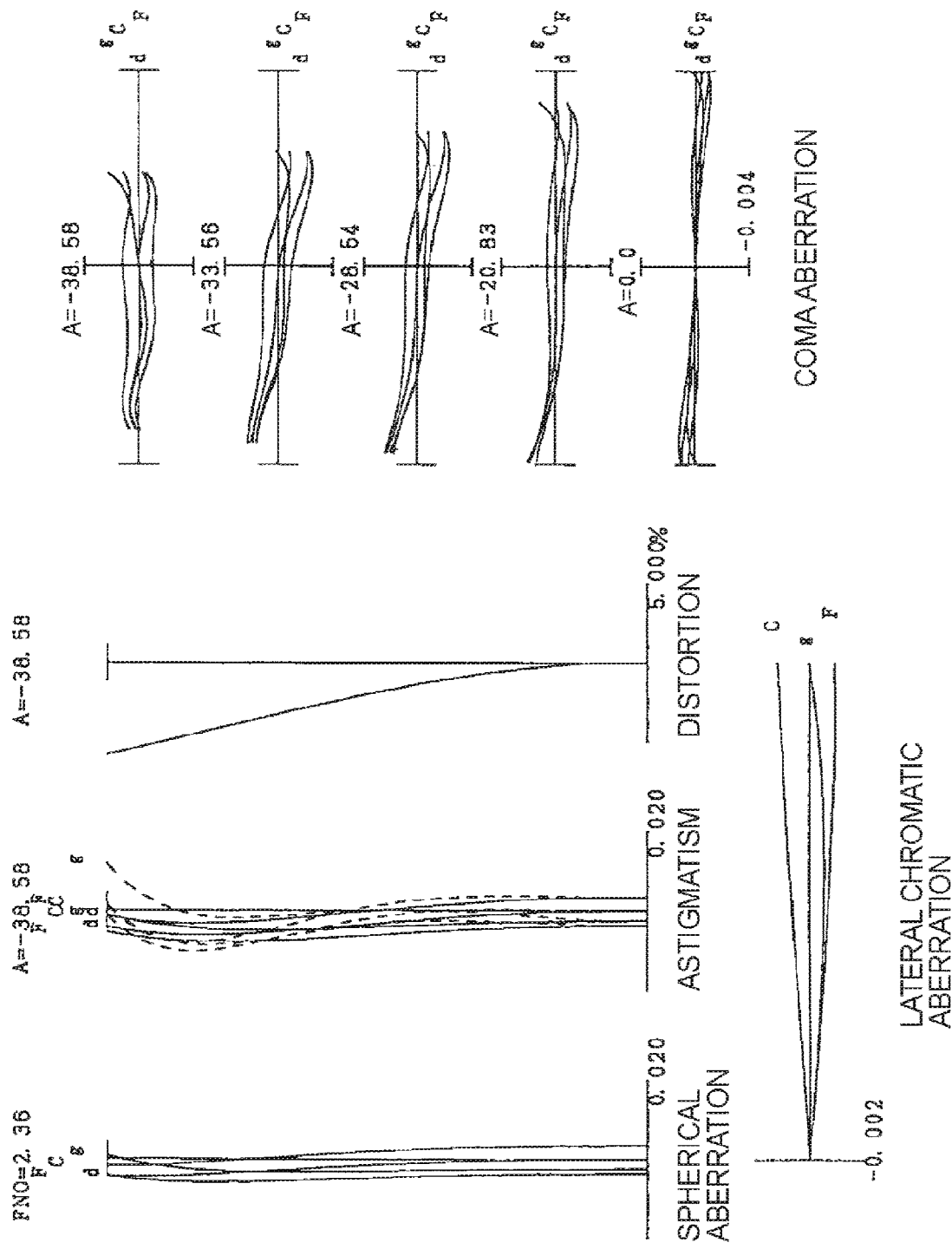

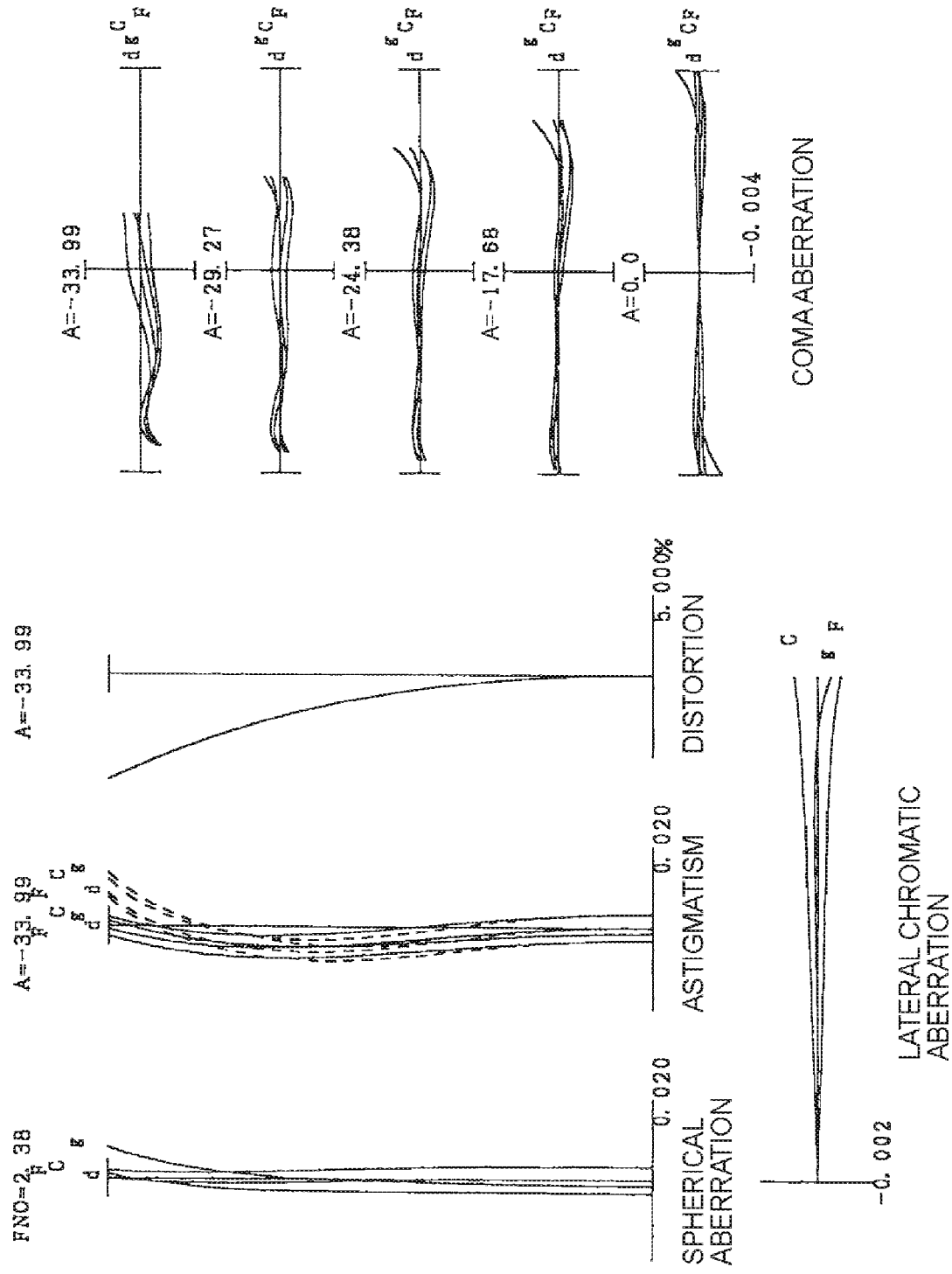

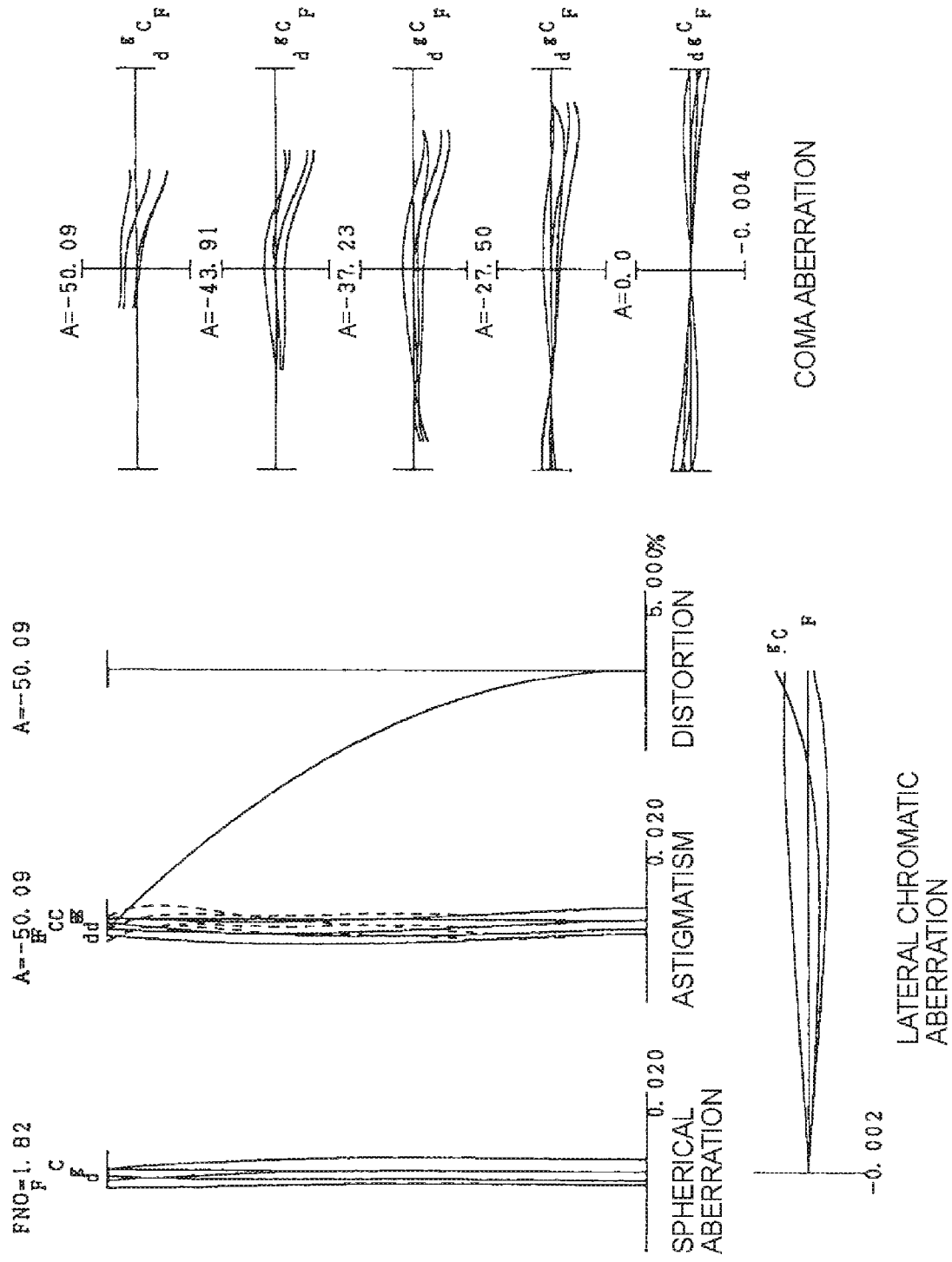

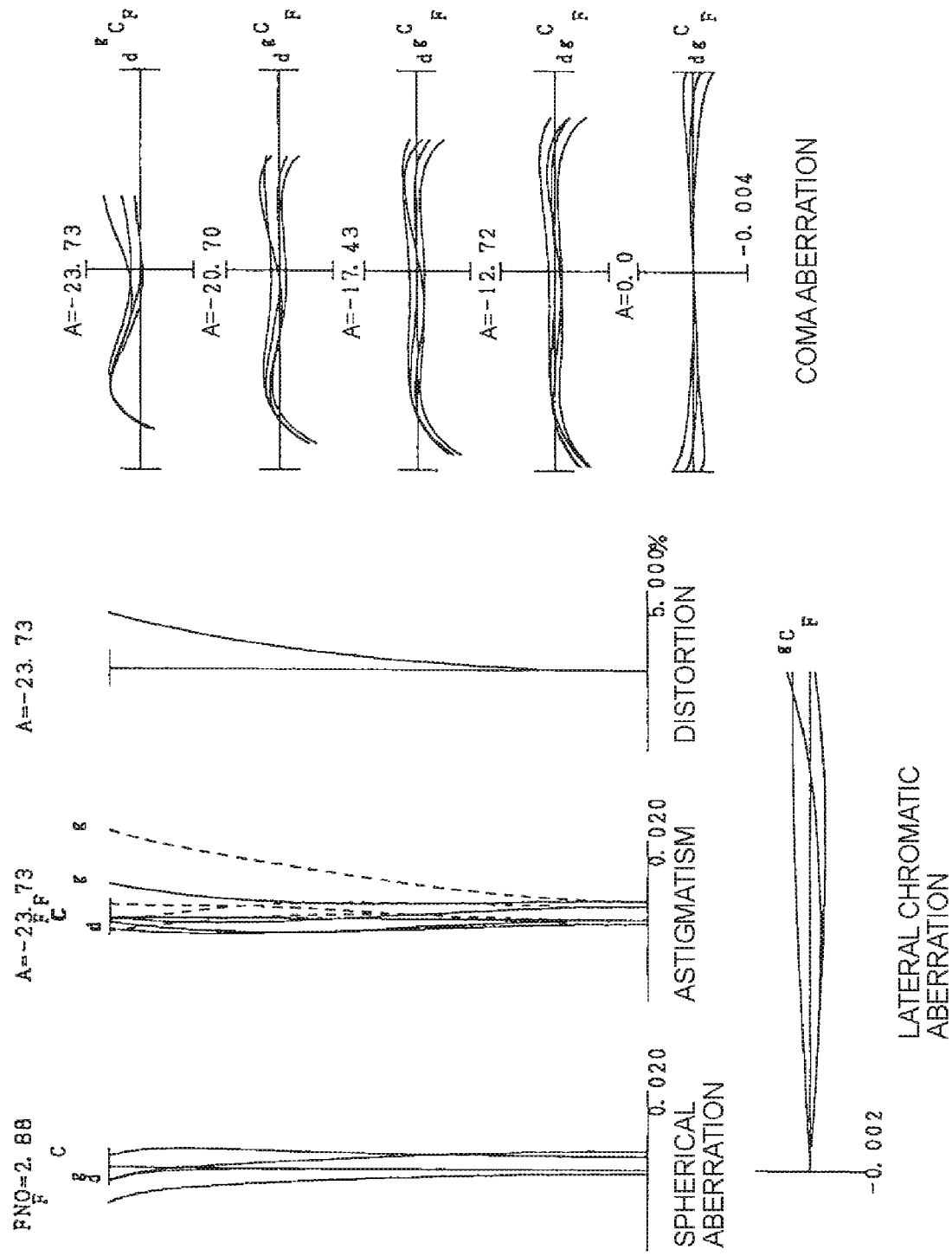

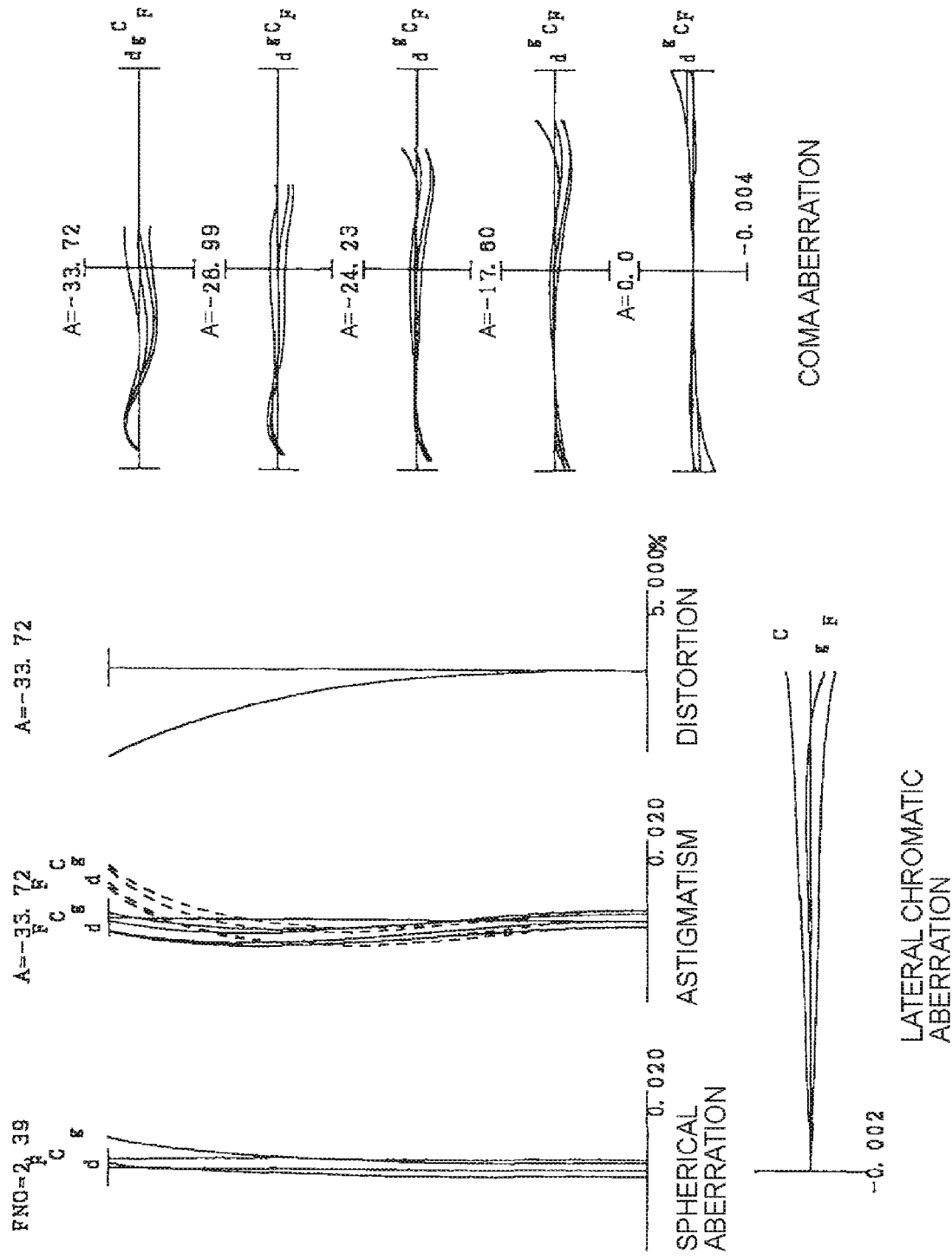

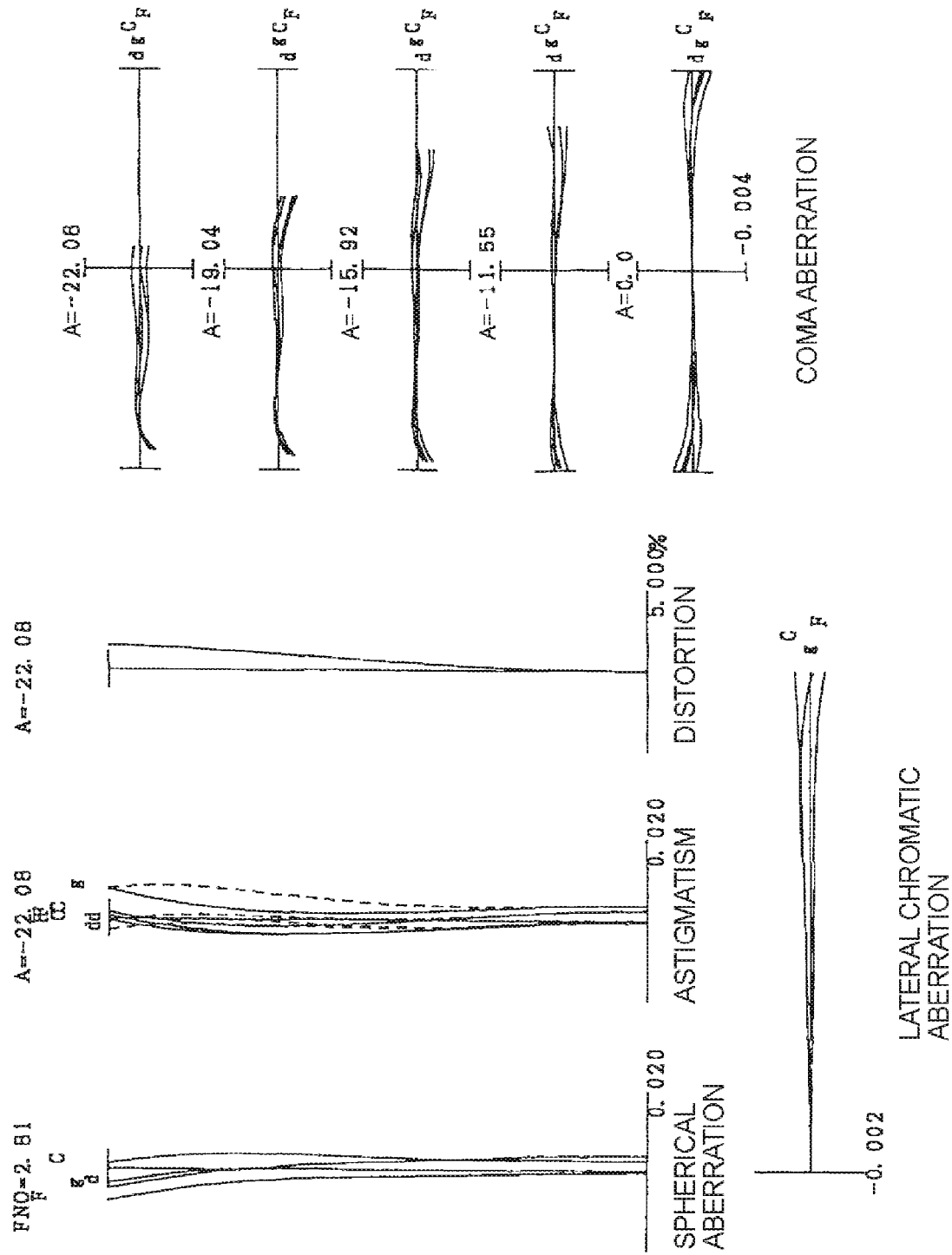

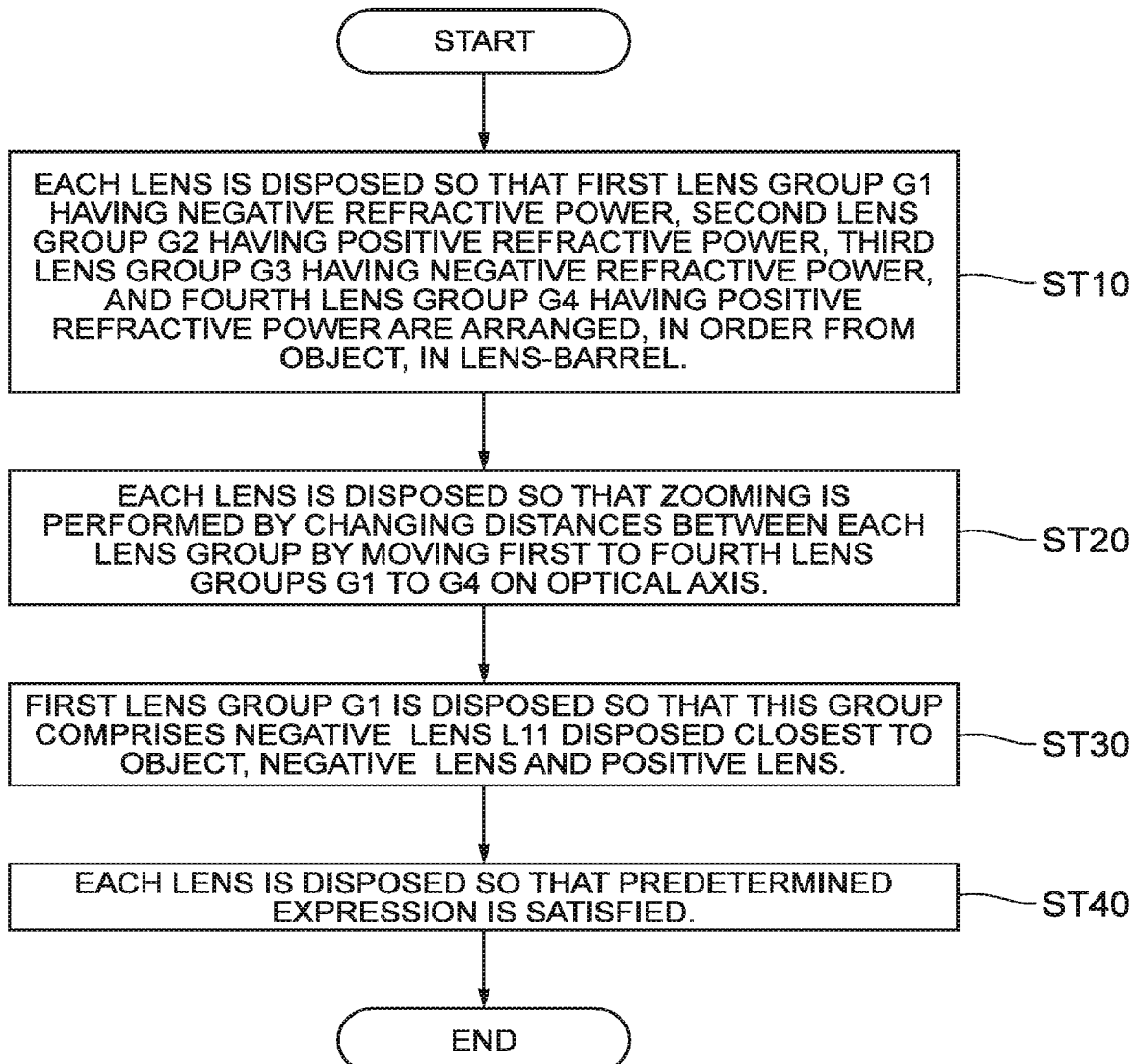

ZOOM LENS, OPTICAL APPARATUS, AND A MANUFACTURING METHOD OF THE ZOOM LENS

TECHNICAL FIELD

The present invention relates to a zoom lens, optical apparatus, and a manufacturing method of the zoom lens.

TECHNICAL BACKGROUND

Conventionally, small zoom lenses are proposed (for example, refer to Patent Document 1).

PRIOR ARTS LIST

Patent Document

Patent Document 1: Japanese Laid-Open Patent Publication No. 2012-027283A

SUMMARY OF THE INVENTION

Problems to be Solved by the Invention

In recent years, regarding zoom lenses, an angle of view in a wide-angle end state is further expected to be widen while achieving downsizing.

The present invention is derived in view of such a problem, and aims to provide a zoom lens, an optical apparatus, and a manufacturing method of the zoom lens which is small, however has a wide-angle of view in a wide-angle end state with outstanding optical performance.

Means to Solve the Problems

In order to solve such a purpose, a zoom lens according to the present invention, comprises, in order from an object, a first lens group having a negative refractive power, a second lens group having a positive refractive power, a third lens group having a negative refractive power, and a fourth lens group having a positive refractive power, wherein the first lens group, the second lens group, the third lens group, and the fourth lens group move on an optical axis so that zooming is performed by changing distances between each lens group, wherein the first lens group comprises a negative lens disposed closest to the object, a negative lens, and a positive lens, wherein the following conditional expressions is satisfied:

$$0.30 < D3W/D3T < 1.10$$

however, where D3W denotes an air interval between the third lens group and the fourth lens group in a wide-angle end state, and D3T denotes an air interval between the third lens group and the fourth lens group in a telephoto end state.

In the zoom lens according to the present invention, it is preferable that the following conditional expression is satisfied:

$$0.50 < M4/M3 < 1.00$$

however, where M3 denotes an amount of movement on the optical axis of the third lens group upon zooming from the wide-angle end state to the telephoto end state, and M4 denotes an amount of movement on the optical axis of the fourth lens group upon zooming from the wide-angle end state to the telephoto end state.

In the zoom lens according to the present invention, it is preferable that the following conditional expression is satisfied:

$$0.05 < BFw/(fw^2+ft^2)^{1/2} < 0.50$$

however, where BFw denotes an air equivalent distance from a lens rear end surface of the zoom lens in the wide-angle end state to an image surface thereof, fw denotes a focal length of the zoom lens in the wide-angle end state, and ft denotes a focal length of the zoom lens in the telephoto end state.

In the zoom lens according to the present invention, it is preferable that the following conditional expression is satisfied:

$$1.00 < \Sigma dw/\Sigma dt < 2.00$$

however, where $\Sigma dw$ denotes a distance from a lens front end surface to the lens rear end surface of the zoom lens in the wide-angle end state, and $\Sigma dt$ denotes a distance from the lens front end surface to the lens rear end surface of the zoom lens in the telephoto end state.

In the zoom lens according to the present invention, it is preferable that the first lens group is composed of, in order from the object, a meniscus-shaped negative lens having a concave surface facing an image, a biconcave negative lens, and a meniscus-shaped positive lens having a convex surface facing the object.

In the zoom lens according to the present invention, it is preferable that the fourth lens group is composed of one lens, wherein the following conditional expression is satisfied:

$$2.30 < f4/fw < 9.00$$

however, where f4 denotes a focal length of the fourth lens group, and fw denotes a focal length of the zoom lens in the wide-angle end state.

In the zoom lens according to the present invention, it is preferable that the following conditional expression is satisfied:

$$0.80 < (-f1)/f2 < 1.50$$

however, where f1 denotes a focal length of the first lens group, and f2 denotes a focal length of the second lens group.

In the zoom lens according to the present invention, it is preferable that the third lens group is composed of a cemented lens having a negative refractive power.

In the zoom lens according to the present invention, it is preferable that the third lens group is composed of one negative lens.

In the zoom lens according to the present invention, it is preferable that the second lens group comprises a positive lens closest to the object.

In the zoom lens according to the present invention, it is preferable that the second lens group comprises, in order from the object, a positive lens, a cemented lens which is composed of a positive lens and a negative lens.

In the zoom lens according to the present invention, it is preferable that the second lens group comprises a positive lens closest to the object, wherein the positive lens has an aspherical surface.

The optical apparatus according to the present invention is equipped with any one of the above mentioned zoom lenses.

A manufacturing method of a zoom lens according to the present invention is a manufacturing method of a zoom lens comprising, in order from an object, a first lens group having a negative refractive power, a second lens group having a positive refractive power, a third lens group having a negative refractive power, and a fourth lens group having a positive refractive power, wherein the first lens group, the second lens group, the third lens group, and the fourth lens group move on an optical axis so that zooming is performed by changing distances between each lens group thereof, wherein the first lens group comprises a negative lens disposed closest to the object, a negative lens, and a positive lens, wherein each lens is arranged so that the following conditional expression is satisfied:

$$0.30 < D3W/D3T < 1.10$$

however, where D3W denotes an air interval between the third lens group and the fourth lens group in the wide-angle end state, and D3T denotes an air interval between the third lens group and the fourth lens group in the telephoto end state.

In the manufacturing method of the zoom lens according to the present invention, it is preferable that each lens is disposed in a lens-barrel so that the following conditional expression is satisfied:

$$0.50 < M4/M3 < 1.00$$

however, where M3 denotes an amount of movement on the optical axis of the third lens group upon zooming from the wide-angle end state to the telephoto end state, and M4 denotes an amount of movement on the optical axis of the fourth lens group upon zooming from the wide-angle end state to the telephoto end state.

In the manufacturing method of the zoom lens according to the present invention, it is preferable that each lens is arranged in the lens-barrel so that the following conditional expression is satisfied:

$$0.05 < BFw/(fw^2+ft^2)^{1/2} < 0.50$$

however, where BFw denotes an air equivalent distance from the lens rear end surface of the zoom lens in the wide-angle end state to an image surface thereof, fw denotes a focal length of the zoom lens in the wide-angle end state, and ft denotes a focal length of the zoom lens in the telephoto end state.

In the manufacturing method of the zoom lens according to the present invention, it is preferable that each lens is arranged in the lens-barrel so that the following conditional expression is satisfied:

$$1.00 < \Sigma dw/\Sigma dt < 2.00$$

however, where $\Sigma dw$ denotes a distance from the lens front end surface to the lens rear end surface of the zoom lens in the wide-angle end state thereof, and $\Sigma dt$ denotes a distance from the lens front end surface to the lens rear end surface of the zoom lens in the telephoto end state thereof.

Advantageous Effects of the Invention

According to the present invention, it is possible to provide a zoom lens, an optical apparatus, and a manufacturing method of the zoom lens which is small, however has a wide-angle of view in the wide-angle end state, and outstanding optical performance.

BRIEF DESCRIPTION THE DRAWINGS

FIG. 1A depicts a position of each lens group in a wide-angle end state (W), FIG. 1B depicts that in an intermediate focal length state (A), and FIG. 1C depicts that in a telephoto end state (T).

FIGS. 2A to 2C illustrate graphs showing various aberrations of the zoom lens according to Example 1, where FIG. 2A depicts graphs showing various aberrations upon focusing infinity in the wide-angle end state, FIG. 2B depicts those in the intermediate focal length state, and FIG. 2C illustrates those in the telephoto end state.

FIG. 3A depicts a position of each lens group in a wide-angle end state, FIG. 3B depicts that in an intermediate focal length state, and FIG. 3C depicts that in a telephoto end state.

FIGS. 4A to 4C illustrate graphs showing various aberrations of the zoom lens according to Example 2, where FIG. 4A depicts graphs showing various aberrations upon focusing infinity in the wide-angle end state, FIG. 4B depicts those in the intermediate focal length state, and FIG. 4C depicts those in the telephoto end state.

FIG. 5A depicts a position of each lens group in a wide-angle end state, FIG. 5B depicts that in an intermediate focal length state, and FIG. 5C depicts that in a telephoto end state.

FIGS. 6A to 6C illustrate graphs showing various aberrations of the zoom lens according to Example 3, where FIG. 6A depicts graphs showing various aberrations upon focusing infinity in the wide-angle end state, FIG. 6B depicts ones in the intermediate focal length state, and FIG. 6C depicts those in the telephoto end state.

FIG. 7A depicts a position of each lens group in a wide-angle end state, FIG. 7B depicts that in an intermediate focal length state, and FIG. 7C depicts that in a telephoto end state.

FIGS. 8A to 8C illustrate graphs showing various aberrations of the zoom lens according to Example 4, where FIG. 8A depicts graphs showing various aberrations upon focusing infinity in the wide-angle end state, FIG. 8B depicts those in the intermediate focal length state, and FIG. 8C depicts those in the telephoto end state.

FIG. 9A depicts a position of each lens group in a wide-angle end state, FIG. 9B depicts that in an intermediate focal length state, and FIG. 9C depicts that in a telephoto end state.

FIGS. 10A to 10C illustrate graphs showing various aberrations of the zoom lens according to Example 5, where FIG. 10A depicts graphs showing various aberrations upon focusing infinity in the wide-angle end state, FIG. 10B depicts those in the intermediate focal length state, and FIG. 10C depicts those in the telephoto end state.

FIG. 11A depicts a position of each lens group in a wide-angle end state, FIG. 11B depicts that in an intermediate focal length state, and FIG. 11C depicts that in a telephoto end state.

FIGS. 12A, 12B and 12C illustrate graphs showing various aberrations of the zoom lens according to Example 6, where FIG. 12A depicts graphs showing various aberrations upon focusing infinity in the wide-angle end state, FIG. 12B depicts those in the intermediate focal length state, and FIG. 12C depicts those in the telephoto end state.

FIG. 13A depicts a position of each lens group in a wide-angle end state, FIG. 13B depicts that in an intermediate focal length state, and FIG. 13C depicts that in a telephoto end state.

FIG. 14A to 14C illustrate graphs showing various aberrations of the zoom lens according to Example 7, where FIG. 14A depicts graphs showing various aberrations upon focusing infinity in the wide-angle end state, 14B depicts those in the intermediate focal length state, and FIG. 14C depicts those in the telephoto end state.

FIG. 17 is a flowchart illustrating a manufacturing method of the zoom lens.

DESCRIPTION OF THE EMBODIMENT

Figure 1A:
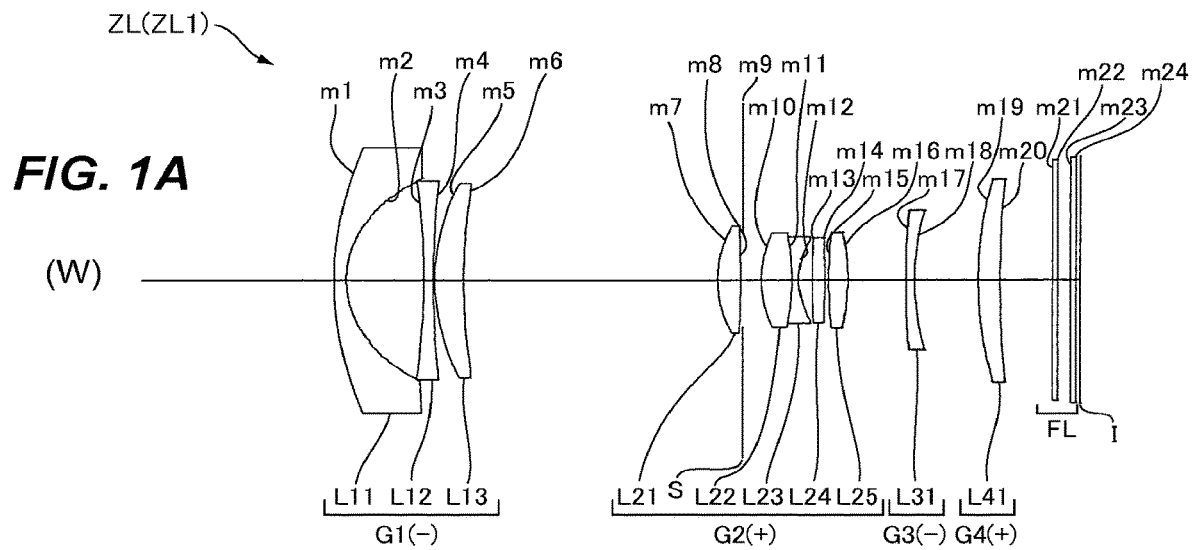
FIGS. 1A to 1C are sectional views illustrating a configuration of a zoom lens according to Example 1, where
Figure 1B:
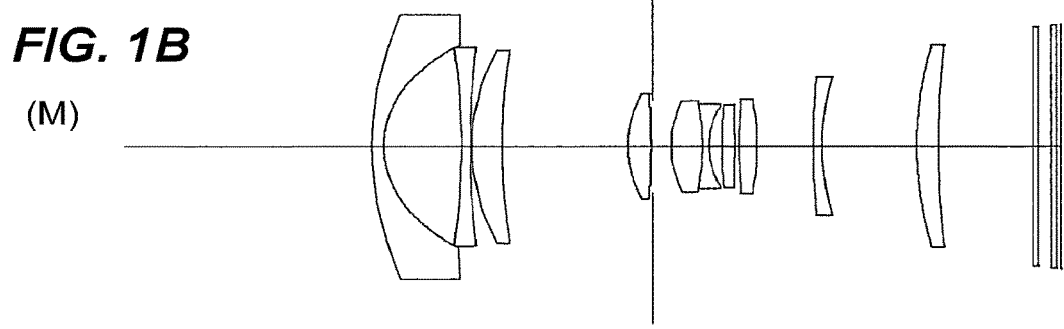
Figure 1C:
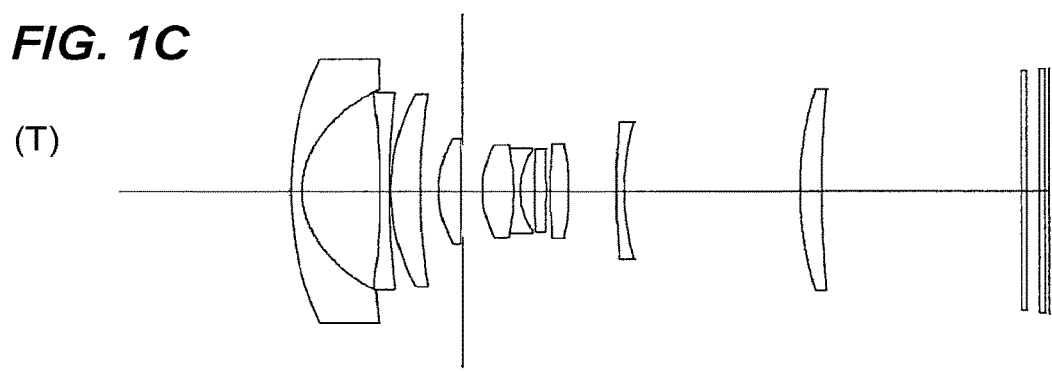

An embodiment will now be explained with reference to the drawings. A zoom lens ZL according to the present embodiment comprises, in order from an object as illustrated in FIGS. 1A to 1C, a first lens group G1 having a negative refractive power, a second lens group G2 having a positive refractive power, a third lens group G3 having a negative refractive power, and a fourth lens group G4 having a positive refractive power, wherein the first lens group G1, the second lens group G2, the third lens group G3, and the fourth lens group G4 move on an optical axis so that zooming is performed by changing distances between each lens group, wherein the first lens group G1 comprises a negative lens L11 disposed closest to the object, a negative lens, and a positive lens (corresponding to the lens L12 and the lens L13 in FIG. 1, wherein the following conditional expression (1) is satisfied.

Generally, in designing an imaging optical system such as a photographic lens, etc., it is difficult to attain downsizing synchronously while enlarging an angle of view, in view of correcting various aberrations. However, according to the zoom lens ZL of the present embodiment, it is possible to achieve downsizing while enlarging an angle of view, and to appropriately correct various aberrations such as spherical aberration and coma aberration, etc.

$$0.30 < D3W/D3T < 1.10 \tag{1}$$

however,

D3W denotes an air interval between the third lens group G3 and the fourth lens group G4 in the wide-angle end state, and D3T denotes an air interval between the third lens group G3 and the fourth lens group G4 in the telephoto end state.

The conditional expression (1) is a conditional expression which defines an air interval between the third lens group G3 and the fourth lens group G4 in the wide-angle end state and the telephoto end state (a distance on the optical axis from a lens surface closest to the image of the third lens group G3 in the wide-angle end state, to a lens surface closest to the object of the lens group G4). By satisfying with the conditional expression (1), it is possible to properly correct coma aberration, astigmatism, and lateral chromatic aberration while suppressing a change of an incident angle to the imaging surface by zooming. When deceeding the lower limit of the conditional expression (1), this is an advantageous in favor of correcting coma aberration, astigmatism and lateral chromatic aberration, however, since air intervals between the third lens group G3 and the fourth lens group G4 greatly change in a wide-angle end state and in a telephoto end state, the change of the incident angle to the imaging surface upon zooming becomes great, thus it is not appreciated. When exceeding the upper limit of the conditional expression (1), since it becomes difficult to correct coma aberration, astigmatism, and lateral chromatic aberration while attaining downsizing, thus it is not appreciated.

In order to ensure the advantageous effect of the present embodiment, it is preferable to set the lower limit of the conditional expression (1) to 0.33. In order to ensure the advantageous effect of the present embodiment, it is preferable to set the lower limit of the conditional expression (1) to 0.36.

In order to ensure the advantageous effect of the present embodiment, it is preferable to set the upper limit of the conditional expression (1) to 1.05. In order to ensure the advantageous effect of the present embodiment, it is preferable to set the upper limit of the conditional expression (1) to 1.01.

Regarding the zoom lens ZL according to the present embodiment, it is preferable that the following conditional expression (2) is satisfied:

$$0.50 < M4/M3 < 1.00 \tag{2}$$

however, where M3 denotes an amount of movement on the optical axis of the third lens group G3 upon zooming from a wide-angle end state to a telephoto end state, and M4 denotes an amount of movement on the optical axis of the fourth lens group G4 upon zooming from the wide-angle end state to the telephoto end state.

A conditional expression (2) is a conditional expression which defines a ratio of an amount of movement of the third lens group G3 and the fourth lens group G4 upon zooming from the wide-angle end state to the telephoto end state. By satisfying the conditional expression (2), it is possible to properly correct coma aberration, astigmatism and lateral chromatic aberration, while suppressing the change of the incident angle to the imaging surface. When deceeding the lower limit of the conditional expression (2), the third lens group G3 and the fourth lens group G4 are placed away from each other in the wide-angle end state, it is difficult to correct astigmatism and lateral chromatic aberration, thus this is not appreciated. When exceeding the upper limit of the conditional expression (2), this is advantageous for correcting chromatic aberration, etc., however, when performing a focus for downsizing by the third lens group G3 or the forth lens group G4, the refractive power of a focal group must be improved, it is difficult to correct astigmatism and coma aberration, and it is not appreciated.

In order to ensure the advantageous effect of the present embodiment, it is preferable to set the upper limit of the conditional expression (2) to 0.996.

In the zoom lens ZL according to the present embodiment, it is preferable that the following conditional expression (3) is satisfied:

$$0.05<BFw/(fw^2+ft^2)^{1/2}<0.50 \quad (3)$$

however, where BFw denotes an air equivalent distance from an lens rear end surface of the zoom lens in the wide-angle end state ZL to an image surface thereof, fw denotes a focal length of the zoom lens ZL in the wide-angle end state, and ft denotes a focal length of the zoom lens ZL in the telephoto end state.

A conditional expression (3) is a conditional expression which defines an optical back focus for downsizing and an aberration correction in the zoom lens ZL of the present embodiment. When deceeding the lower limit of the conditional expression (3), it is advantageous for downsizing, however, since there is less distance in which a filter, etc. is disposed between the lens rear end surface and the imaging surface, thus it is not appreciated. Moreover, astigmatism and coma aberration become worse. When exceeding the upper limit of the conditional expression (3), it is advantageous for disposing a filter, etc., however, it is not appreciated in view of downsizing. Moreover, astigmatism and coma aberration become worse.

In order to ensure the advantageous effect of the present embodiment, it is preferable to set the lower limit of the conditional expression (3) to 0.08. In order to ensure the advantageous effect of the present embodiment, it is preferable to set the upper limit of the conditional expression (3) to 0.46.

Regarding the zoom lens ZL according to the present embodiment, it is preferable that the following conditional expression (4) is satisfied:

$$1.00<\Sigma dw/\Sigma dt<2.00 \quad (4)$$

however, where $\Sigma dw$ denotes a distance from an lens front end surface to the lens rear end surface of the zoom lens ZL in the wide-angle end state, and $\Sigma dt$ denotes a distance from the lens front end surface to the lens rear end surface of the zoom lens ZL in the telephoto end state.

The conditional expression (4) is a conditional expression which defines a change of the incident angle to the imaging surface upon zooming, and a change of a lens thickness appropriate to correct various aberrations. When deceeding the lower limit of the conditional expression (4), it becomes advantageous for downsizing, however since the change of the incident angle to the imaging surface becomes large too much, thus it is not appreciated. Moreover, spherical aberration and coma aberration become worse. When exceeding the upper limit of the conditional expression (4), an incident angle to the imaging surface becomes small, however it is difficult to correct coma aberration and astigmatism, thus this is not appreciated.

In order to ensure the advantageous effect of the present embodiment, it is preferable to set the lower limit of the conditional expression (4) to 1.03. In order to ensure the advantageous effect of the present embodiment, it is preferable to set the upper limit of the conditional expression (4) to 1.55.

In the zoom lens ZL according to the present embodiment, it is preferable that the first lens group is composed of, in order from the object, a meniscus-shaped negative lens L11 having a concave surface facing the image, a biconcave negative lens L12, and a meniscus-shape positive lens L13 having a convex surface facing the object.

With this arrangement, it is possible to properly correct imaging surface curvature, astigmatism, and lateral chromatic aberration in a lens whole system with an angle of view enlarged.

In the zoom lens ZL according to the present embodiment, it is preferable that the fourth lens group G4 is composed of one lens, and the following conditional expression (5) is satisfied:

$$2.30<f4/fw<9.00 \quad (5)$$

however, where f4 denotes a focal length of the fourth lens group G4, and fw denotes a focal length of the zoom lens ZL in a wide-angle end state.

The conditional expression (5) is a conditional expression which defines an optimal focal length of the fourth lens group G4 most appropriated for downsizing of the lens and correcting various aberrations. When deceeding the lower limit of the conditional expression (5), since the focal length of the fourth lens group G4 is too short and it is disadvantageous for downsizing the lens, thus it is not appreciated. Moreover, coma aberration and imaging surface curvature become worse. When exceeding the upper limit of the conditional expression (5), it is advantageous for downsizing, however, the incident angle to the imaging surface becomes large, it is not appreciated. Moreover, coma aberration and imaging surface curvature become worse.

In order to ensure the advantageous effect of the present embodiment, it is appreciated to set the lower limit of the conditional expression (5) to 2.50. In order to ensure the advantageous effect of the present embodiment, it is preferable to set the upper limit of the conditional expression (5) to 8.00.

In the zoom lens ZL according to the present embodiment, it is preferable that the following conditional expression (6) is satisfied:

$$0.80<(-f1)/f2<1.50 \quad (6)$$

however, where f1 denotes a focal length of the first lens group G1, and f2 denotes a focal length of the second lens group G2.

The conditional expression (6) is a conditional expression which defines a suitable focal length regarding the first lens group G1 and the second lens group G2 in order to balance downsizing of the lens and correcting aberration. When deceeding the lower limit of the conditional expression (6), the focal length of the first lens group G1 is short in comparison with the focal length of the second lens group G2, thus, it is difficult to correct spherical aberration, and coma aberration, etc. which occurred in the first lens group G1, thus it is not appreciated. When exceeding the upper limit of the conditional expression (6), it is disadvantageous for downsizing, thus it is not appreciated. Moreover, spherical aberration becomes worse.

In order to ensure the advantageous effect of the present embodiment, it is preferable to set the lower limit of the conditional expression (6) to 1.10. In order to ensure the advantageous effect of the present embodiment, it is appreciated to set the upper limit of the conditional expression (6) to 1.20.

In the zoom lens ZL according to the present embodiment, it is preferable that the third lens group G3 is composed of a cemented lens having a negative refractive power.

With this arrangement, it is possible to minimize a coma aberration fluctuation and an imaging surface fluctuation when zooming, while downsizing a lens, and properly correct axial chromatic aberration and a lateral chromatic aberration in a lens whole system.

In the zoom lens ZL according to the present embodiment, it is preferable that the third lens group G3 is composed of one negative lens.

With this arrangement, it is possible to correct a coma aberration fluctuation and imaging surface curvature fluctuation when zooming, while downsizing the lens.

In the zoom lens ZL according to the present embodiment, it is preferable that the second lens group G2 has a positive lens L21 closest to the object.

With this arrangement, it is possible to properly correct spherical aberration and coma aberration which occurred in the first lens group G1.

In the zoom lens ZL according to the present embodiment, it is appreciated that the second lens group G2 has, in order from the object, a positive lens L21, and a cemented lens composed of a positive lens L22 and a negative lens L23.

With this arrangement, it is possible to correct spherical aberration, astigmatism, coma aberration, and chromatic aberration while downsizing the lens.

In the zoom lens ZL according to the present embodiment, it is preferable that the positive lens L21 arranged closest to the object within the second lens group G2 has an aspherical surface.

With this arrangement, it is possible to properly correct spherical aberration, astigmatism, and coma aberration while downsizing a lens.

According to the zoom lens ZL of the present embodiment equipped with the above configurations, although this is small, however it is possible to realize a zoom lens with an angle of view enlarged in the wide-angle end state, and have outstanding optical performance.

Figure 15A:
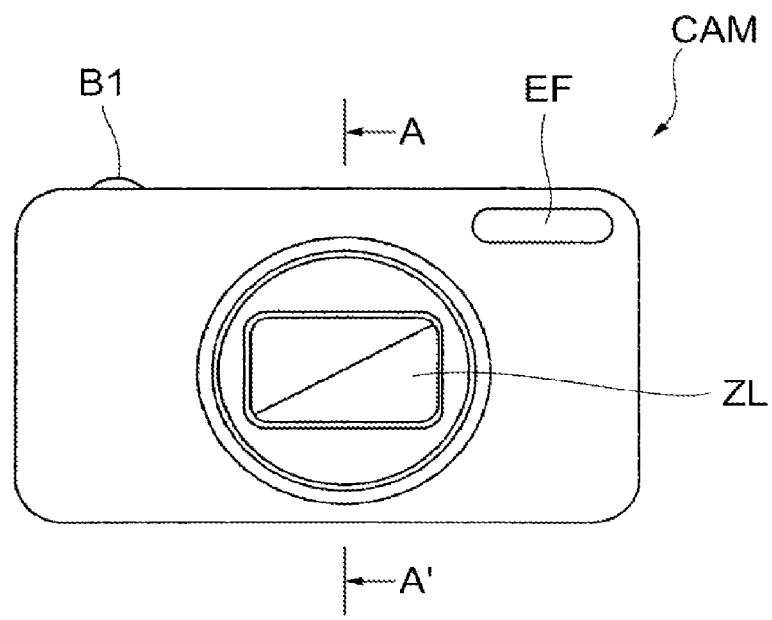
FIG. 15A is a front elevation view of a digital still camera.
Figure 15B:
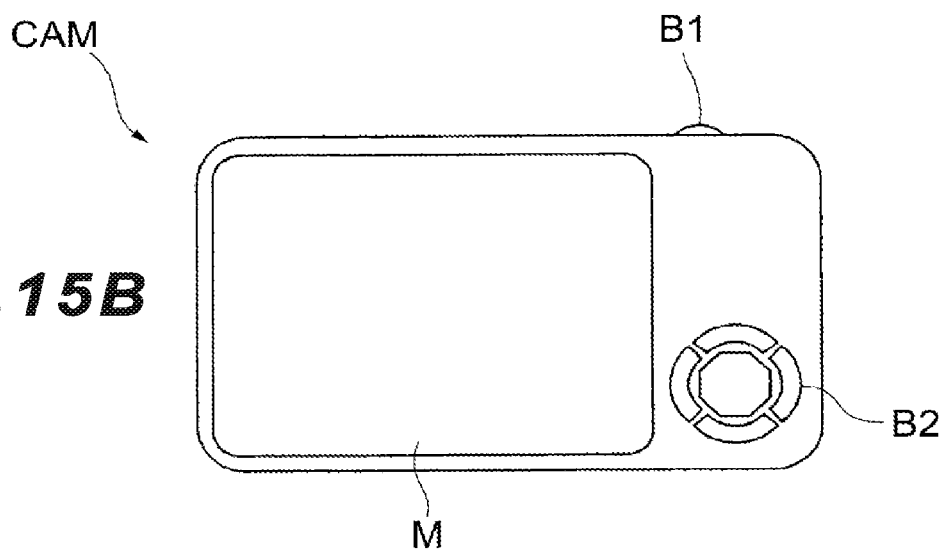
FIG. 15B is a rear view of the digital still camera.
Figure 16:
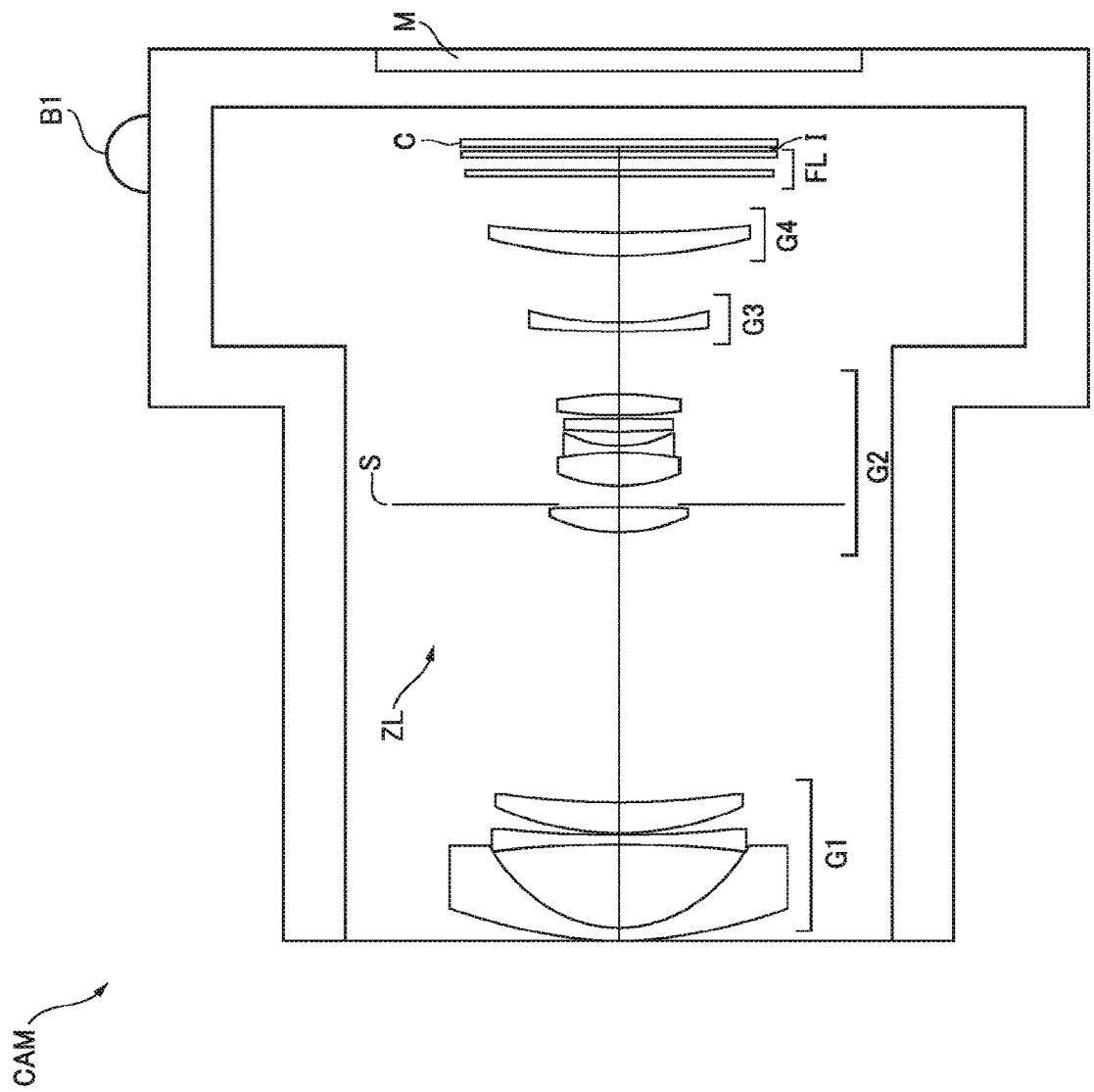
FIG. 16 is a sectional view along an arrow A-A' in FIG. 15A.

FIGS. 15A and 15B and FIG. 16 illustrate configurations of a digital still camera CAM (optical apparatus) as an optical apparatus equipped with the zoom lens ZL. In this digital still camera CAM, when a power button is pressed, a not illustrated shutter of a photographing lens (zoom lens ZL) opens, light from a photographic subject (object) are collected with the zoom lens ZL, and this is imaged by an image element C (for instance, a CCD or a CMOS, etc.) disposed on an image surface I (refer to FIG. 1). The photographic subject image imaged by the image element C is displayed on a liquid crystal display monitor M provided behind the digital still camera CAM. A photographer photos, after deciding a composition of a photographic subject image while looking at the liquid crystal display monitor M, the photographic subject by the image element C by pressing a shutter release button B1, and records and stores it in a not illustrated memory.

The camera CAM is provided with a fill light flushing unit EF which emits fill light when a photographic subject is dark, and a function button B2, etc. used for setting various conditions, etc. of the digital still camera CAM. Although a compact type camera in which a camera CAM and a zoom lens ZL are fabricated together is exampled herewith, it is applicable to a single-lens reflex camera, as an optical apparatus, in which a lens-barrel having the zoom lens ZL is attachable and detachable with a camera body.

According to the camera CAM of the present embodiment equipped with the above configurations, by having the zoom lens ZL described above as a photographing lens, although this is small, however it is possible to realize a camera with an angle of view in the wide-angle end state enlarged, and having outstanding optical performance.

Next, referring to FIG. 17, a manufacturing method of the zoom lens ZL described above will be outlined. Firstly, each lens is disposed so that the first lens group G1 having a negative refractive power, the second lens group G2 having a positive refractive power, the third lens group G3 having a negative refractive power, and the fourth lens G4 having a positive refractive power are arranged in order from the object in a lens-barrel (Step ST10). Here, each lens is arranged so that zooming is performed by changing distances between each lens group by moving the first lens group G1, the second lens group G2, the third lens group G3, and the fourth lens group G4 on the optical-axis (Step ST20). The first lens group G1 is arranged so that this has a negative lens L11 arranged closest to the object, a negative lens, and a positive lens (Step ST30). Each lens is arranged so that the following conditional expression (1) is satisfied (Step ST40):

$$0.30 < D3W/D3T < 1.10 \qquad (1)$$

however, where D3W denotes an air interval between the third lens group G3 and the fourth lens group G4 in the wide-angle end state, and D3T denotes an air interval between the third lens group G3 and the fourth lens group G4 in the telephoto end state.

In the manufacturing method of the zoom lens ZL according to the present embodiment, it is preferable to arrange each lens in the lens-barrel so that the above-mentioned conditional expression (2) is satisfied.

In the manufacturing method of the zoom lens ZL according to the present embodiment, it is preferable to arrange each lens in the lens-barrel so that the above-mentioned conditional expression (3) is satisfied.

In the manufacturing method of the zoom lens ZL according to the present embodiment, it is preferable to arrange each lens in the lens-barrel so that the above-mentioned conditional expression (4) is satisfied.

Specifically speaking, in the present embodiment, for example in order from the object as illustrated in FIGS. 1A to 1C, the first lens group G1 is composed of the meniscus-shaped negative lens L11 having a concave surface facing the image, the biconcave negative lens L12, the meniscus-shaped positive lens L13 having a concave surface facing the object, the second lens group G2 is composed of the biconvex positive lens L21, an aperture stop S aiming at adjusting a quantity of light, the cemented lens composed of the biconvex positive lens L22 and the biconcave negative lens L23, the biconvex positive lens L24, and the biconvex positive lens L25, the third lens group G3 is composed of the meniscus-shaped negative lens L31 having a concave surface facing the image, and the forth lens group G4 is composed of the meniscus-shaped positive lens L41 having a convex surface facing the object. Each lens is disposed as mentioned above, the zoom lens ZL is manufactured.

According to the manufacturing method of the zoom lens ZL, although this is small, however it is possible to realize a zoom lens with an angle of view in the wide-angle end state enlarged, and having outstanding optical performance.

EXAMPLE

Next, each example according to the present embodiment is described referring to the drawings. Tables 1 to 7 are illustrated below, and these show tables of each data in Examples 1 to 7.

Note that each reference sign to FIGS. 1A to 1C according to Example 1 is independently used for each example in order to avoid the complicated explanation due to increasing the digit number of reference signs. Therefore, even if referred to the same reference sings shared with other drawings according to other examples, this does not necessarily mean they are the same configurations of the other examples.

In each example, as calculation targets of aberration characteristics, C-line (wave length of 656.2730 nm), d-line (wave length of 587.5620 nm), F-line (wave length of 486.1330 nm), and g-line (wave length of 435.8350 nm) are selected.

In [General Data] in tables, f means a focal length of the lens whole system, Fno means a F number, ω means a half angle of view (maximum incident angle, unit: degree), Y means an image height, BF means a back focus (what is carried out by performing air equivalent of a distance from a lens rear end surface to a paraxial image surface on the optical axis), and TL means a total lens length (what is added with BF to a distance from a lens front end surface to a lens rear end surface on the optical axis).

In [Lens Data] in tables, a surface number means an order of an optical surface from the object side along a direction in which a ray travels, R means a radius of curvature of each optical surface, D means a distance to the next lens surface, which is a distance on the optical axis from each optical surface to the next optical surface (or an image surface), nd means a refractive index to d-line of material of an optical member, and νd means an Abbe number on the basis of the d-line of material of the optical member. An object surface means a surface of an object, (variable) means a variable distance to the next lens surface, "∞" means a plane or an aperture, (stop S) means an aperture stop S, and an image surface means an image surface I. The refractive index of an air "1.00000" is omitted. In case that an optical surface has an aspherical surface, an "*" sign is given to the surface number, and a paraxial radius of curvature is illustrated in columns of the radius of curvature R.

In [aspherical surface data] in tables, regarding the aspherical surface shown in [Lens Data], its configuration is indicated with the following expression (a). X(y) means a distance along the optical axis from a tangent plane in a vertex of an aspherical surface to a location on the aspherical surface in height y, R means a radius of curvature (paraxial radius of curvature) of a standard spherical surface, κ means a cone constant, and Ai means an i-th aspherical surface coefficient. "E-n" means "×10$^{-n}$." For instance, 1.234E-05 is equal to 1.234×10$^{-5}$.

$$X(y)=(y^2/R)/\{1+(1-\kappa \times y^2/R^2)^{1/2}\}+A4 \times y^4+A6 \times y^6+A8 \times y^8+A10 \times y^{10} \quad (a)$$

[variable distance data] in tables show values Di of a valuable distance in each state such as a wide-angle end, an intermediate focal length, or a telephoto end. Note that Di indicates a variable distance between the i-th surface and the (i+1)-th surface.

In [Lens Group Data] in tables, G means a group number, a group first surface means a surface number closest to an object of each group, a group focal length means a focal length of each group, and a lens configuration length means a distance on the optical axis from a lens surface closest to the object in each group to a lens surface closest to the image.

[Conditional Expression] in tables shows values corresponding to the conditional expressions (1) to (6).

Hereinafter, in all general data values, regarding the focal length f shown, a radius of curvature R, a distance to the next lens surface D, and other lengths, etc. "mm" is generally used except a specific request, however a zoom lens is not limited to the above, since equivalent optical performance can be obtained even if the zoom lens is proportionally enlarged or proportionally shrunk. Moreover, the unit is not limited to "mm," can be used with another appropriate unit.

The explanations concerning the tables are common among all the examples, thus hereinafter the explanations are omitted.

Example 1

Example 1 is described using FIGS. 1A to 1C and 2A to 2C, and Table 1. The zoom lens ZL (ZL1) according to Example 1 is composed of, in order from the object as shown in FIGS. 1A to 1C, a first lens group G1 having a negative refractive power, a second lens group G2 having a positive refractive power, a third lens group G3 having a negative refractive power, and a fourth lens group G4 having a positive refractive power.

The first lens group G1 is composed of, in order from an object, a meniscus-shaped negative lens L11 having a concave surface facing an image, a biconcave negative lens L12, and a meniscus-shaped positive lens L13 having a convex surface facing an object. Note that an image side surface of the negative lens L11 has an aspherical surface.

The second lens group G2 is composed of, in order from an object, a biconvex positive lens L21, an aperture stop S aiming at adjusting a quantity of light, a cemented lens composed of a biconcave positive lens L22 and a biconcave negative lens L23, a biconvex positive lens L24, and a biconvex positive lens L25. Note that both side surfaces of the positive lens L21 have an aspherical surface. Moreover, an image side surface of the positive lens L24 has an aspherical surface.

The third lens group G3 is composed of a meniscus-shaped negative lenses L31 having a concave surface facing the image.

The fourth lens group G4 is composed of a meniscus-shaped positive lenses L41 having a convex surface facing the object. Note that an object side surface of the positive lens L41 has an aspherical surface.

A filter group FL is disposed on the image side of the fourth lens group G4, and is composed of low pass filters, infrared cut filters, etc. for cutting spatial frequency more than marginal resolution of a solid-state image sensing device, such as CCDs disposed on the image surface I.

In the zoom lens ZL1 according to the present example, all the lens groups from the first lens group G1 to the fourth lens group G4 move upon zooming from a wide-angle end state (W) to a telephoto end state (T) so that distances between each lens group change. Specifically speaking, the first lens group G1 once moves to the image side in a manner of drawing a locus of a convex on the image side, afterwards moves to the object side. The second lens group G2 moves to the object side. The third lens group G3 moves to the object side. The fourth lens group G4 moves to the object side. At this point, a distance between the first lens group G1 and the second lens group G2 decreases, a distance between the second lens group G2 and the third lens group G3 decreases, and a distance between the third lens group G3 and the fourth lens group G4 increases.

Values of each data in Example 1 are shown in Table 1 below. The surface numbers 1 to 24 in Table 1 correspond to each optical surface of m1 to m24 indicated in FIGS. 1A to 1C.

TABLE 1

[General Data]
Zoom ratio 2.77

|  | Wide-angle end | Intermediate focal point | Telephoto end |
|---|---|---|---|
| f | 1.00 | 1.53 | 2.77 |
| Fno | 3.39 | 4.15 | 5.96 |
| ω | 43.1 | 30.4 | 17.9 |
| Y | 0.89 | 0.89 | 0.89 |
| BF | 0.57 | 0.88 | 1.65 |
| TL | 5.44 | 5.03 | 5.53 |

[Lens Data]

| Surface number | R | D | nd | νd |
|---|---|---|---|---|
| Object Surface | ∞ | | | |
| 1 | 2.7607 | 0.0859 | 1.80610 | 40.74 |
| *2 | 0.7655 | 0.5706 | | |
| 3 | −5.9880 | 0.0675 | 1.58913 | 61.22 |
| 4 | 7.5124 | 0.0123 | | |
| 5 | 1.7607 | 0.2147 | 1.80809 | 22.74 |
| 6 | 5.0958 | D6 (variable) | | |
| *7 | 0.8712 | 0.1718 | 1.58913 | 61.20 |
| *8 | −7.6237 | 0.0123 | | |
| 9 | ∞ | 0.1350 | (stop S) | |
| 10 | 0.8747 | 0.2270 | 1.52249 | 59.21 |
| 11 | −1.9759 | 0.0491 | 1.80100 | 34.92 |
| 12 | 0.6513 | 0.0982 | | |
| 13 | 4.9080 | 0.0920 | 1.58913 | 61.20 |
| *14 | −8.9252 | 0.0307 | | |
| 15 | 4.9080 | 0.1350 | 1.48749 | 70.31 |
| 16 | −2.1650 | D16 (variable) | | |
| 17 | 6.1350 | 0.0613 | 1.58913 | 61.22 |
| 18 | 2.1027 | D18 (variable) | | |
| *19 | 3.0675 | 0.1595 | 1.58913 | 61.20 |
| 20 | 8.9701 | D20 (variable) | | |
| 21 | ∞ | 0.0429 | 1.51680 | 64.20 |
| 22 | ∞ | 0.0920 | | |
| 23 | ∞ | 0.0429 | 1.51680 | 64.20 |
| 24 | ∞ | 0.0307 | | |
| Image Surface | ∞ | | | |

[Aspherical surface data]

| Surface Number | κ | A4 | A6 | A8 | A10 |
|---|---|---|---|---|---|
| 2 | 0.5552 | 1.82699E−02 | 4.51869E−02 | 0.00000E+00 | 0.00000E+00 |
| 7 | 0.2252 | 4.23003E−02 | 3.15591E−02 | 0.00000E+00 | 0.00000E+00 |
| 8 | 1.0000 | −7.49496E−03 | 0.00000E+00 | 0.00000E+00 | 0.00000E+00 |
| 14 | 1.0000 | 7.27866E−02 | 0.00000E+00 | 0.00000E+00 | 0.00000E+00 |
| 19 | 1.0000 | −1.58968E−03 | 1.35218E−02 | 0.00000E+00 | 0.00000E+00 |

[Zooming Data]

| Variable distance | Wide-angle end | Intermediate focal point | Telephoto end |
|---|---|---|---|
| D6 | 1.85061 | 0.91855 | 0.13347 |
| D16 | 0.4329 | 0.40719 | 0.34254 |
| D18 | 0.47104 | 0.70238 | 1.28429 |
| D20 | 0.38777 | 0.69622 | 1.47210 |

[Lens group data]

| Group number | Group first surface | Group focal length | Lens configuration length |
|---|---|---|---|
| G1 | 1 | −1.76643 | 0.9510 |
| G2 | 7 | 1.50036 | 0.9511 |
| G3 | 17 | −5.46114 | 0.0613 |
| G4 | 19 | 7.83422 | 0.1595 |

[Conditional expression]

Conditional expression (1) D3W/D3T = 0.367
Conditional expression (2) M3/M4 = 0.571
Conditional expression (3) $BFw/(fw^2 + ft^2)^{1/2}$ = 0.192

TABLE 1-continued

Conditional expression (4) Σdw/Σdt = 1.256
Conditional expression (5) f4/fw = 7.834
Conditional expression (6) (−f1)/f2 = 1.177

As shown in Table 1, it is understandable that the conditional expressions (1) to (6) are satisfied regarding the zoom lens ZL1 according to the present example.

Figure 2B:
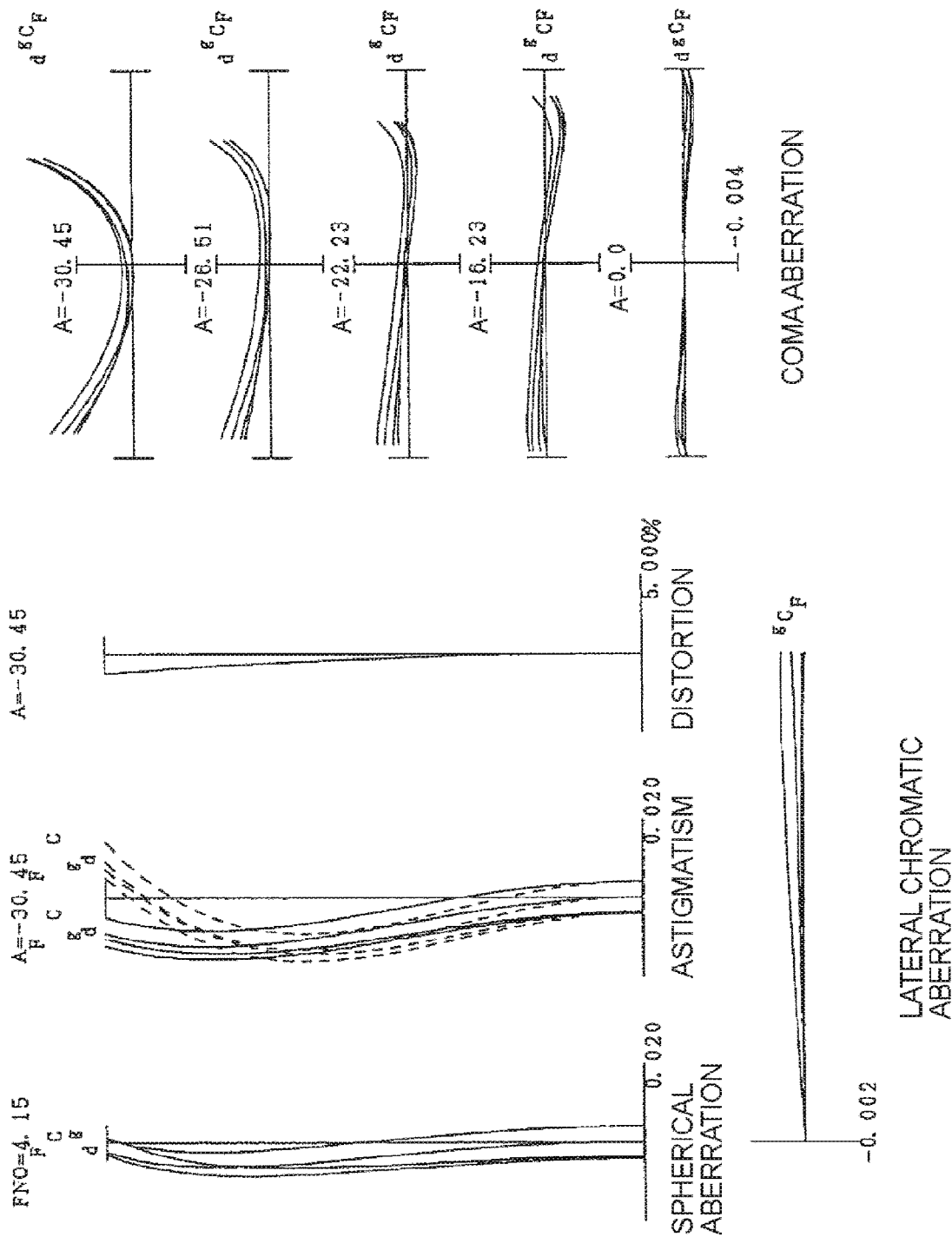

FIG. 2A to 2C illustrate graphs showing various aberrations (spherical aberration, astigmatism, distortion aberration, coma aberration, and lateral chromatic aberration) of zoom lens ZL1 according to Example 1. FIG. 2A illustrates graphs showing various aberrations upon focusing on infinity in the wide-angle end state of Example 1, FIG. 2B illustrates graphs showing various aberrations upon focusing on infinity in the intermediate focal length state of Example 1, and FIG. 2C illustrates graphs showing various aberrations upon focusing on infinity in the telephoto end state of Example 1.

In each graph showing aberration, FNO means a F number, and A means a half angle of view against each image height (unit: degree). d means d-line, g means g-line, C means C-line, and F means aberration in F-line. Moreover, what is not described means aberration according to d-line. In graphs showing astigmatism, a solid line indicates a sagittal image plane and a dashed line indicates a meridional image plane. Note that also in graphs showing aberration of each example described below, the same signs are used as those in the present example.

As is obvious in each graph showing aberration, in the zoom lens ZL1 according to Example 1, it is understandable that various aberrations are properly corrected, and this has outstanding optical performance.

Example 2

Example 2 is explained using FIGS. 3A to 3C and 4A to 4C, and Table 2. The zoom lens ZL (ZL2) according to Example 2 is composed of, in order from an object as shown in FIG. 3, a first lens group G1 having a negative refractive power, a second lens group G2 having a positive refractive power, a third lens group G3 having a negative refractive power, and a fourth lens group G4 having a positive refractive power.

The first lens group G1 is composed of, in order from the object, a meniscus-shaped negative lens L11 having a concave surface facing the image, a biconcave negative lens L12, and a meniscus-shaped positive lens L13 having a convex surface facing the object. Note that an image side surface of the negative lens L11 has an aspherical surface.

The second lens group G2 is composed of, in order from the object, an aperture stop S aiming at adjusting a quantity of light, a biconvex positive lens L21, and a cemented lens of a biconvex positive lens L22 and a biconcave negative lens L23, and a biconvex positive lens L24. Note that both side surfaces of the positive lens L21 have an aspherical surface.

The third lens group G3 is composed of a biconcave negative lenses L31.

The fourth lens group G4 is composed of a meniscus-shaped positive lenses L41 having a convex surface facing the object. Note that an object side surface of the positive lens L41 has an aspherical surface.

The filter group FL is arranged on the image side of the fourth lens group G4, and is composed of a low pass filter, an infrared cut filter, etc. for cutting a spatial frequency more than marginal resolution of a solid-state image sensing device such as a CCD disposed on the image surface I.

In the zoom lens ZL2 according to the present example, all the lens groups from the first lens group G1 to the fourth lens group G4 move upon zooming from the wide-angle end state (W) to the telephoto end state (T) so that distances between each lens group change. Specifically speaking, the first lens group G1 once moves to the image side in a manner of drawing a locus of a convex on the image side, afterwards, moves to the object side. The second lens group G2 moves to the object side. The third lens group G3 moves to the object side. The fourth lens group G4 moves to the object side. At this point, a distance between the first lens group G1 and the second lens group G2 decreases, a distance between the second lens group G2 and the third lens group G3 decreases, and a distance between the third lens group G3 and the fourth lens group G4 increases.

Figure 3A:
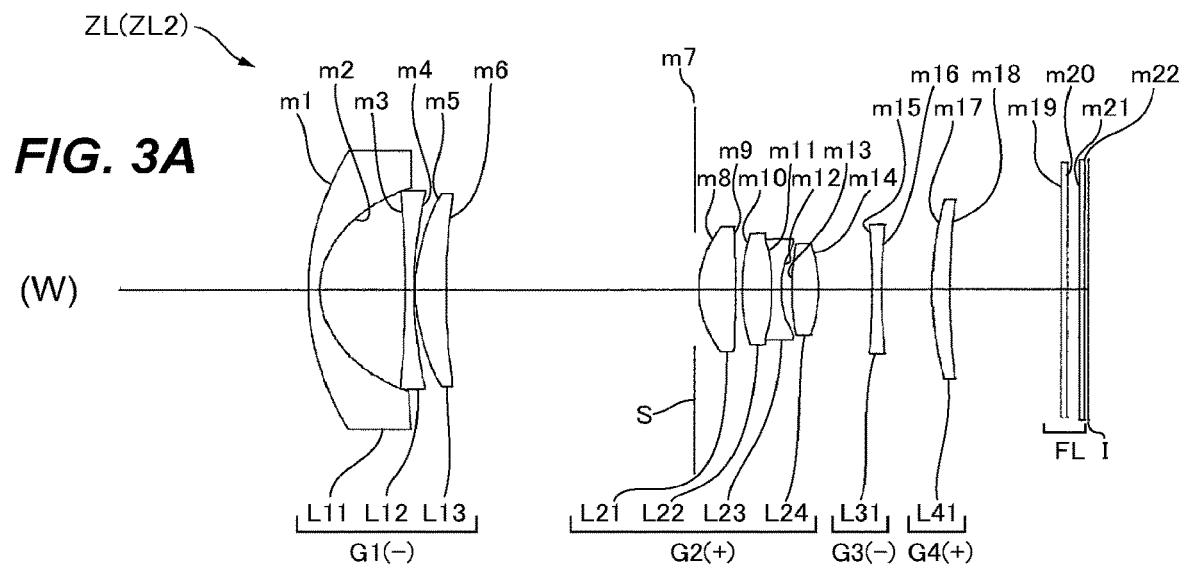
FIGS. 3A to 3C are sectional views illustrating a configuration of a zoom lens according to Example 2, where
Figure 3B:
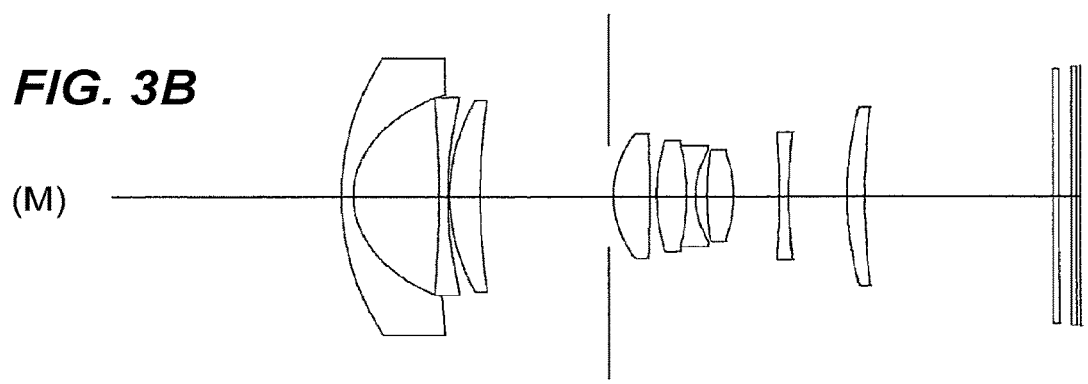
Figure 3C:
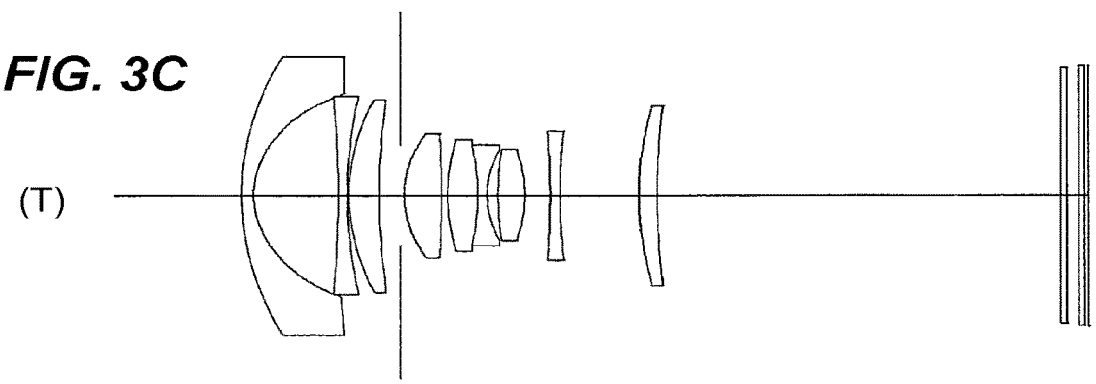

Values of each data in Example 2 are shown in Table 2 below. The surface numbers 1 to 22 in Table 2 correspond to each optical surface of m1 to m22 which are illustrated in FIGS. 3A to 3C.

TABLE 2

[General Data]
Zoom ratio 2.94

|  | Wide-angle end | Intermediate focal point | Telephoto end |
| --- | --- | --- | --- |
| f | 1.00 | 1.53 | 2.94 |
| Fno | 3.03 | 3.99 | 6.03 |
| ω | 43.2 | 30.7 | 16.9 |
| Y | 0.89 | 0.89 | 0.89 |
| BF | 1.04 | 1.63 | 3.29 |
| TL | 5.97 | 5.65 | 6.48 |

[Lens Data]

| Surface number | R | D | nd | νd |
| --- | --- | --- | --- | --- |
| Object surface | ∞ |  |  |  |
| 1 | 2.2883 | 0.0920 | 1.80610 | 40.74 |
| *2 | 0.7373 | 0.6564 |  |  |

TABLE 2-continued

| | | | | |
|---|---|---|---|---|
| 3 | −9.1361 | 0.0675 | 1.72916 | 54.61 |
| 4 | 3.9033 | 0.0123 | | |
| 5 | 1.7362 | 0.2331 | 1.80809 | 22.74 |
| 6 | 6.0369 | D6 (variable) | | |
| 7 | ∞ | 0.0307 | (stop S) | |
| *8 | 0.8589 | 0.2822 | 1.58913 | 61.20 |
| *9 | −7.2780 | 0.0491 | | |
| 10 | 1.6834 | 0.2331 | 1.58267 | 46.48 |
| 11 | −1.8084 | 0.0675 | 1.80100 | 34.92 |
| 12 | 0.7855 | 0.0859 | | |
| 13 | 2.5700 | 0.2025 | 1.48749 | 70.31 |
| 14 | −1.2299 | D14 (variable) | | |
| 15 | −7.9755 | 0.0736 | 1.67300 | 38.15 |
| 16 | 5.2416 | D16 (variable) | | |
| *17 | 2.8221 | 0.1411 | 1.58913 | 61.22 |
| 18 | 6.9412 | D18 (variable) | | |
| 19 | ∞ | 0.0429 | 1.51680 | 64.20 |
| 20 | ∞ | 0.0920 | | |
| 21 | ∞ | 0.0429 | 1.51680 | 64.20 |
| 22 | ∞ | 0.0307 | | |
| Image surface | ∞ | | | |

[Aspherical surface data]

| Surface number | κ | A4 | A6 | A8 | A10 |
|---|---|---|---|---|---|
| 2 | 0.5876 | 1.48400E−02 | 2.93833E−02 | 0.00000E+00 | 0.00000E+00 |
| 8 | 0.5920 | −1.48182E−02 | 0.00000E+00 | 1.22878E−01 | 3.62602E−02 |
| 9 | 1.0000 | 9.86346E−02 | 0.00000E+00 | 0.00000E+00 | 0.00000E+00 |
| 17 | 1.0000 | −1.85798E−02 | 6.87964E−03 | 0.00000E+00 | 0.00000E+00 |

[Zooming data]

| Variable distance | Wide-angle end | Intermediate focal point | Telephoto end |
|---|---|---|---|
| D6 | 1.90212 | 0.98604 | 0.16214 |
| D14 | 0.41369 | 0.35509 | 0.19202 |
| D16 | 0.38614 | 0.44474 | 0.60782 |
| D18 | 0.86120 | 1.45446 | 3.10802 |

[Lens group data]

| Group number | Group first surface | Group focal length | Lens configuration length |
|---|---|---|---|
| G1 | 1 | −1.60069 | 1.0613 |
| G2 | 7 | 1.54986 | 0.9510 |
| G3 | 15 | −4.68917 | 0.0736 |
| G4 | 17 | 7.97097 | 0.1411 |

[Conditional expression]

Conditional expression (1) D3W/D3T = 0.868
Conditional expression (2) M3/M4 = 0.910
Conditional expression (3) BFw/$(fw^2 + ft^2)^{1/2}$ = 0.335
Conditional expression (4) Σdw/Σdt = 1.546
Conditional expression (5) f4/fw = 7.971
Conditional expression (6) (−f1)/f2 = 1.033

Based on Table 2, the conditional expressions (1) to (6) are satisfied regarding the zoom lens ZL2 according to the present example.

Figure 4C:
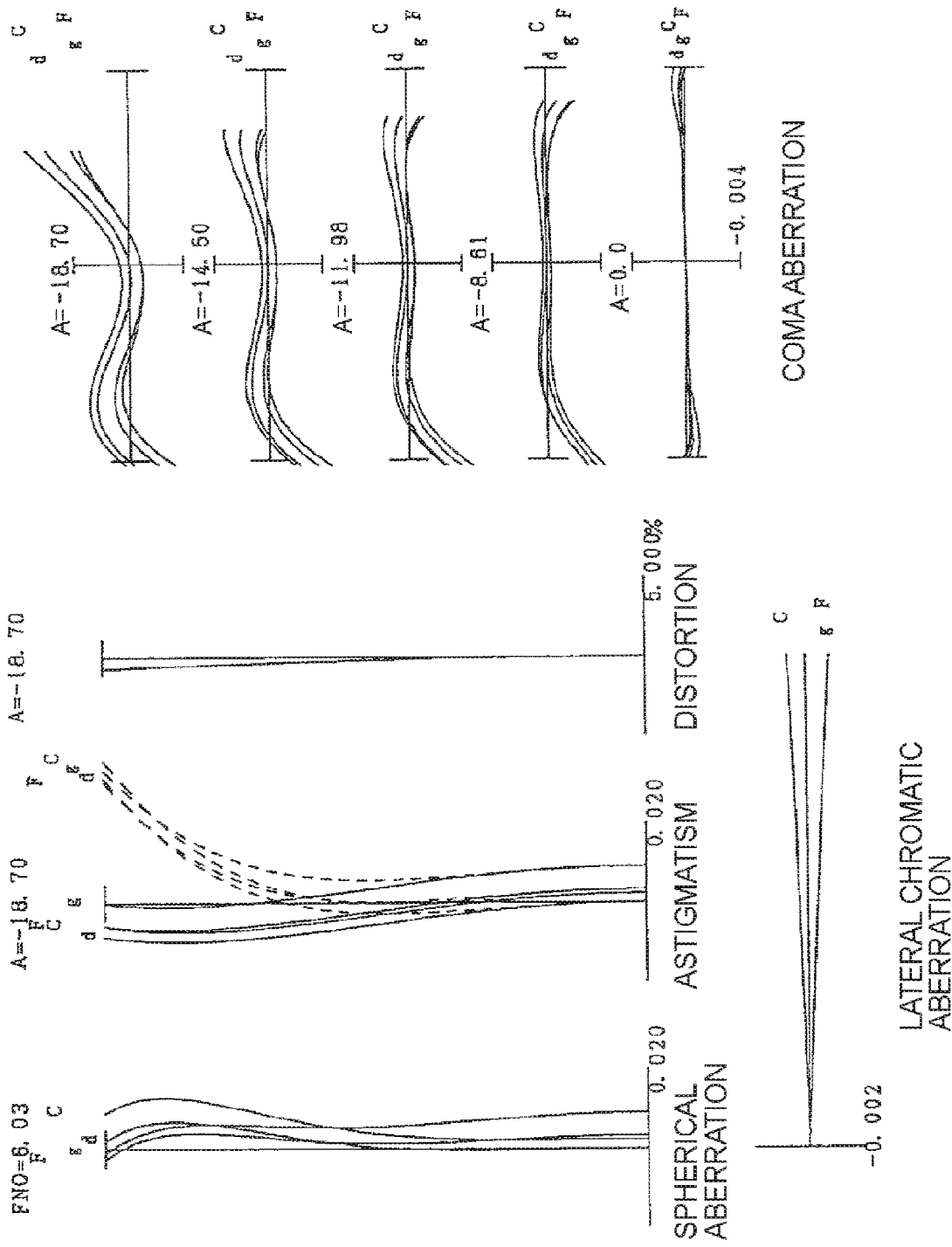

FIGS. 4A, 4B and 4C illustrate graphs showing various aberrations (spherical aberration, astigmatism, distortion aberration, coma aberration, and lateral chromatic aberration) of zoom lens ZL2 according to Example 2. FIG. 4A illustrates graphs showing various aberrations upon focusing on infinity in the wide-angle end state of Example 2, FIG. 4B illustrates graphs showing various aberrations upon focusing on infinity in the intermediate focal length state of Example 2, and FIG. 4C illustrates graphs showing various aberrations upon focusing on infinity in the telephoto end state of Example 2. As is obvious in each graph showing aberration, in the zoom lens ZL2 according to Example 2, it is understandable that various aberrations are properly corrected, and this has outstanding optical performance.

Example 3

Figure 5A:
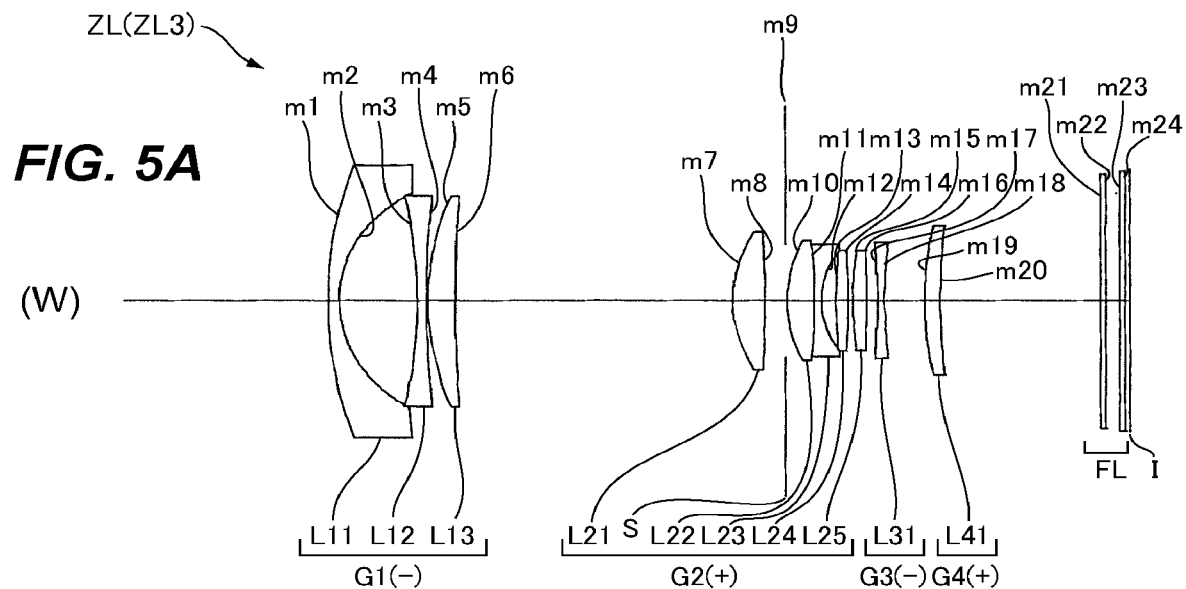
FIGS. 5A to 5C are sectional views illustrating a configuration of a zoom lens according to Example 3, where
Figure 5B:
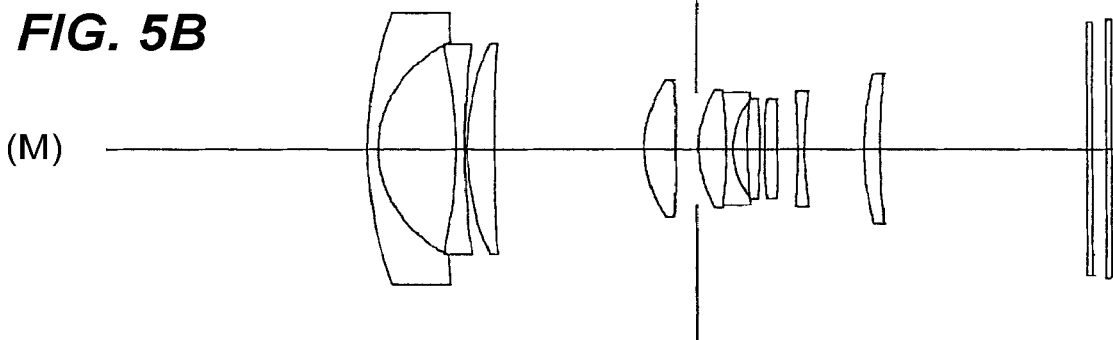
Figure 5C:
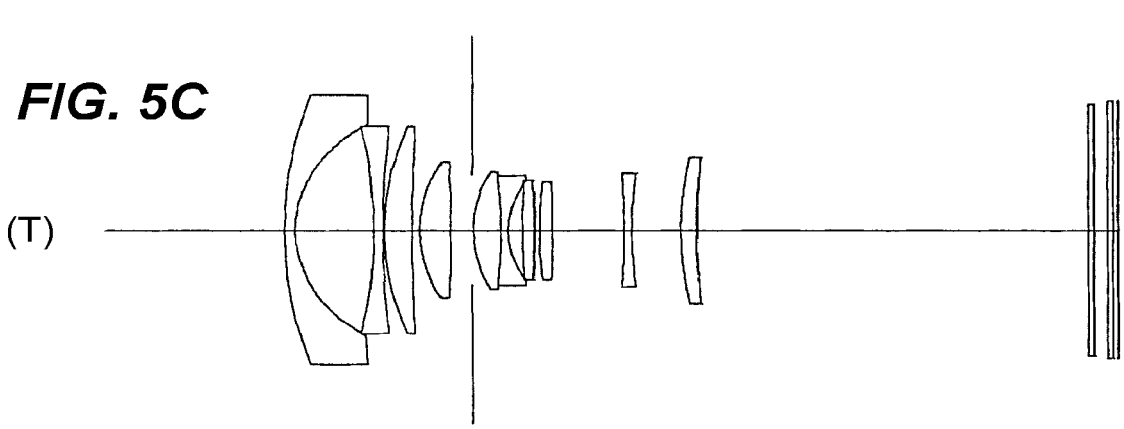

Example 3 is explained using FIGS. 5A to 5C and 6A to 6C, and Table 3. The zoom lens ZL (ZL3) according to Example 3 is composed of, in order from the object as shown in FIGS. 5A to 5C, a first lens group G1 having a negative refractive power, a second lens group G2 having a positive refractive power, a third lens group G3 having a negative refractive power, and a fourth lens group G4 having a positive refractive power.

The first lens group G1 is composed of, in order from the object, a meniscus-shaped negative lens L11 having a concave surface facing an image side, a biconcave negative lens L12, and a meniscus-shaped positive lens L13 having a concave surface facing the object. Note that an image side surface of the negative lens L11 has an aspherical surface.

The second lens group G2 is composed of, in order from the object, a biconvex positive lens L21, an aperture stop S aiming at adjusting a quantity of light, a cemented lens composed of a biconvex positive lens L22 and a biconcave negative lens L23, a biconvex positive lens L24, and a biconvex positive lens L25. Note that both side surfaces of the positive lens L21 have an aspherical surface.

The third lens group G3 is composed of a biconcave negative lenses L31.

The fourth lens group G4 is composed of a meniscus-shaped positive lenses L41 having a convex surface facing the object side. Note that an object side surface of the positive lens L41 has an aspherical surface.

The filter group FL is arranged on the image side of the fourth lens group G4, and is composed of a low pass filter, an infrared cut filter, etc. for cutting a spatial frequency more than marginal resolution of a solid-state image sensing device, such as a CCD disposed on the image surface I.

In the zoom lens ZL3 according to the present example, all the lens groups from the first lens group G1 to the fourth lens group G4 move upon zooming from the wide-angle end state to the telephoto end state so that distances between each lens group change. Specifically speaking, the first lens group G1 once moves to the image side in a manner of drawing a locus of a convex, afterwards moves to the object side. The second lens group G2 moves to the object side. The third lens group G3 moves to the object side. The fourth lens group G4 moves to the object side. At this point, a distance between the first lens group G1 and the second lens group G2 decreases, and a distance between the second lens group G2 and the third lens group G3 increases.

Values of each data in Example 3 are shown in Table 3 below. The surface numbers 1 to 24 in Table 3 correspond to each optical surface of m1 to m24 which are shown in FIGS. 5A to 5C.

TABLE 3

[General Data]
Zoom ratio 3.37

|  | Wide-angle end | Intermediate focal point | Telephoto end |
|---|---|---|---|
| f | 1.00 | 1.53 | 3.37 |
| Fno | 2.89 | 3.57 | 5.87 |
| ω | 44.0 | 30.8 | 14.8 |
| Y | 0.81 | 0.85 | 0.89 |
| BF | 1.29 | 1.62 | 2.88 |
| TL | 5.51 | 5.15 | 5.72 |

[Lens Data]

| Surface number | R | D | nd | νd |
|---|---|---|---|---|
| Object surface | ∞ | | | |
| 1 | 3.0676 | 0.0736 | 1.80610 | 40.77 |
| *2 | 0.8660 | 0.5399 | | |
| 3 | −3.5156 | 0.0614 | 1.72916 | 54.61 |
| 4 | 7.1326 | 0.0123 | | |
| 5 | 2.0247 | 0.1902 | 1.80809 | 22.74 |
| 6 | 13.1350 | D6 (variable) | | |
| *7 | 0.9075 | 0.2209 | 1.59201 | 67.05 |
| *8 | −9.6052 | 0.1411 | | |
| 9 | ∞ | 0.0123 | (stop S) | |
| 10 | 0.9301 | 0.1902 | 1.62299 | 58.12 |
| 11 | −4.1799 | 0.0491 | 1.80100 | 34.92 |
| 12 | 0.6440 | 0.0982 | | |
| 13 | 4.9082 | 0.0859 | 1.58913 | 61.22 |
| 14 | −4.9775 | 0.0307 | | |
| 15 | 3.0676 | 0.0920 | 1.58913 | 61.22 |
| 16 | −10.3052 | D16 (variable) | | |
| 17 | −6.1353 | 0.0491 | 1.58913 | 61.22 |
| 18 | 3.4411 | D18 (variable) | | |
| *19 | 2.4541 | 0.1104 | 1.62263 | 58.19 |
| 20 | 5.4478 | D20 (variable) | | |
| 21 | ∞ | 0.0430 | 1.51680 | 64.20 |
| 22 | ∞ | 0.0920 | | |
| 23 | ∞ | 0.0430 | 1.51680 | 64.20 |
| 24 | ∞ | 0.0307 | | |
| Image surface | ∞ | | | |

[Aspherical surface data]

| Surface number | κ | A4 | A6 | A8 | A10 |
|---|---|---|---|---|---|
| 2 | 0.8145 | 6.24280E−03 | 2.17041E−02 | 0.00000E+00 | 0.00000E+00 |
| 7 | 1.0000 | −1.15156E−01 | −6.71093E−02 | −1.33516E−01 | 0.00000E+00 |
| 8 | 1.0000 | 4.43207E−03 | 0.00000E+00 | 0.00000E+00 | 0.00000E+00 |
| 19 | 1.0000 | −2.42479E−02 | 2.00563E−02 | 9.42333E−02 | 0.00000E+00 |

TABLE 3-continued

[Zooming data]

| Variable distance | Wide-angle end | Intermediate focal point | Telephoto end |
|---|---|---|---|
| D6 | 1.90947 | 1.03034 | 0.04886 |
| D16 | 0.07479 | 0.13747 | 0.49243 |
| D18 | 0.27637 | 0.40612 | 0.33772 |
| D20 | 1.11507 | 1.43886 | 2.70424 |

[Lens group data]

| Group number | Group first surface | Group focal length | Lens configuration length |
|---|---|---|---|
| G1 | 1 | −1.63500 | 0.8773 |
| G2 | 7 | 1.41112 | 0.9203 |
| G3 | 17 | −3.73503 | 0.0491 |
| G4 | 19 | 7.07257 | 0.1104 |

[Conditional expression]

Conditional expression (1) D3W/D3T = 0.818
Conditional expression (2) M3/M4 = 0.963
Conditional expression (3) $BFw/(fw^2 + ft^2)^{1/2}$ = 0.368
Conditional expression (4) Σdw/Σdt = 1.487
Conditional expression (5) f4/fw = 7.073
Conditional expression (6) (−f1)/f2 = 1.159

Based on Table 3, regarding zoom lens ZL3 according to the present example the conditional expressions (1) to (6) are satisfied.

Figure 6B:
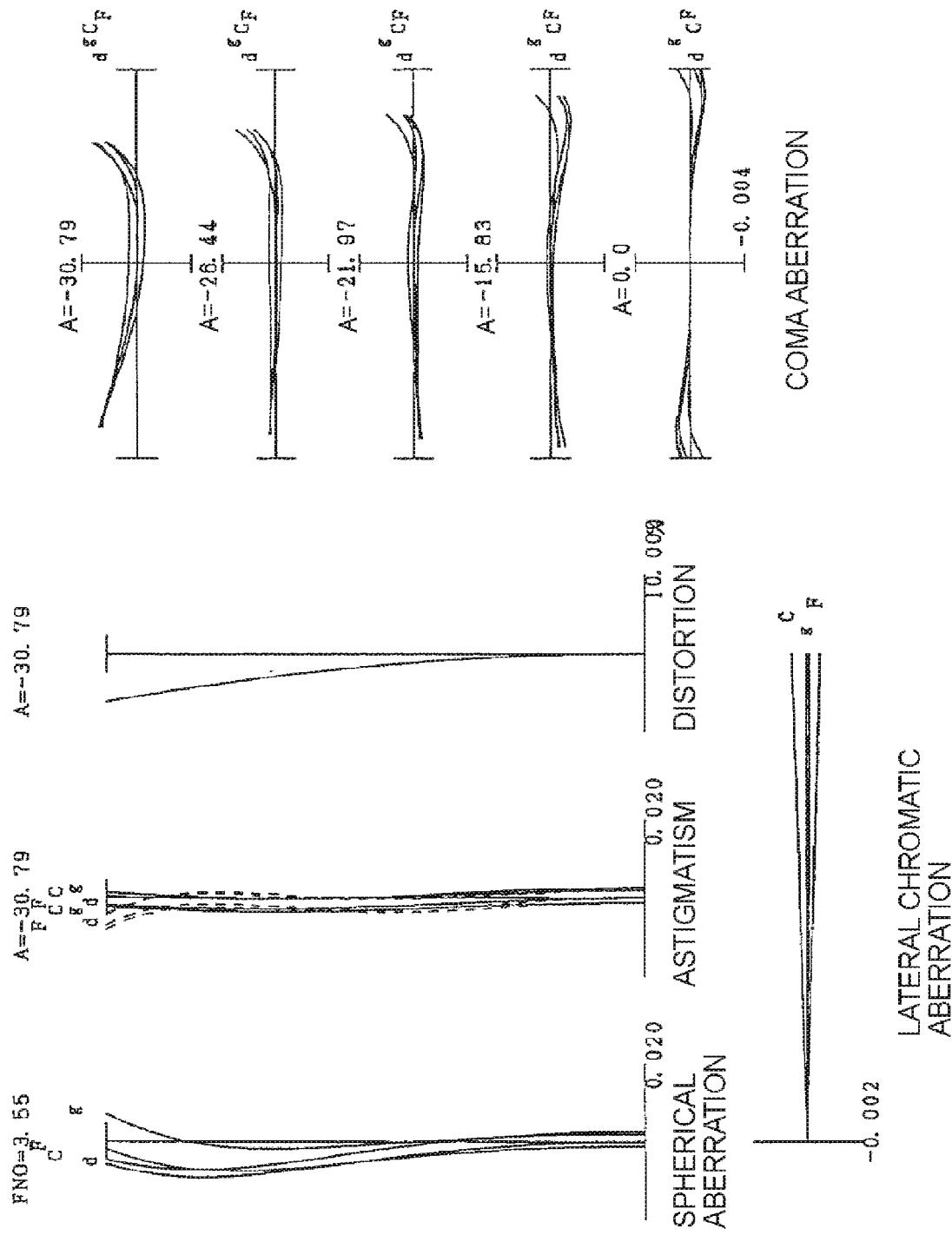

FIG. 6A to 6C illustrate graphs showing various aberrations (spherical aberration, astigmatism, distortion aberration, coma aberration, and lateral chromatic aberration) of zoom lens ZL3 according to Example 3. FIG. 6A illustrates graphs showing various aberrations upon focusing on infinity in the wide-angle end state of Example 3, FIG. 6B illustrates graphs showing various aberrations upon focusing on infinity in the intermediate focal length state of Example 3, and FIG. 6C illustrates graphs showing various aberrations upon focusing on infinity in the telephoto end state of Example 3. As is obvious in each graphs showing aberration, in the zoom lens ZL3 according to Example 3, it is understandable that various aberrations are properly corrected, and this has outstanding optical performance.

Example 4

Figure 7A:
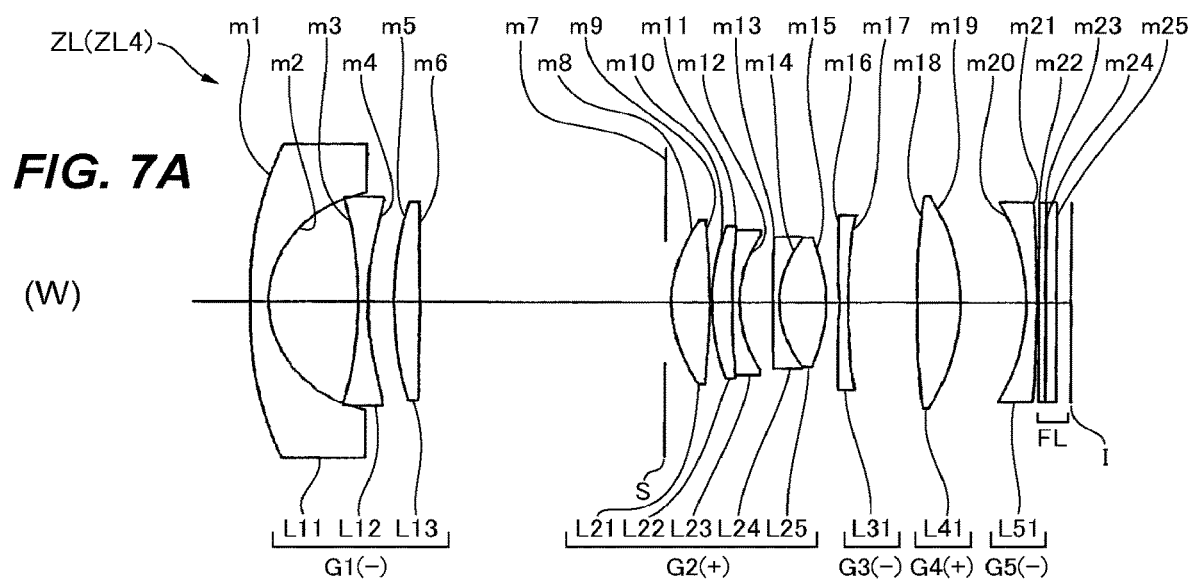
FIGS. 7A to 7C are sectional views illustrating a configuration of a zoom lens according to Example 4, where
Figure 7B:
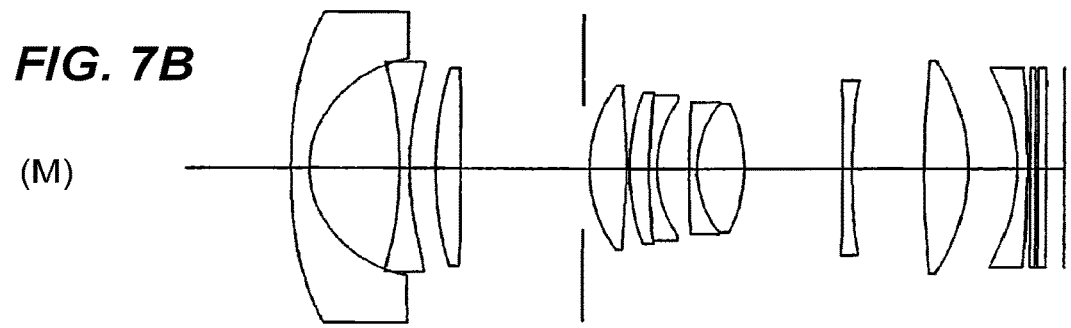
Figure 7C:
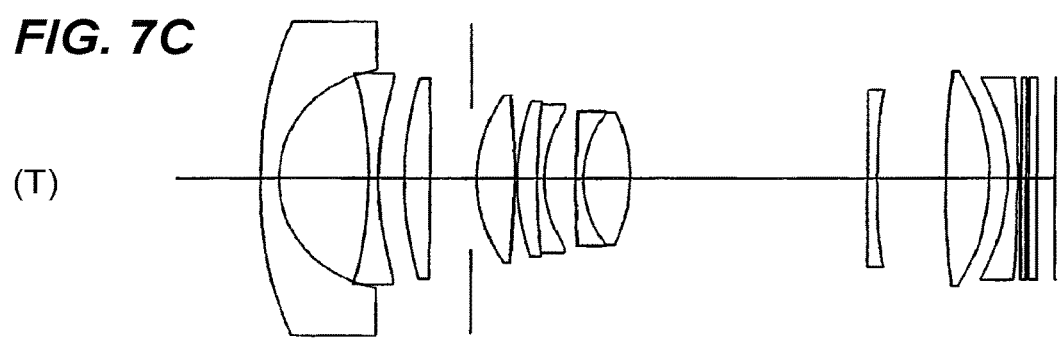

Example 4 is explained using FIGS. 7A to 7C, FIG. 8A to 8C, and Table 4. The zoom lens ZL (ZL4) according to Example 4 is composed of, in order from an object as shown in FIGS. 7A to 7C, a first lens group G1 having a negative refractive power, a second lens group G2 having a positive refractive power, a third lens group G3 having a negative refractive power, a fourth lens group G4 having a positive refractive power, and a fifth lens group G5 having a negative refractive power.

The first lens group G1 is composed of, in order from the object, a meniscus-shaped negative lens L11 having a concave surface facing the image, a biconcave negative lens L12, and a meniscus-shaped positive lens L13 having a convex facing the object. Note that an object side surface of the negative lens L11 has an aspherical surface. Moreover, an image side surface of the positive lens L12 has an aspherical surface.

The second lens group G2 is composed of, in order from the object, an aperture stop S aiming at adjusting a quantity of light, a biconvex positive lens L21, a cemented lens composed of a meniscus-shaped positive lens L22 having a convex surface facing the object and a meniscus-shaped negative lens L23 having a concave surface facing the image, a cemented lens composed of a meniscus-shaped negative-lens lens L24 having a concave surface facing the image and a biconvex positive lens L25. Note that both side surfaces of the positive lens L21 have an aspherical surface.

The third lens group G3 is composed of a biconcave negative lenses L31. Note that an image side surface of the negative lens L31 has an aspherical surface.

The fourth lens group G4 is composed of a biconvex positive lenses L41.

The fifth lens group G5 is composed of a meniscus-shaped negative lenses L51 having a concave surface facing the object.

The filter group FL is arranged on the image side of the fifth lens group G5, and is composed of a low pass filter, an infrared cut filter, etc. for cutting spatial frequency more than marginal resolution of a solid-state image sensing device such as a CCD disposed on the image surface I.

Regarding the zoom lens ZL4 according to the present example, upon zooming from the wide-angle end state (W) to the telephoto end state (T), the first lens group G1 to the fourth lens group G4 move so that distances between each lens group change. Specifically speaking, the first lens group G1 once moves to the image side in a manner of drawing a locus of a convex, and moves to the image side. The second lens group G2 moves to the object side. The third lens group G3 moves to the image side. The fourth lens group G4 moves to the image side. The fifth lens group G5 is fixed. At this point, a distance between the first lens group G1 and the second lens group G2 decreases, a distance between the second lens group G2 and the third lens group G3 increases, a distance between the third lens group G3 and the fourth lens group G4 once increases and afterwards decreases, and a distance between the fourth lens group G4 and the fifth lens group G5 decreases.

Values of each data in Example 4 are shown in Table 4 below. The surface numbers 1 to 25 in Table 4 correspond to each optical surface of m1 to m25 which are indicated in FIGS. 7A to 7C.

TABLE 4

| [General Data] |
| --- |
| Zoom ratio 2.61 |

|  | Wide-angle end | Intermediate focal point | Telephoto end |
| --- | --- | --- | --- |
| f | 1.00 | 1.58 | 2.61 |
| Fno | 1.88 | 2.36 | 2.88 |
| ω | 51.5 | 38.6 | 24.0 |
| Y | 1.044 | 1.187 | 1.187 |
| BF | 0.38 | 0.38 | 0.38 |
| TL | 9.67 | 9.08 | 9.33 |

[Lens Data]

| Surface number | R | D | nd | νd |
| --- | --- | --- | --- | --- |
| Object surface | ∞ | | | |
| *1 | 8.64261 | 0.21739 | 1.69680 | 55.52 |
| 2 | 1.44928 | 1.05797 | | |
| 3 | −5.58998 | 0.11594 | 1.59201 | 67.02 |
| *4 | 4.19179 | 0.30379 | | |
| 5 | 4.84283 | 0.30436 | 1.84666 | 23.80 |
| 6 | −67.97868 | D6 (variable) | | |
| 7 | ∞ | 0.07246 | (stop S) | |
| *8 | 1.86965 | 0.44802 | 1.72903 | 54.04 |
| *9 | −7.50935 | 0.02898 | | |
| 10 | 3.22848 | 0.23509 | 1.49700 | 81.73 |
| 11 | 9.75758 | 0.08695 | 1.64769 | 33.72 |
| 12 | 1.73854 | 0.38272 | | |
| 13 | 23.07107 | 0.08696 | 1.74950 | 35.25 |
| 14 | 1.45638 | 0.55736 | 1.49700 | 81.73 |
| 15 | −2.17480 | D15 (variable) | | |
| 16 | −167.23232 | 0.11594 | 1.71300 | 53.94 |
| *17 | 17.28659 | D17 (variable) | | |
| 18 | 13.39219 | 0.51738 | 1.72916 | 54.61 |
| 19 | −2.76740 | D19 (variable) | | |
| 20 | −2.76850 | 0.11594 | 1.48749 | 70.32 |
| 21 | −20.23344 | 0.02899 | | |
| 22 | ∞ | 0.06812 | 1.51680 | 64.20 |
| 23 | ∞ | 0.02174 | | |
| 24 | ∞ | 0.10145 | 1.51680 | 64.20 |
| 25 | ∞ | 0.21740 | | |
| Image surface | ∞ | | | |

[Aspherical surface data]

| Surface number | κ | A4 | A6 | A8 | A10 |
| --- | --- | --- | --- | --- | --- |
| 1 | 1.0000 | 1.26979E−02 | −1.33695E−03 | 5.16445E−05 | 0.00000E+00 |
| 4 | 1.0000 | −3.36717E−03 | −1.25425E−03 | −1.81979E−03 | 0.00000E+00 |
| 8 | 1.0000 | −1.52678E−02 | 7.22094E−04 | −4.02217E−04 | 0.00000E+00 |
| 9 | 1.0000 | 2.01074E−02 | 0.00000E+00 | 0.00000E+00 | 0.00000E+00 |
| 17 | 1.0000 | 2.34398E−02 | 4.67999E−04 | 7.54536E−04 | 0.00000E+00 |

[Zooming data]

| Variable distance | Wide-angle end | Intermediate focal point | Telephoto end |
| --- | --- | --- | --- |
| D6 | 2.91460 | 1.45214 | 0.47826 |
| D15 | 0.14493 | 1.16020 | 2.80044 |
| D17 | 0.81390 | 0.85831 | 0.81112 |
| D19 | 0.74153 | 0.58058 | 0.21655 |

[Lens group data]

| Group number | Group first surface | Group focal length | Lens configuration length |
| --- | --- | --- | --- |
| G1 | 1 | −2.30358 | 1.99945 |
| G2 | 8 | 2.66160 | 1.89854 |
| G3 | 16 | −21.96771 | 0.11594 |
| G4 | 18 | 3.18841 | 0.51738 |
| G5 | 20 | −6.59368 | 0.11594 |

TABLE 4-continued

[Conditional expression]

Conditional expression (1) D3W/D3T = 1.003
Conditional expression (2) M3/M4 = 0.995
Conditional expression (3) BFw/(fw² + ft²)^(1/2) = 0.126
Conditional expression (4) Σdw/Σdt = 1.038
Conditional expression (5) f4/fw = 3.188
Conditional expression (6) (−f1)/f2 = 0.865

According to Table 4, it is understandable that the zoom lens ZL4 according to the present example is satisfied with the conditional expressions (1) to (6).

Figure 8A:
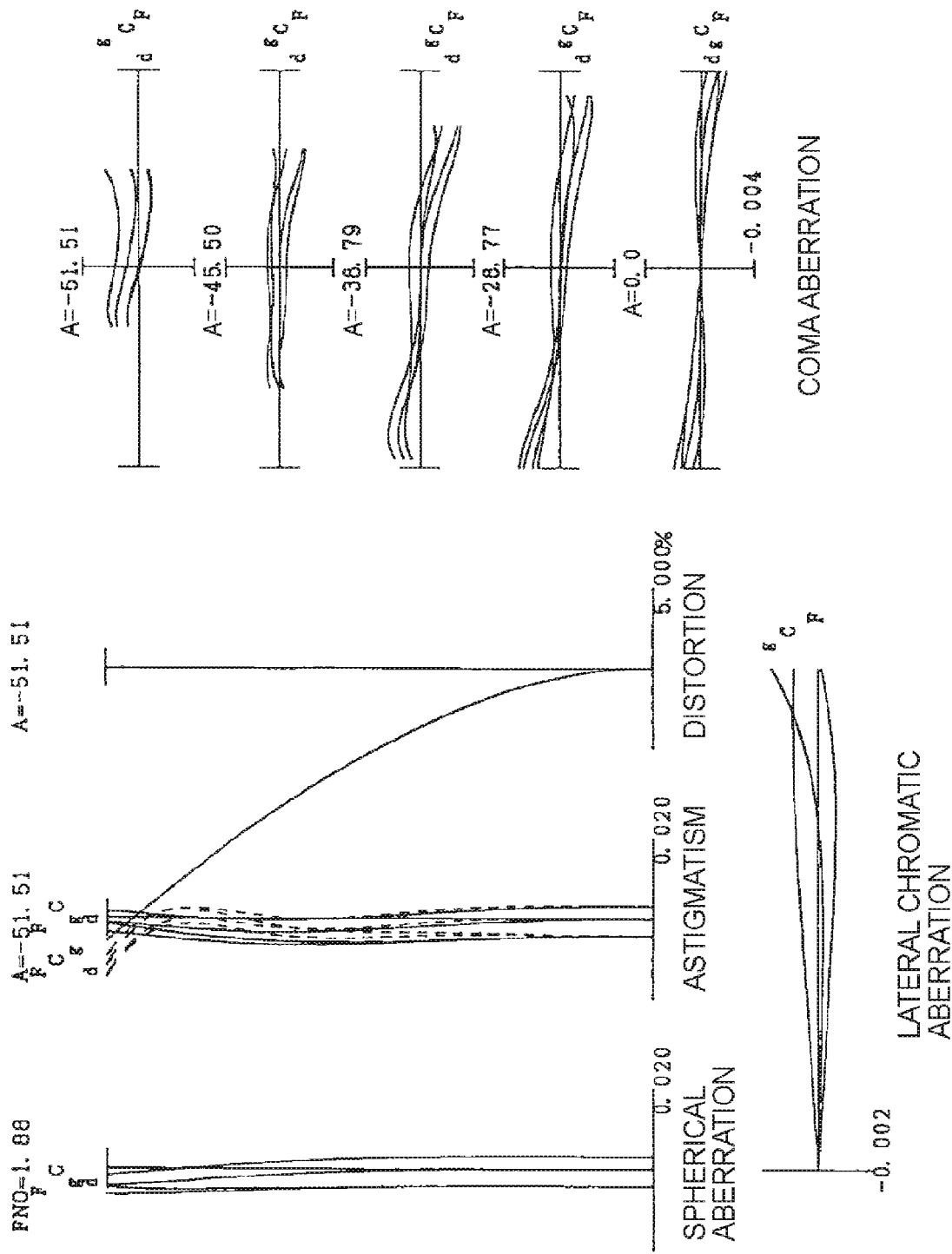
Figure 8C:
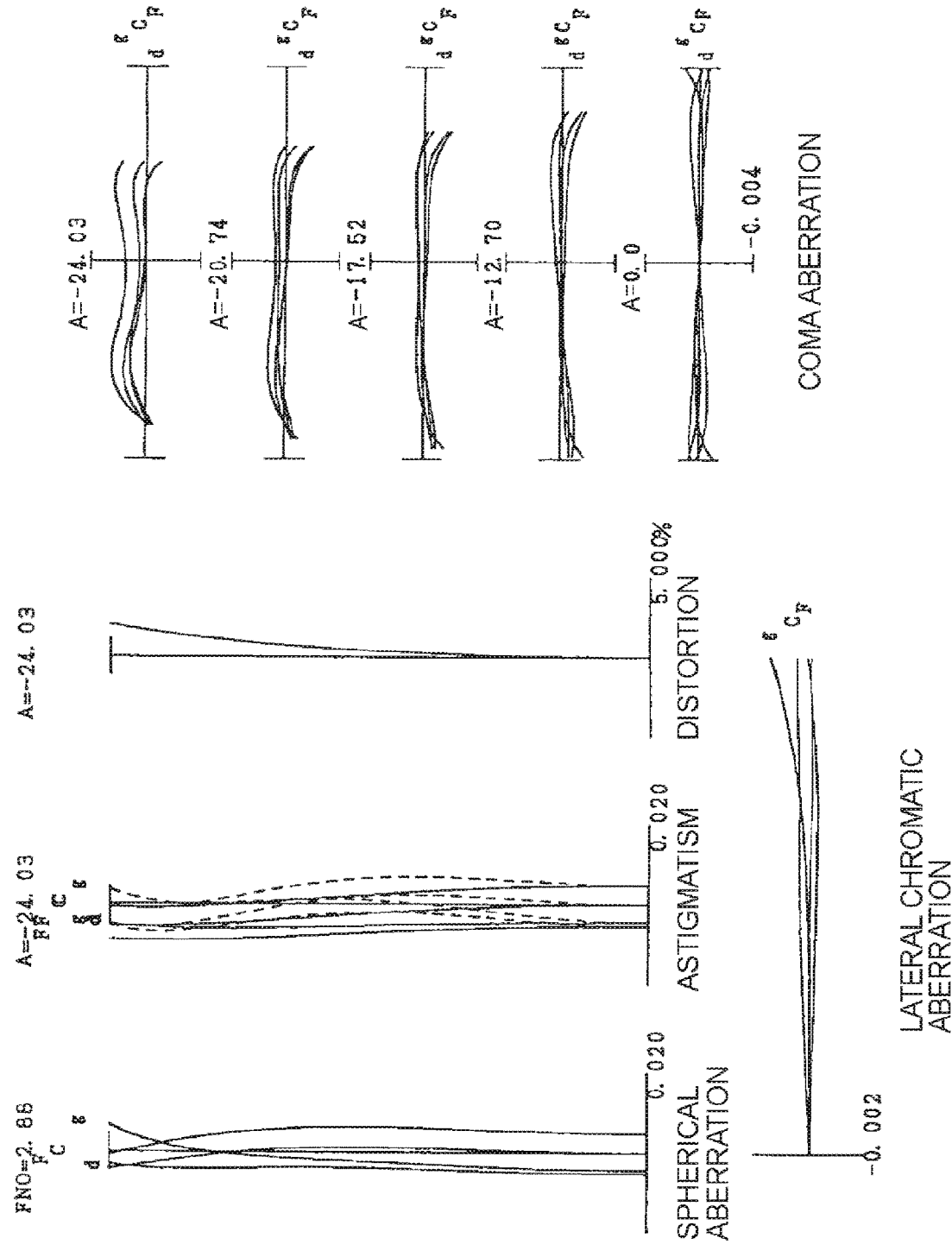

FIG. 8A to 8C illustrate graphs showing various aberrations (spherical aberration, astigmatism, distortion aberration, coma aberration, and lateral chromatic aberration) of zoom lens ZL4 according to Example 4. FIG. 8A illustrates graphs showing various aberrations upon focusing on infinity in the wide-angle end state of Example 4, FIG. 8B illustrates graphs showing various aberrations upon focusing on infinity in the intermediate focal length state of Example 4, and FIG. 8C illustrates graphs showing various aberrations upon focusing on infinity in the telephoto end state of Example 4.

As is obvious in each graph of the various aberrations, it is understandable that the zoom lens ZL4 according to Example 4 is properly corrected with various aberrations, and has outstanding optical performance.

Example 5

Figure 9A:
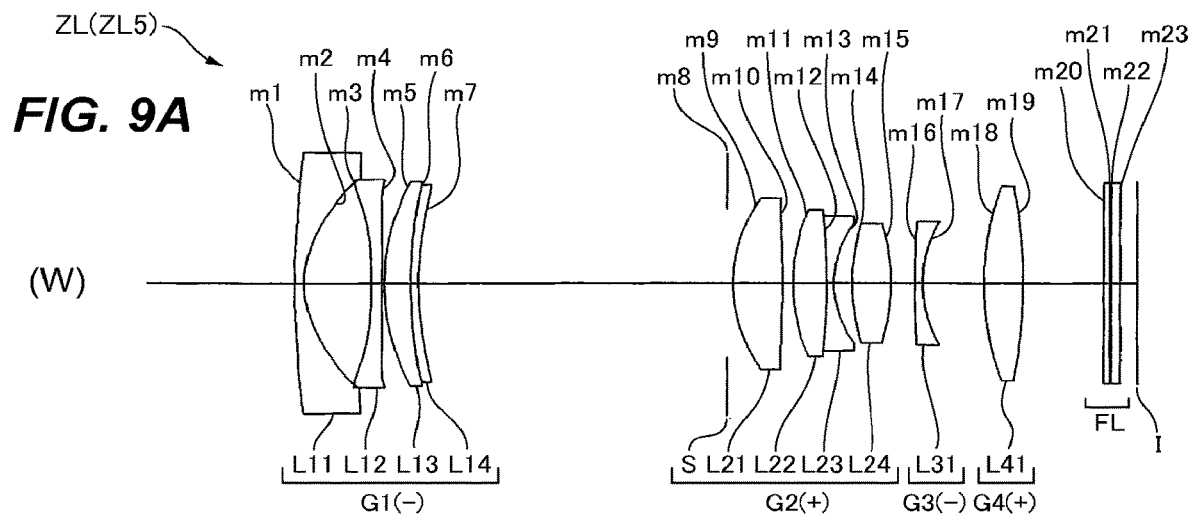
FIGS. 9A to 9C are sectional views illustrating a configuration of a zoom lens according to Example 5, where
Figure 9B:
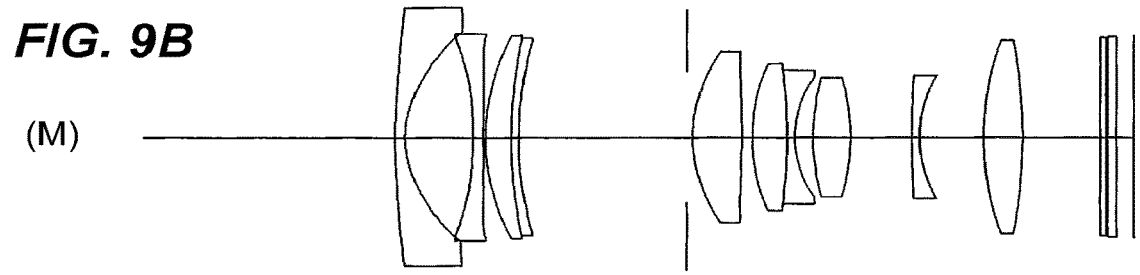
Figure 9C:
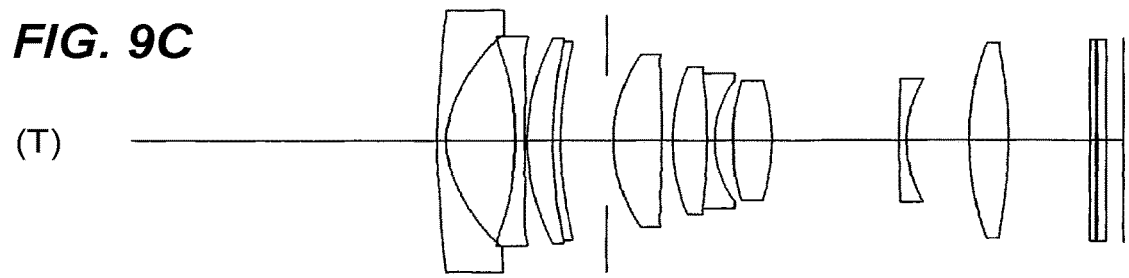

Example 5 is explained using FIGS. 9A to 9C, FIG. 10A to 10C, and Table 5. The zoom lens ZL (ZL5) according to Example 5 is composed of, in order from an object as shown in FIGS. 9A to 9C, a first lens group G1 having a negative refractive power, a second lens group G2 having a positive refractive power, a third lens group G3 having a negative refractive power, and a fourth lens group G4 having a positive refractive power.

The first lens group G1 is composed of, in order from the object, a meniscus-shaped negative lens L11 having a concave surface facing an image, a biconcave negative lens L12, a cemented lenses composed of a meniscus-shaped positive lens L13 having a convex surface facing the object and a meniscus-shaped negative lens L14 having a concave surface facing the image. Note that both side surfaces of the negative lens L11 have an aspherical surface. Moreover, both side surfaces of the negative lens L12 have an aspherical surface.

The second lens group G2 is composed of, in order from the object, an aperture stop S aiming at adjusting the quantity of light, a biconvex positive lens L21, a cemented lens composed of a biconvex positive lens L22 and a biconcave negative lens L23, and a biconvex positive lens L24. Note that both side surfaces of the positive lens L21 have an aspherical surface.

The third lens group G3 is composed of a meniscus-shaped negative lenses L31 having a concave surface facing the image. Note that an image side surface of the positive lens L31 has an aspherical surface.

The fourth lens group G4 is composed of a biconvex positive lenses L41. Note that an object side surface of the positive lens L41 has an aspherical surface.

The filter group FL is arranged on the image side of the fourth lens group G4, and is composed of a low pass filter, an infrared cut filter, etc. for cutting spatial frequency more than marginal resolutions of a solid-state image sensing device, such as a CCD disposed on the image surface I.

Regarding the zoom lens ZL5 according to the present example, upon zooming from the wide-angle end state (W) to the telephoto end state (T), the lens groups from the first lens group G1 to the fourth lens group G4 move so that distances between each lens group change. Specifically speaking, the first lens group G1 moves to the image side. The second lens group G2 moves to the object side. The third lens group G3 moves to the object side. The fourth lens group G4 moves to the object side. At this point, a distance between the first lens group G1 and the second lens group G2 decreases, a distance between the second lens group G2 and the third lens group G3 increases, and a distance between the third lens group G3 and the fourth lens group G4 increases.

Value of each example in Example 5 is shown in Table 5 below. The surface numbers 1 to 23 in Table 5 correspond to each optical surface of m1 to m23 shown in FIGS. 9A to 9C.

TABLE 5

[General Data]
Zoom ratio 2.29

|  | Wide-angle end | Intermediate focal point | Telephoto end |
|---|---|---|---|
| f | 1.00 | 1.44 | 2.29 |
| Fno | 1.86 | 2.38 | 2.88 |
| ω | 42.1 | 34.0 | 21.4 |
| Y | 0.766 | 0.909 | 0.909 |
| BF | 0.98 | 0.95 | 0.99 |
| TL | 7.55 | 6.61 | 6.14 |

TABLE 5-continued

[Lens Data]

| Surface number | R | D | nd | vd |
|---|---|---|---|---|
| Object surface | ∞ | | | |
| *1 | 4.4948 | 0.0888 | 1.69680 | 55.46 |
| *2 | 1.0157 | 0.6109 | | |
| *3 | −5.3145 | 0.0888 | 1.59201 | 67.02 |
| *4 | 12.6805 | 0.0222 | | |
| 5 | 2.3141 | 0.2325 | 2.00069 | 25.46 |
| 6 | 5.0164 | 0.0666 | 1.69680 | 55.52 |
| 7 | 3.8665 | D7 (variable) | | |
| 8 | ∞ | 0.0555 | (stop S) | |
| *9 | 1.5142 | 0.4439 | 1.77250 | 49.50 |
| *10 | −8.8479 | 0.0927 | | |
| 11 | 1.9770 | 0.3094 | 1.49782 | 82.57 |
| 12 | −6.1276 | 0.0666 | 1.72825 | 28.38 |
| 13 | 1.0685 | 0.1659 | | |
| 14 | 2.3462 | 0.3476 | 1.49782 | 82.57 |
| 15 | −2.1151 | D15 (variable) | | |
| 16 | 14.1546 | 0.0666 | 1.58313 | 59.46 |
| *17 | 1.3113 | D17 (variable) | | |
| *18 | 3.2472 | 0.3554 | 1.82080 | 42.71 |
| 19 | −5.3219 | D19 (variable) | | |
| 20 | ∞ | 0.0522 | 1.51680 | 63.88 |
| 21 | ∞ | 0.0166 | | |
| 22 | ∞ | 0.0777 | 1.51680 | 63.88 |
| 23 | ∞ | 0.1554 | | |
| Image surface | ∞ | | | |

[Aspherical surface data]

| Surface number | κ | A4 | A6 | A8 | A10 |
|---|---|---|---|---|---|
| 1 | 1.0000 | −1.22649E−01 | 8.65627E−02 | −2.08158E−02 | 0.00000E+00 |
| 2 | 0.7707 | −1.57629E−01 | −6.18620E−02 | 5.29153E−02 | −3.20432E−02 |
| 3 | 1.0000 | −1.30119E−01 | 3.68681E−03 | 6.26482E−02 | 0.00000E+00 |
| 4 | 1.0000 | −1.21439E−01 | 7.03803E−02 | 6.32759E−02 | −2.89227E−02 |
| 9 | 1.0000 | −2.35433E−02 | 1.06100E−02 | −1.16401E−03 | 3.51134E−03 |
| 10 | 1.0000 | 3.59908E−02 | 1.28530E−02 | 0.00000E+00 | 0.00000E+00 |
| 17 | 1.0000 | 3.02388E−02 | −1.48125E−03 | −8.28950E−02 | 0.00000E+00 |
| 18 | 1.0000 | 9.62528E−03 | 1.36070E−02 | −6.11018E−03 | 0.00000E+00 |

[Zooming data]

| Variable distance | Wide-angle end | Intermediate focal point | Telephoto end |
|---|---|---|---|
| D7 | 2.77786 | 1.51290 | 0.41986 |
| D15 | 0.21956 | 0.55211 | 1.15116 |
| D17 | 0.55801 | 0.58243 | 0.56742 |
| D19 | 0.72522 | 0.69600 | 0.73466 |

[Lens group data]

| Group number | Group first surface | Group focal length | Lens configuration length |
|---|---|---|---|
| G1 | 1 | −2.08993 | 1.1098 |
| G2 | 9 | 1.75174 | 1.4816 |
| G3 | 16 | −2.48305 | 0.0666 |
| G4 | 18 | 2.50378 | 0.3554 |

[Conditional expression]

Conditional expression (1) D3W/D3T = 0.983
Conditional expression (2) M3/M4 = 0.501
Conditional expression (3) BFw/ $(fw^2 + ft^2)^{1/2}$ = 0.394
Conditional expression (4) Σdw/Σdt = 1.275
Conditional expression (5) f4/fw = 2.504
Conditional expression (6) (−f1)/f2 = 1.193

Based on Table 5, it is understandable that regarding the zoom lens ZL5 according to the present example the conditional expressions (1) to (6) are satisfied.

Figure 10A:
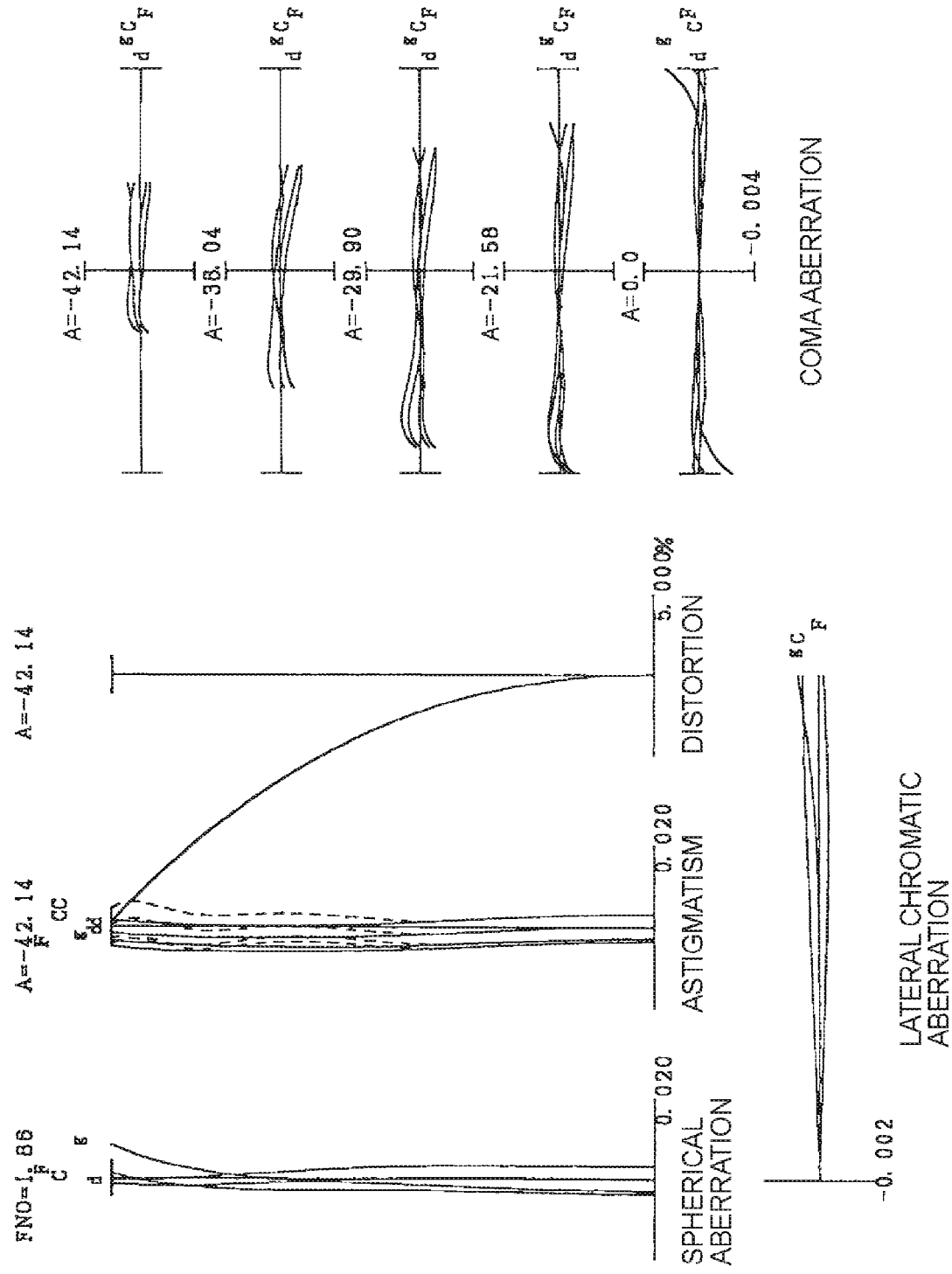
Figure 10C:
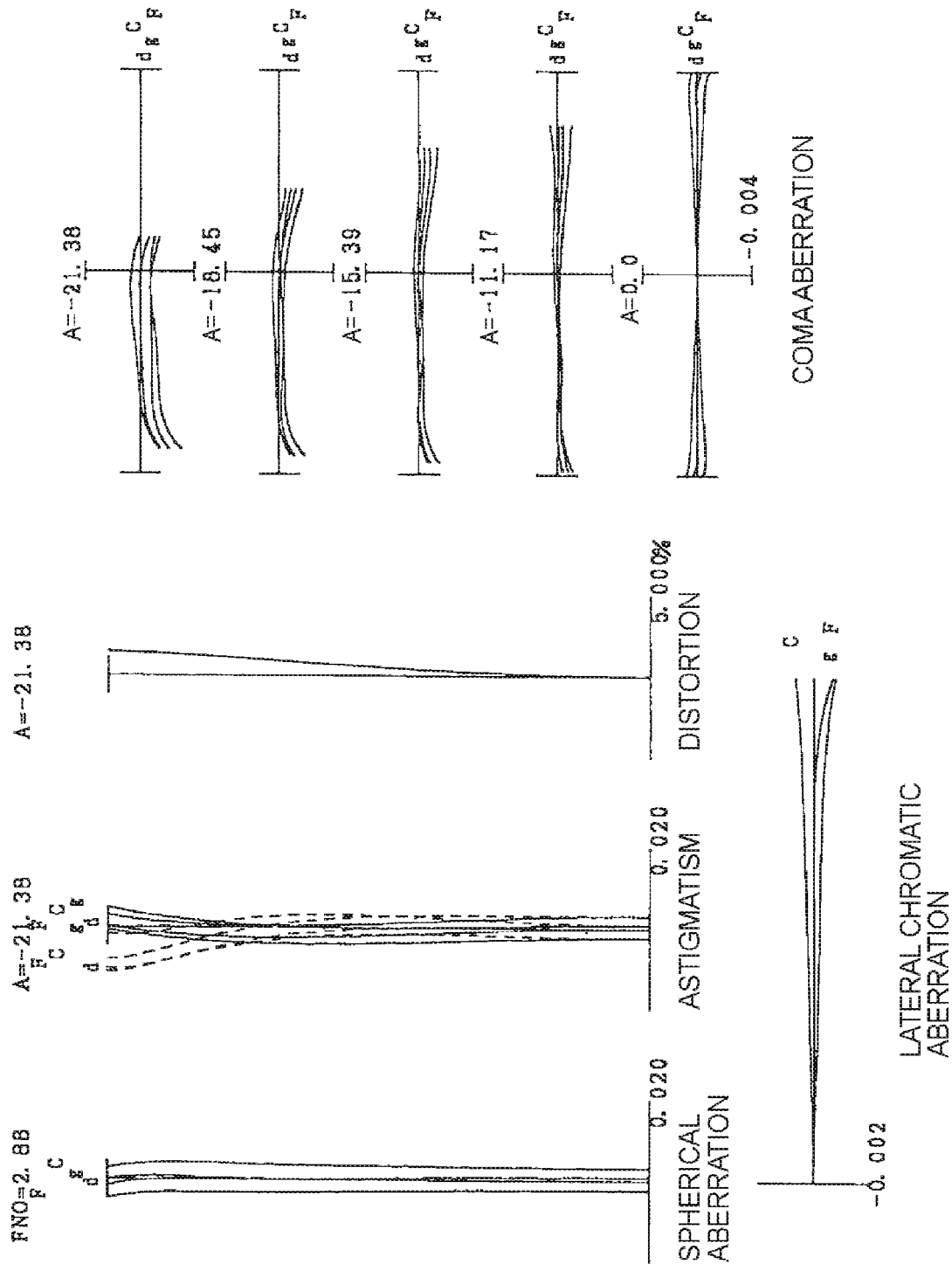

FIG. 10A to 10C illustrate graphs showing various aberrations (spherical aberration, astigmatism, distortion aberration, coma aberration, and lateral chromatic aberration) of zoom lens ZL5 according to Example 5. FIG. 10A illustrates graphs showing various aberrations upon focusing on infinity in the wide-angle end state of Example 5, FIG. 10B illustrates graphs showing various aberrations upon focusing on infinity in the intermediate focal length state of Example 5, and FIG. 10C illustrates graphs showing various aberrations upon focusing on infinity in the telephoto end state of Example 5. As obvious in each graph showing aberrations, in the zoom lens ZL5 according to Example 5, it is understandable that various aberrations are properly corrected, and this has outstanding optical performance.

Example 6

Figure 11A:
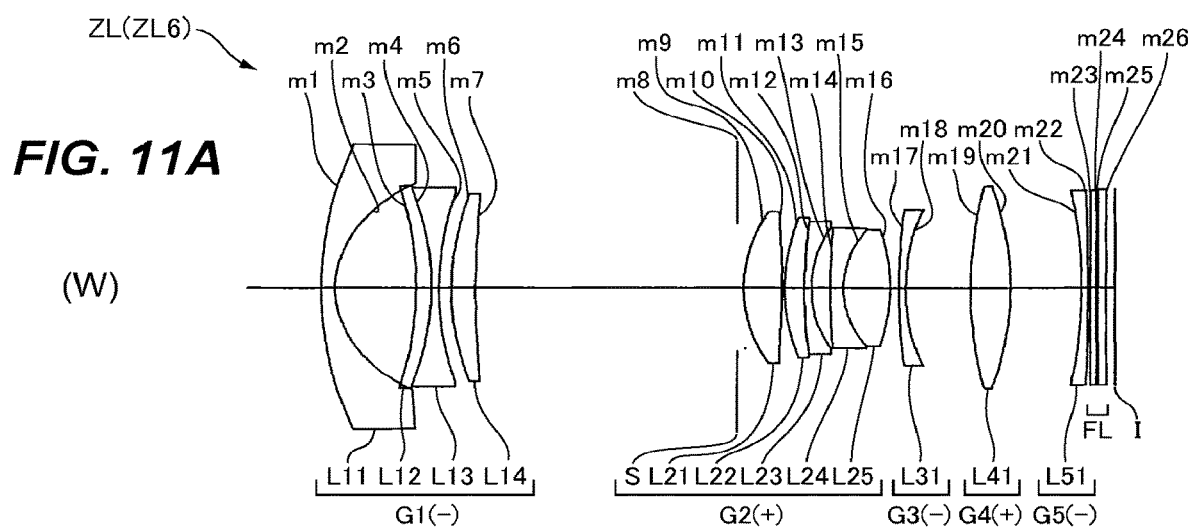
FIGS. 11A to 11C are sectional views illustrating a configuration of a zoom lens according to Example 6, where
Figure 11B:
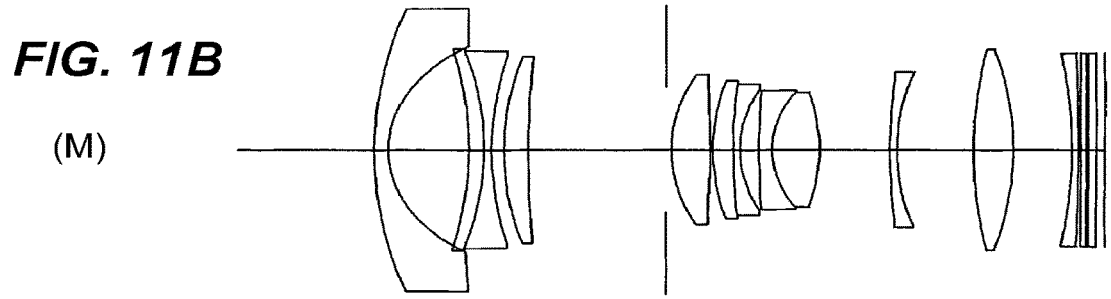
Figure 11C:
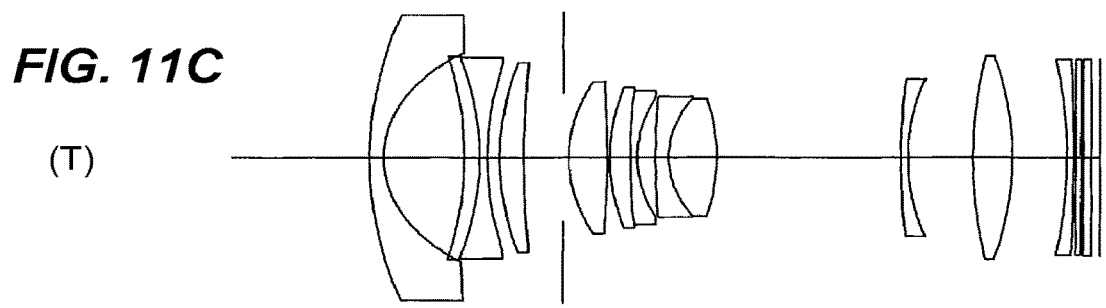

Example 6 is described using FIGS. 11A to 11C, FIG. 12A to 12C, and Table 6. The zoom lens ZL (ZL6) according to Example 6 is composed of, in order from the object as shown in FIGS. 11A to 11C, a first lens group G1 having a negative refractive power, a second lens group G2 having a positive refractive power, a third lens group G3 having a negative refractive power, a fourth lens group G4 having a positive refractive power, a the fifth lens group G5 having a negative refractive power.

The first lens group G1 is composed of, in order from the object, a meniscus-shaped negative lens L11 having a concave surface facing the image, a cemented lens composed of a meniscus-shaped positive lens L12 having a convex surface facing the image and a biconcave negative lens L13, and a meniscus-shaped positive lens L14 having a convex surface facing the object. Note that an image side surface of the negative lens L11 has an aspherical surface.

The second lens group G2 is composed of, in order from the object, an aperture stop S aiming at adjusting a quantity of light, a biconvex positive lens L21, a cemented lens composed of a meniscus-shaped positive lens L22 having a convex surface facing the object and a meniscus-shaped negative lens L23 having a concave surface facing the image, a cemented lens composed of a meniscus-shaped negative lens L24 having a concave surface facing the image and a biconvex positive lens L25. Note that both side surfaces of the positive lens L21 have an aspherical surface.

The third lens group G3 is composed of a meniscus-shaped negative lenses L31 having a concave surface facing the image. Note that an image side surface of the negative lens L31 has an aspherical surface.

The fourth lens group G4 is composed of a biconvex positive lenses L41.

The fifth lens group G5 is composed of the meniscus-shaped negative lenses L51 having a concave surface facing the object.

The filter group FL is arranged on the image side of the fifth lens group G5, and is composed of a low pass filter, an infrared cut filter, etc. for cutting spatial frequency more than marginal resolution of a solid-state image sensing device, such as a CCD disposed on the image surface I.

Regarding the zoom lens ZL6 according to the present example, upon zooming from the wide-angle end state (W) to the telephoto end state (T), the lens groups from the first lens group G1 to the fourth lens group G4 move so that distances between each lens group change. Specifically speaking, the first lens group G1 once moves to the image side in a manner of drawing a locus of a convex on the image side, and afterwards moves to the object side. The second lens group G2 moves to the object side. The third lens group G3 moves to the image side. The fourth lens group G4 moves to the image side. The fifth lens group G5 is fixed. At this point, a distance between the first lens group G1 and the second lens group G2 decreases, a distance between the second lens group G2 and the third lens group G3 increases, a distance between the third lens group G3 and the fourth lens group G4 once increases and afterwards decreases, and a distance between the fourth lens group G4 and the fifth lens group G5 decreases.

Values of each data in Example 6 is shown in Table 6 below. The surface numbers 1 to 26 in Table 6 correspond to each optical surface of m1 to m26 shown in FIGS. 11A to 11C.

TABLE 6

| [General Data] Zoom ratio 2.61 | | | |
|---|---|---|---|
| | Wide-angle end | Intermediate focal point | Telephoto end |
| f | 1.00 | 1.58 | 2.61 |
| Fno | 1.82 | 2.24 | 2.88 |
| ω | 50.1 | 38.3 | 23.7 |
| Y | 1.000 | 1.187 | 1.187 |
| BF | 0.27 | 0.27 | 0.27 |
| TL | 9.65 | 8.88 | 8.87 |

| [Lens Data] | | | | |
|---|---|---|---|---|
| Surface number | R | D | nd | νd |
| Object surface | ∞ | | | |
| 1 | 4.8166 | 0.17391 | 1.69680 | 55.46 |
| *2 | 1.3044 | 0.98551 | | |
| 3 | −4.6742 | 0.18814 | 1.58144 | 40.98 |
| 4 | −3.7134 | 0.08696 | 1.58913 | 61.22 |
| 5 | 4.1774 | 0.15296 | | |
| 6 | 3.6921 | 0.29658 | 2.00069 | 25.46 |
| 7 | 13.6501 | D7 (variable) | | |
| 8 | ∞ | 0.07246 | (stop S) | |
| *9 | 1.7540 | 0.46931 | 1.72903 | 54.04 |
| *10 | −9.9607 | 0.02899 | | |
| 11 | 2.6626 | 0.24556 | 1.79500 | 45.31 |
| 12 | 7.1836 | 0.08696 | 1.67270 | 32.18 |
| 13 | 1.4987 | 0.22986 | | |
| 14 | 11.1067 | 0.16250 | 1.74950 | 35.25 |
| 15 | 1.2083 | 0.57971 | 1.49782 | 82.57 |

TABLE 6-continued

| | | | | |
|---|---|---|---|---|
| 16 | −2.3874 | D16 (variable) | | |
| 17 | 8.7426 | 0.08696 | 1.58913 | 61.25 |
| *18 | 3.0535 | D18 (variable) | | |
| 19 | 5.7488 | 0.48976 | 1.72916 | 54.61 |
| 20 | −4.0596 | D20 (variable) | | |
| 21 | −6.5217 | 0.08696 | 1.48749 | 70.32 |
| 22 | −28.3863 | 0.02899 | | |
| 23 | ∞ | 0.06834 | 1.51680 | 63.88 |
| 24 | ∞ | 0.02181 | | |
| 25 | ∞ | 0.10178 | 1.51680 | 63.88 |
| 26 | ∞ | 0.04657 | | |
| Image surface | ∞ | | | |

[Aspherical surface data]

| Surface number | κ | A4 | A6 | A8 | A10 |
|---|---|---|---|---|---|
| 2 | 0.6272 | −2.52625E−03 | 3.72198E−03 | −2.73998E−03 | 1.00790E−03 |
| 9 | 1.0000 | −1.83548E−02 | −1.20683E−04 | −5.71472E−04 | 0.00000E+00 |
| 10 | 1.0000 | 1.92507E−02 | 2.52728E−04 | 0.00000E+00 | 0.00000E+00 |
| 18 | 1.0000 | 2.44010E−02 | −1.99545E−03 | −2.01356E−04 | 0.00000E+00 |

[Zooming data]

| Variable distance | Wide-angle end | Intermediate focal point | Telephoto end |
|---|---|---|---|
| D7 | 3.19934 | 1.67813 | 0.47826 |
| D16 | 0.10145 | 0.86729 | 2.25232 |
| D18 | 0.79242 | 0.93415 | 0.79035 |
| D20 | 0.86838 | 0.71292 | 0.66119 |

[Lens group data]

| Group number | Group first surface | Group focal length | Lens configuration length |
|---|---|---|---|
| G1 | 1 | −2.21265 | 1.88406 |
| G2 | 9 | 2.40024 | 1.87535 |
| G3 | 17 | −8.01041 | 0.08696 |
| G4 | 19 | 3.33333 | 0.48976 |
| G5 | 21 | −17.39131 | 0.08696 |

[Conditional expression]
Conditional expression (1) D3W/D3T = 1.003
Conditional expression (2) M3/M4 = 0.990
Conditional expression (3) BFw/$(fw^2 + ft^2)^{1/2}$ = 0.096
Conditional expression (4) Σdw/Σdt = 1.091
Conditional expression (5) f4/fw = 3.333
Conditional expression (6) (−f1)/f2 = 0.922

Based on Table 6, it is understandable that in the zoom lens ZL6 according to the present example the conditional expressions (1) to (6) are satisfied.

Figure 12B:
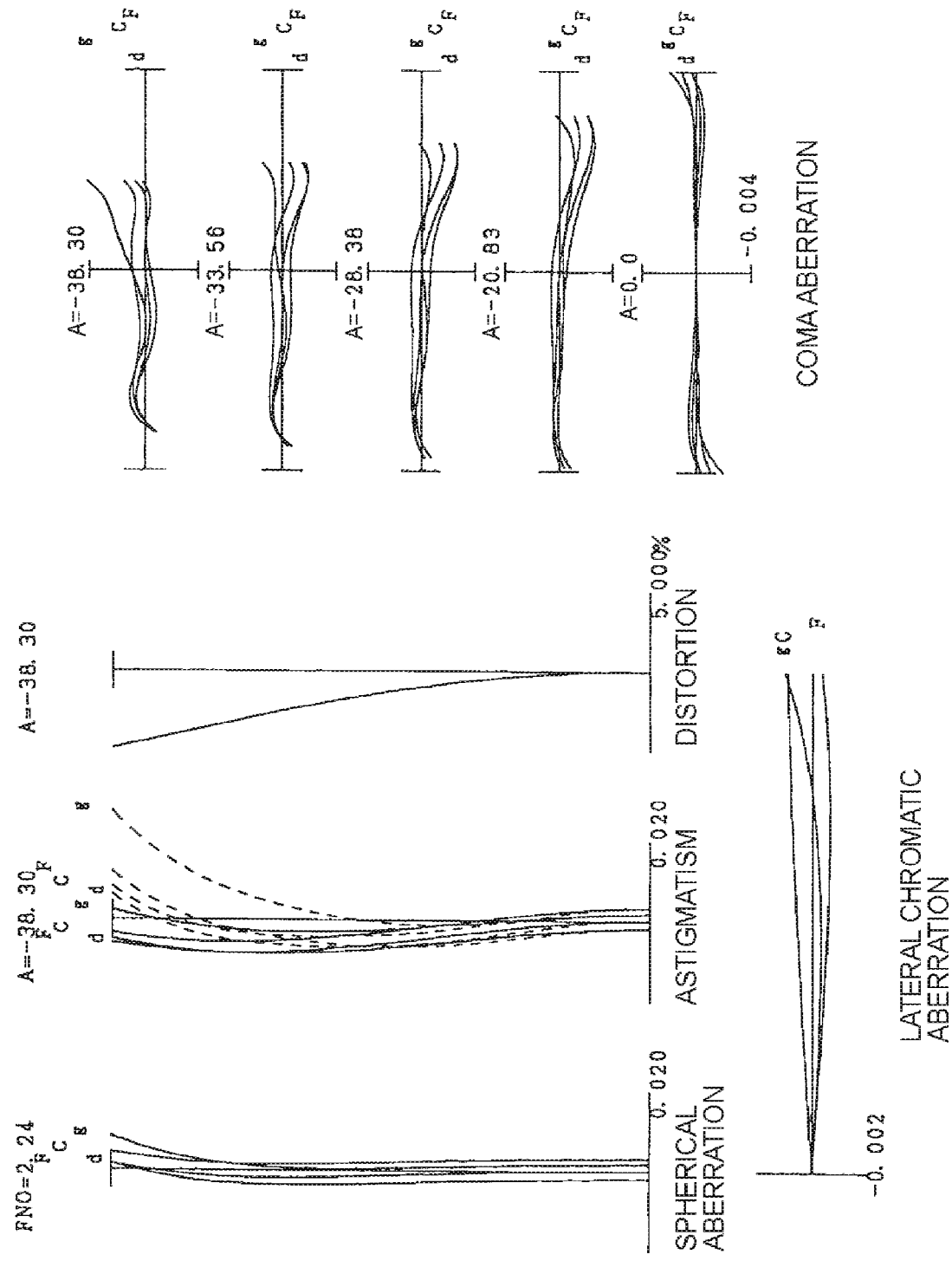

FIG. 12A to 12C illustrate graphs showing various aberrations (spherical aberration, astigmatism, distortion aberration, coma aberration, and lateral chromatic aberration) of the zoom lens ZL6 according to Example 6. FIG. 12A illustrates graphs showing various aberrations upon focusing on infinity in the wide-angle end state of Example 6, FIG. 12B illustrates graphs showing various aberrations upon focusing on infinity in the intermediate focal length state of Example 6, and FIG. 12C illustrates graphs showing various aberrations upon focusing on infinity in the telephoto end state of Example 6. As is obvious in each graph showing aberrations, in the zoom lens ZL6 according to Example 6, it is understandable that various aberrations are properly corrected, and this has outstanding optical performance.

Example 7

Figure 13A:
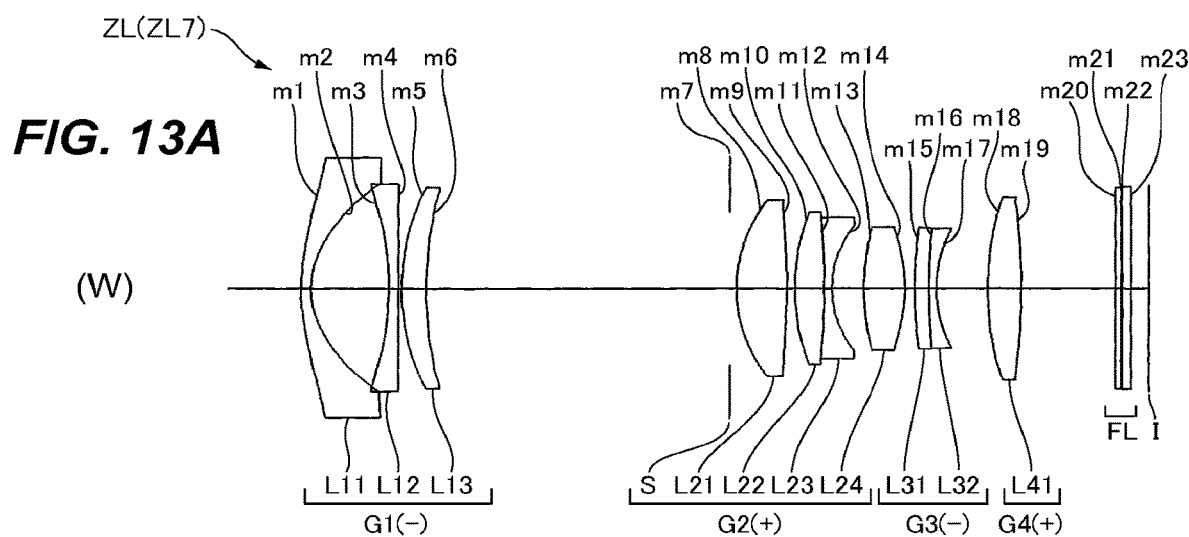
FIGS. 13A to 13C are sectional views illustrating a configuration of a zoom lens according to Example 7, where
Figure 13B:
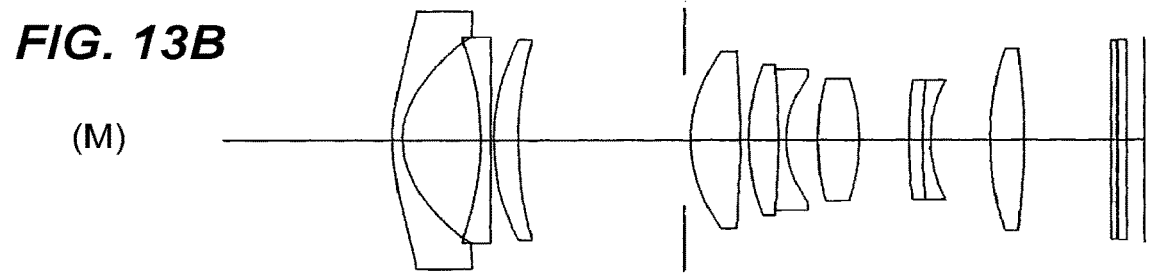
Figure 13C:
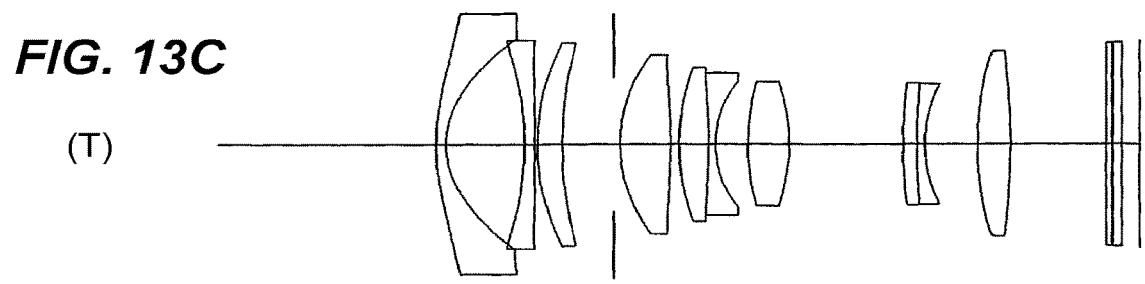

Example 7 is described using FIGS. 13A to 13C, FIG. 14A to 14C, and Table 7. The zoom lens ZL (ZL7) according to Example 7 is composed of, in order from the object as shown in FIGS. 13A to 13C, a first lens group G1 having a negative refractive power, a second lens group G2 having a positive refractive power, a third lens group G3 having a negative refractive power, and a fourth lens group G4 having a positive refractive power.

The first lens group G1 is composed of, in order from the object, a meniscus-shaped negative lens L11 having a concave surface facing the image, a biconcave negative lens L12, and a meniscus-shaped positive lens L13 having a convex surface facing the object. Note that both side surfaces of the negative lens L11 have an aspherical surface. Moreover, both side surfaces of the negative lens L12 have an aspherical surface.

The second lens group G2 is composed of, in order from the object, an aperture stop S aiming at adjusting a quantity of light, a biconvex positive lens L21, a cemented lens composed of a biconvex positive lens L22 and a biconcave negative lens L23, and a biconvex positive lens L24. Note that both side surfaces of the positive lens L21 have an aspherical surface.

The third lens group G3 is composed of, in order from the object, a cemented lenses composed of a meniscus-shaped positive lens L31 having a convex surface facing the object and a meniscus-shaped negative lens L32 having a concave surface facing the image. Note that an image side surface of the negative lens L32 has an aspherical surface.

The fourth lens group G4 is composed of an biconvex positive lenses L41. Note that an object side surface of the positive lens L41 has an aspherical surface.

The filter group FL is arranged on the image side of the fourth lens group G4, and is composed of a low pass filter, an infrared cut filter, etc. for cutting spatial frequency more than marginal resolution of a solid-state image sensing device, such as a CCD disposed on the image surface I.

Regarding the zoom lens ZL7 according to the present example, upon zooming from the wide-angle end state (W) to the telephoto end state (T), all lens groups from the first lens group G1 to the fourth lens group G4 move so that distances between each lens group change. Specifically speaking, the first lens group G1 moves to the image side. The second lens group G2 moves to the object side. The third lens group G3 moves to the object side. The fourth lens group G4 once moves to the image side in a manner of drawing a locus of a convex, and afterwards moves to the object side. At this point, a distance between the first lens group G1 and the second lens group G2 decreases, a distance between the second lens group G2 and the third lens group G3 increases, and a distance between the third lens group G3 and the fourth lens group G4 increases.

Values of each data in Example 7 is shown in Table 7 below. The surface numbers 1 to 23 in Table 7 correspond to each optical surface of m1 to m23 indicated in FIGS. 13A to 13C.

TABLE 7

[General Data]
Zoom ratio 2.23

|  | Wide-angle end | Intermediate focal point | Telephoto end |
| --- | --- | --- | --- |
| f | 1.00 | 1.46 | 2.23 |
| Fno | 1.85 | 2.40 | 2.81 |
| ω | 41.6 | 33.7 | 22.1 |
| Y | 0.772 | 0.917 | 0.917 |
| BF | 1.10 | 1.04 | 1.11 |
| TL | 7.53 | 6.67 | 6.23 |

[Lens Data]

| Surface number | R | D | nd | νd |
| --- | --- | --- | --- | --- |
| Object surface | ∞ |  |  |  |
| *1 | 2.0842 | 0.0895 | 1.69680 | 55.46 |
| *2 | 0.8578 | 0.6965 |  |  |
| *3 | −3.2981 | 0.0895 | 1.59201 | 67.02 |
| *4 | 67.1703 | 0.0253 |  |  |
| 5 | 2.3534 | 0.2184 | 1.92286 | 20.88 |
| 6 | 3.8951 | D6 (variable) |  |  |
| 7 | ∞ | 0.0560 | (stop S) |  |
| *8 | 1.4438 | 0.4477 | 1.77250 | 49.50 |
| *9 | −6.4742 | 0.0728 |  |  |
| 10 | 2.2805 | 0.2630 | 1.49782 | 82.57 |
| 11 | −8.3399 | 0.0672 | 1.72825 | 28.38 |
| 12 | 1.0551 | 0.2864 |  |  |
| 13 | 2.6228 | 0.3685 | 1.49782 | 82.57 |
| 14 | −1.9670 | D14 (variable) |  |  |
| 15 | 5.1461 | 0.1254 | 1.83481 | 42.73 |
| 16 | 7.0228 | 0.0672 | 1.74330 | 49.32 |
| *17 | 1.3713 | D17 (variable) |  |  |
| *18 | 3.5373 | 0.2988 | 1.82080 | 42.71 |
| 19 | −7.3787 | D19 (variable) |  |  |
| 20 | ∞ | 0.0526 | 1.51680 | 63.88 |
| 21 | ∞ | 0.0168 |  |  |
| 22 | ∞ | 0.0784 | 1.51680 | 63.88 |
| 23 | ∞ | 0.1567 |  |  |
| Image surface | ∞ |  |  |  |

[Aspherical surface data]

| Surface number | κ | A4 | A6 | A8 | A10 |
| --- | --- | --- | --- | --- | --- |
| 1 | 1.0000 | −1.38024E−01 | 6.05393E−02 | −1.61893E−02 | 0.00000E+00 |
| 2 | 0.4953 | −1.16727E−01 | −2.94793E−02 | 1.54379E−02 | −2.27592E−02 |
| 3 | 1.0000 | −9.06410E−03 | −6.32774E−02 | 7.07144E−02 | 0.00000E+00 |
| 4 | 1.0000 | −2.60980E−02 | −4.23139E−02 | 8.78300E−02 | −2.67685E−02 |
| 8 | 1.0000 | −3.18339E−02 | 3.08040E−03 | 5.07463E−03 | −3.24715E−03 |
| 9 | 1.0000 | 4.26824E−02 | 5.47004E−03 | 0.00000E+00 | 0.00000E+00 |
| 17 | 1.0000 | 2.83947E−02 | 2.97098E−02 | −8.57895E−02 | 0.00000E+00 |
| 18 | 1.0000 | 1.50043E−02 | 2.20033E−02 | −9.59971E−03 | 0.00000E+00 |

TABLE 7-continued

[Zooming data]

| Variable distance | Wide-angle end | Intermediate focal point | Telephoto end |
|---|---|---|---|
| D6 | 2.70737 | 1.47742 | 0.46339 |
| D14 | 0.08955 | 0.44531 | 1.01706 |
| D17 | 0.46196 | 0.53835 | 0.47206 |
| D19 | 0.83986 | 0.77842 | 0.84998 |

[Lens group data]

| Group number | Group first surface | Group focal length | Lens configuration length |
|---|---|---|---|
| G1 | 1 | −1.98768 | 1.1192 |
| G2 | 8 | 1.76777 | 1.5616 |
| G3 | 15 | −2.60713 | 0.1926 |
| G4 | 18 | 2.94947 | 0.2988 |

[Conditional expression]

Conditional expression (1) D3W/D3T = 0.979
Conditional expression (2) M3/M4 = 0.501
Conditional expression (3) BFw/(fw² + ft²)^(1/2) = 0.450
Conditional expression (4) Σdw/Σdt = 1.255
Conditional expression (5) f4/fw = 2.949
Conditional expression (6) (−f1)/f2 = 1.124

Based on FIG. 7, it is understandable that regarding the zoom lens ZL7 according to the present example, the conditional expressions (1) to (6) are satisfied.

Figure 14A:
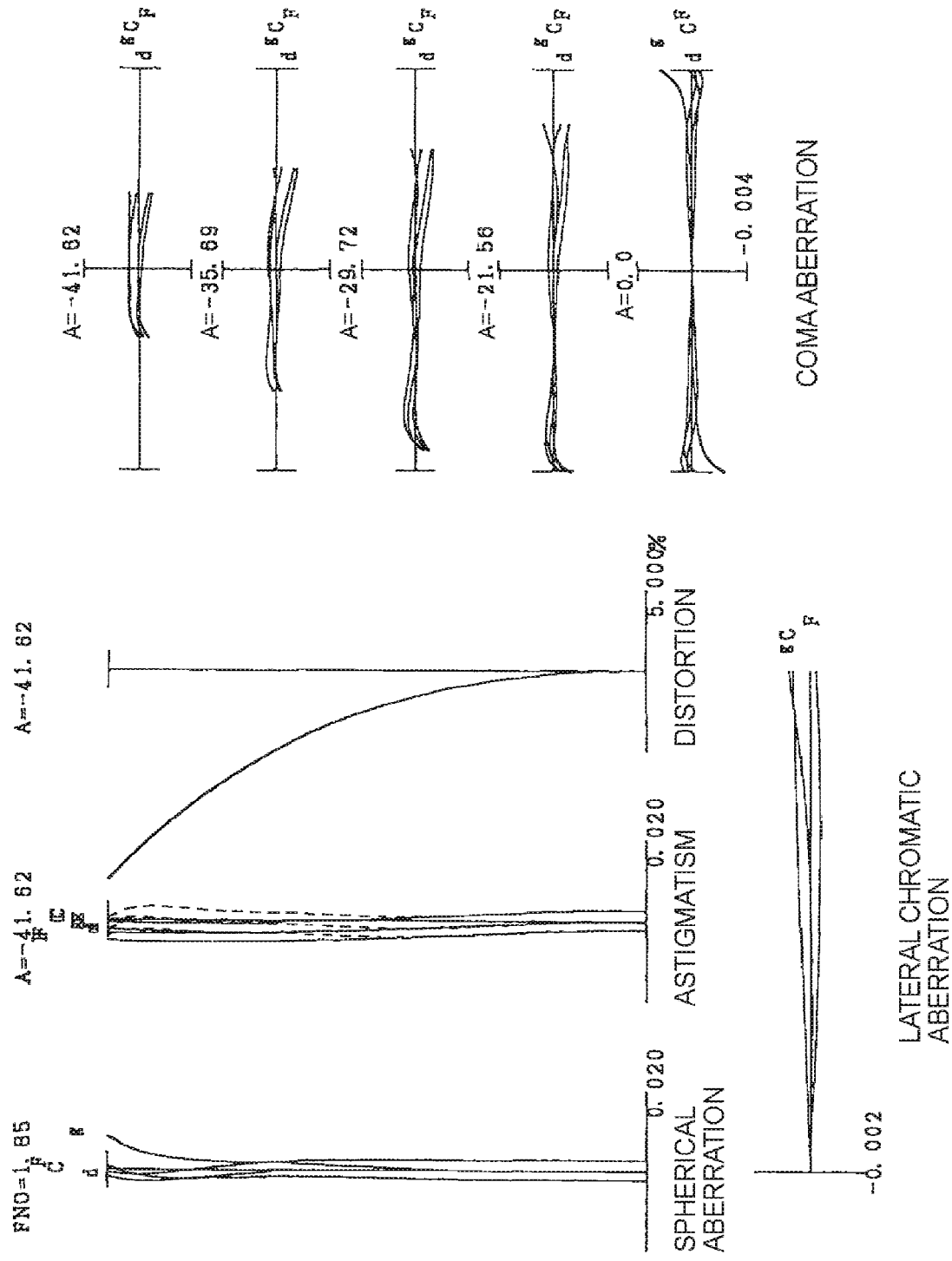

FIG. 14A to 14C illustrate graphs showing various aberrations (spherical aberration, astigmatism, distortion aberration, coma aberration, and lateral chromatic aberration) of zoom lens ZL7 according to Example 7. FIG. 14A illustrates graphs showing various aberrations upon focusing on infinity in the wide-angle end state of Example 7, FIG. 14B illustrates graphs showing various aberrations upon focusing on infinity in the intermediate focal length state of Example 7, and FIG. 14C illustrates graphs showing various aberrations upon focusing on infinity in the telephoto end state of Example 7. As is obvious in each graph showing aberrations, in the zoom lens ZL7 according to Example 7, it is understandable that various aberrations are properly corrected, and this has outstanding optical performance.

According to each example above, although it is small, an angle of view in the wide-angle end state is approximately 84 degrees, thus it is possible to provide a zoom lens having outstanding optical performance.

In order to have the present invention understandable, elements of the embodiment were attached and explained, however the present invention is not limited to the above.

For instance, in the examples above four groups and five group configurations are exampled, however, this is applicable to another group. Moreover, this is applicable to a configuration in which a lens or a lens group is added closest to the object, or a configuration in which a lens or a lens group is added closest to the image. Moreover, a lens group means a part that has at least one lens separated at an air interval which changes at the time of focusing or zooming.

Moreover, it is appreciated that a focusing lens group is configured to focus on a short distance object from an infinity object by moving a single or a plurality of lens group(s), or a partial lens group in an optical axis direction. This focusing lens group is also applicable to autofocus, and is also suitable for motor drive for autofocus (using an ultrasonic motor, etc.). In particular, it is preferable that the third lens group G3 or the fourth lens group G4 is used as a focusing lens group. Or, it is also possible to perform focusing by synchronously moving the third lens group G3 and the fourth lens group G4.

Moreover, it is appreciated a vibration control lens group is configured to move a lens group or a partial lens group in manner of having a component in a direction perpendicular to the axis direction, or rotate and move (swing) it in a direction within a surface including the axis direction so that image blur due to camera shake is corrected. In particular, it is preferable that the second lens group G2 or the third lens group G3 is used as a vibration control lens group.

Moreover, it is also appreciated that a lens surface is formed with a spherical surface or a plane, or formed in an aspherical surface. In case a lens surface has a spherical surface or a plane, it is possible to easily have lens processing and an assembly adjustment, and to prevent degradation of optical performance due to errors of the processing and the assembly adjustment, and it is preferable. Moreover, it is preferable because there is less degradation of the depiction performance when an image surface is shifted. In case a lens surface has an aspherical surface, it is appreciated that the aspherical surface is formed as any one of an aspherical surface which is formed through grinding processing, a glass mold aspherical surface which glass is formed into a aspherical surface configuration using a mold, and a complexed aspherical surface which a resin is formed on a surface of glass and formed in a aspherical surface configuration. Moreover, it is appreciated that a lens surface is formed as a diffractive surface, additionally a lens is formed as a graded-index lens (GRIN lens) or a plastic lens.

The aperture stop S is preferable to be disposed near the second lens group G2, however this is substituted using a frame of a lens instead of providing a member as an aperture stop.

It is appreciated a reflection reducing film having high transmissivity in a wide wavelength band is formed on each lens surface in order to reduce flare and ghosting and attain high optical performance with high contrast.

EXPLANATION OF NUMERALS AND CHARACTERS

ZL (ZL1 to ZL7) Zoom lens
G1 First lens group
G2 Second lens group
G3 Third lens group
G4 Fourth lens group
G5 Fifth lens group
S Aperture stop
FL Filter group
I Image surface
CAM Digital still camera (optical apparatus)

This is a continuation of PCT International Application No. PCT/JP2014/005687, filed on Nov. 12, 2014, which is hereby incorporated by reference. This application also claims the benefit of Japanese Patent Application Nos. 2013-240958 filed in Japan on Nov. 21, 2013 and 2014-174637 filed in Japan on Aug. 28, 2014, which are hereby incorporated by reference.

The invention claimed is:

1. A zoom lens comprising, in order from an object, a first lens group having a negative refractive power, a second lens group having a positive refractive power, a third lens group having a negative refractive power, and a fourth lens group, the first lens group, the second lens group, the third lens group, and the fourth lens group moving on an optical axis so that zooming is performed by changing respective distances between the first lens group and the second lens group, the second lens group and the third lens group, and the third lens group and the fourth lens group, the first lens group comprising a negative lens disposed closest to the object, and a negative lens, and the following conditional expressions being satisfied:

$$0.30 < D3W/D3T < 1.10$$

$$1.00 < \Sigma dw/\Sigma dt < 1.55$$

$$0.80 < (-f1)/f2 < 1.50$$

$$0.50 < M4/M3 < 1.00$$

where D3W denotes an air interval between the third lens group and the fourth lens group in a wide-angle end state, D3T denotes an air interval between the third lens group and the fourth lens group in a telephoto end state, $\Sigma dw$ denotes a distance from a front end lens surface to a rear end lens surface of the zoom lens in the wide-angle end state, $\Sigma dt$ denotes a distance from the front end lens surface to the rear end lens surface of the zoom lens in the telephoto end state, f1 denotes a focal length of the first lens group,
f2 denotes a focal length of the second lens group,
M3 denotes an amount of movement on the optical axis of the third lens group upon zooming from the wide-angle end state to the telephoto end state, and
M4 denotes an amount of movement on the optical axis of the fourth lens group upon zooming from the wide-angle end state to the telephoto end state.

2. A zoom lens according to claim 1, wherein the following conditional expression is satisfied:

$$0.05 < BFw/(fw^2 + ft^2)^{1/2} < 0.50$$

where BFw denotes an air equivalent distance from a rear end lens surface of the zoom lens in the wide-angle end state to an image surface, fw denotes a focal length of the zoom lens in the wide-angle end state, and ft denotes a focal length of the zoom lens in the telephoto end state.

3. A zoom lens according to claim 1, wherein the third lens group is composed of a cemented lens having a negative refractive power.

4. A zoom lens according to claim 1, wherein the second lens group includes a positive lens closest to the object.

5. A zoom lens according to claim 1, wherein the second lens group includes a positive lens closest to the object, and wherein the positive lens has an aspherical surface.

6. An optical apparatus including the zoom lens according to claim 1.

7. A method for manufacturing a zoom lens, comprising:
arranging in a lens barrel, in order from an object, a first lens group having a negative refractive power, a second lens group having a positive refractive power, a third lens group having a negative refractive power, and a fourth lens group, the arranging being such that the first lens group, the second lens group, the third lens group, and the fourth lens group are movable on an optical axis so that zooming is performed by changing respective distances between the first lens group and the second lens group, the second lens group and the third lens group, and the third lens group and the fourth lens group, configuring the first lens group to comprise a negative lens disposed closest to the object, and a negative lens, and satisfying the following conditional expressions:

$$0.30 < D3W/D3T < 1.10$$

$$1.00 < \Sigma dw/\Sigma dt < 1.55$$

$$0.80 < (-f1)/f2 < 1.50$$

$$0.50 < M4/M3 < 1.00$$

where D3W denotes an air interval between the third lens group and the fourth lens group in a wide-angle end state, D3T denotes an air interval between the third lens group and the fourth lens group in a telephoto end state, $\Sigma dw$ denotes a distance from a front end lens surface to a rear end lens surface of the zoom lens in the wide-angle end state, $\Sigma dt$ denotes a distance from the front end lens surface to the rear end lens surface of the zoom lens in the telephoto end state, f1 denotes a focal length of the first lens group,
f2 denotes a focal length of the second lens group,
M3 denotes an amount of movement on the optical axis of the third lens group upon zooming from the wide-angle end state to the telephoto end state, and
M4 denotes an amount of movement on the optical axis of the fourth lens group upon zooming from the wide-angle end state to the telephoto end state.

* * * * *